United States Patent
Bollinger et al.

(10) Patent No.: US 7,963,110 B2
(45) Date of Patent: Jun. 21, 2011

(54) SYSTEMS AND METHODS FOR IMPROVING DRIVETRAIN EFFICIENCY FOR COMPRESSED GAS ENERGY STORAGE

(75) Inventors: Benjamin R. Bollinger, West Lebanon, NH (US); Troy O. McBride, West Lebanon, NH (US); Michael Schaefer, West Lebanon, NH (US)

(73) Assignee: SustainX, Inc., West Lebanon, NH (US)

( * ) Notice: Subject to any disclaimer, the term of this patent is extended or adjusted under 35 U.S.C. 154(b) by 0 days.

(21) Appl. No.: 12/723,084

(22) Filed: Mar. 12, 2010

(65) Prior Publication Data
US 2010/0229544 A1    Sep. 16, 2010

Related U.S. Application Data

(60) Provisional application No. 61/159,623, filed on Mar. 12, 2009, provisional application No. 61/227,591, filed on Jul. 22, 2009, provisional application No. 61/229,853, filed on Jul. 30, 2009.

(51) Int. Cl.
*F04B 49/00* (2006.01)

(52) U.S. Cl. .......................... 60/410; 60/682

(58) Field of Classification Search .............. 290/54, 290/55; 60/398
See application file for complete search history.

(56) References Cited

U.S. PATENT DOCUMENTS

| | | | |
|---|---|---|---|
| 114,297 A | 5/1871 | Ivens et al. |
| 224,081 A | 2/1880 | Eckart |
| 233,432 A | 10/1880 | Pitchford |
| 1,635,524 A | 7/1927 | Aikman |
| 1,681,280 A | 8/1928 | Bruckner |
| 2,025,142 A | 12/1935 | Zahm et al. |
| 2,042,991 A | 6/1936 | Harris, Jr. |
| 2,141,703 A | * 12/1938 | Bays ........................ 60/415 |
| 2,280,100 A | 4/1942 | Singleton |
| 2,280,845 A | 4/1942 | Parker |
| 2,404,660 A | 7/1946 | Rouleau |
| 2,420,098 A | 5/1947 | Rouleau |
| 2,539,862 A | 1/1951 | Rushing |
| 2,628,564 A | 2/1953 | Jacobs |
| 2,712,728 A | 7/1955 | Lewis et al. |
| 2,813,398 A | 11/1957 | Wilcox |
| 2,829,501 A | 4/1958 | Walls |

(Continued)

FOREIGN PATENT DOCUMENTS

BE    898225 A    *    3/1984

(Continued)

OTHER PUBLICATIONS

BE 898225 A, Abstract in English, Fuchs, Published Mar. 16, 1984.*

(Continued)

*Primary Examiner* — Joseph Waks
(74) *Attorney, Agent, or Firm* — Bingham McCutchen LLP

(57) ABSTRACT

In various embodiments, systems for providing a constant electrical output from a compressed gas energy storage and recovery system include a hydraulic-pneumatic energy storage and recovery system configured to provide a varying pressure profile at least at one outlet, a hydraulic motor-pump in fluid communication with the outlet, and a control system for enabling the constant electrical output by controlling at least one of pressure, piston position, power, flow rate, torque, RPM, current, voltage, frequency, or displacement per revolution.

19 Claims, 48 Drawing Sheets

U.S. PATENT DOCUMENTS

| | | | |
|---|---|---|---|
| 2,880,759 A | 4/1959 | Wisman | |
| 3,041,842 A | 7/1962 | Heinecke | |
| 3,236,512 A * | 2/1966 | Stanojevic et al. | 267/126 |
| 3,269,121 A | 8/1966 | Ludwig | |
| 3,538,340 A | 11/1970 | Lang | |
| 3,608,311 A | 9/1971 | Rosel, Jr. | |
| 3,648,458 A | 3/1972 | McAlister | |
| 3,650,636 A | 3/1972 | Eskeli | |
| 3,672,160 A | 6/1972 | Kim | |
| 3,677,008 A | 7/1972 | Koutz | |
| 3,704,079 A | 11/1972 | Berlyn | |
| 3,757,517 A | 9/1973 | Rigollot | |
| 3,793,848 A | 2/1974 | Eskeli | |
| 3,801,793 A | 4/1974 | Goebel | |
| 3,803,847 A | 4/1974 | McAlister | |
| 3,839,863 A | 10/1974 | Frazier | |
| 3,847,182 A | 11/1974 | Greer | |
| 3,895,493 A | 7/1975 | Rigollot | |
| 3,903,696 A | 9/1975 | Carman | |
| 3,935,469 A | 1/1976 | Haydock | |
| 3,939,356 A | 2/1976 | Loane | |
| 3,945,207 A | 3/1976 | Hyatt | |
| 3,948,049 A | 4/1976 | Ohms et al. | |
| 3,952,516 A | 4/1976 | Lapp | |
| 3,952,723 A | 4/1976 | Browning | |
| 3,958,899 A | 5/1976 | Coleman, Jr. et al. | |
| 3,986,354 A | 10/1976 | Erb | |
| 3,988,592 A | 10/1976 | Porter | |
| 3,988,897 A | 11/1976 | Strub | |
| 3,990,246 A | 11/1976 | Wilmers | |
| 3,991,574 A | 11/1976 | Frazier | |
| 3,996,741 A | 12/1976 | Herberg | |
| 3,998,049 A | 12/1976 | McKinley et al. | |
| 4,008,006 A | 2/1977 | Bea | |
| 4,027,993 A | 6/1977 | Wolff | |
| 4,030,303 A | 6/1977 | Kraus et al. | |
| 4,031,702 A | 6/1977 | Burnett et al. | |
| 4,031,704 A | 6/1977 | Moore et al. | |
| 4,041,708 A | 8/1977 | Wolff | |
| 4,050,246 A | 9/1977 | Bourquardez | |
| 4,055,950 A | 11/1977 | Grossman | |
| 4,058,979 A | 11/1977 | Germain | |
| 4,089,744 A | 5/1978 | Cahn | |
| 4,095,118 A | 6/1978 | Rathbun | |
| 4,100,745 A | 7/1978 | Gyarmathy et al. | |
| 4,108,077 A | 8/1978 | Laing | |
| 4,109,465 A | 8/1978 | Plen | |
| 4,110,987 A | 9/1978 | Cahn et al. | |
| 4,112,311 A | 9/1978 | Theyse | |
| 4,117,342 A | 9/1978 | Melley, Jr. | |
| 4,117,696 A | 10/1978 | Fawcett et al. | |
| 4,118,637 A * | 10/1978 | Tackett | 290/55 |
| 4,124,182 A | 11/1978 | Loeb | |
| 4,126,000 A | 11/1978 | Funk | |
| 4,136,432 A | 1/1979 | Melley, Jr. | |
| 4,142,368 A | 3/1979 | Mantegani | |
| 4,147,204 A | 4/1979 | Pfenninger | |
| 4,149,092 A | 4/1979 | Cros | |
| 4,150,547 A | 4/1979 | Hobson | |
| 4,154,292 A | 5/1979 | Herrick | |
| 4,167,372 A | 9/1979 | Tackett | |
| 4,170,878 A | 10/1979 | Jahnig | |
| 4,173,431 A | 11/1979 | Smith | |
| 4,189,925 A | 2/1980 | Long | |
| 4,197,700 A | 4/1980 | Jahnig | |
| 4,197,715 A | 4/1980 | Fawcett et al. | |
| 4,201,514 A | 5/1980 | Huetter | |
| 4,204,126 A | 5/1980 | Diggs | |
| 4,206,608 A * | 6/1980 | Bell | 60/698 |
| 4,209,982 A | 7/1980 | Pitts | |
| 4,220,006 A | 9/1980 | Kindt | |
| 4,229,143 A | 10/1980 | Pucher | |
| 4,229,661 A | 10/1980 | Mead et al. | |
| 4,232,253 A | 11/1980 | Mortelmans | |
| 4,237,692 A | 12/1980 | Ahrens et al. | |
| 4,242,878 A | 1/1981 | Brinkerhoff | |
| 4,246,978 A | 1/1981 | Schulz et al. | |
| 4,262,735 A | 4/1981 | Courrege | |
| 4,273,514 A | 6/1981 | Shore et al. | |
| 4,274,010 A | 6/1981 | Lawson-tancred | |
| 4,275,310 A | 6/1981 | Summers et al. | |
| 4,281,256 A | 7/1981 | Ahrens | |
| 4,293,323 A | 10/1981 | Cohen | |
| 4,299,198 A | 11/1981 | Woodhull | |
| 4,302,684 A | 11/1981 | Gogins | |
| 4,304,103 A | 12/1981 | Hamrick | |
| 4,311,011 A | 1/1982 | Lewis | |
| 4,316,096 A | 2/1982 | Syverson | |
| 4,317,439 A | 3/1982 | Emmerling | |
| 4,335,867 A | 6/1982 | Bihlmaier | |
| 4,340,822 A | 7/1982 | Gregg | |
| 4,341,072 A | 7/1982 | Clyne | |
| 4,348,863 A | 9/1982 | Taylor et al. | |
| 4,353,214 A | 10/1982 | Gardner | |
| 4,354,420 A | 10/1982 | Bianchetta | |
| 4,355,956 A | 10/1982 | Ringrose et al. | |
| 4,358,250 A | 11/1982 | Payne | |
| 4,367,786 A | 1/1983 | Hafner et al. | |
| 4,368,692 A | 1/1983 | Kita | |
| 4,368,775 A | 1/1983 | Ward | |
| 4,370,559 A | 1/1983 | Langley, Jr. | |
| 4,372,114 A | 2/1983 | Burnham | |
| 4,375,387 A | 3/1983 | deFilippi et al. | |
| 4,380,419 A | 4/1983 | Morton | |
| 4,393,752 A | 7/1983 | Meier | |
| 4,411,136 A | 10/1983 | Funk | |
| 4,421,661 A | 12/1983 | Claar et al. | |
| 4,428,711 A | 1/1984 | Archer | |
| 4,435,131 A | 3/1984 | Ruben | |
| 4,444,011 A | 4/1984 | Kolin | |
| 4,446,698 A | 5/1984 | Benson | |
| 4,447,738 A | 5/1984 | Allison | |
| 4,449,372 A | 5/1984 | Rilett | |
| 4,452,046 A | 6/1984 | Valentin | |
| 4,454,429 A | 6/1984 | Buonome | |
| 4,454,720 A | 6/1984 | Leibowitz | |
| 4,455,834 A | 6/1984 | Earle | |
| 4,462,213 A | 7/1984 | Lewis | |
| 4,474,002 A | 10/1984 | Perry | |
| 4,476,851 A | 10/1984 | Brugger et al. | |
| 4,478,553 A | 10/1984 | Leibowitz et al. | |
| 4,489,554 A | 12/1984 | Otters | |
| 4,491,739 A | 1/1985 | Watson | |
| 4,492,539 A | 1/1985 | Specht | |
| 4,493,189 A | 1/1985 | Slater | |
| 4,496,847 A | 1/1985 | Parkins | |
| 4,498,848 A | 2/1985 | Petrovsky | |
| 4,502,284 A | 3/1985 | Chrisoghilos | |
| 4,503,673 A * | 3/1985 | Schachle et al. | 60/398 |
| 4,515,516 A | 5/1985 | Perrine et al. | |
| 4,520,840 A | 6/1985 | Michel | |
| 4,525,631 A | 6/1985 | Allison | |
| 4,530,208 A | 7/1985 | Sato | |
| 4,547,209 A | 10/1985 | Netzer | |
| 4,585,039 A | 4/1986 | Hamilton | |
| 4,589,475 A | 5/1986 | Jones | |
| 4,593,202 A | 6/1986 | Dickinson | |
| 4,619,225 A | 10/1986 | Lowther | |
| 4,624,623 A | 11/1986 | Wagner | |
| 4,648,801 A | 3/1987 | Wilson | |
| 4,651,525 A | 3/1987 | Cestero | |
| 4,653,986 A * | 3/1987 | Ashton | 417/243 |
| 4,671,742 A * | 6/1987 | Gyimesi | 417/131 |
| 4,676,068 A | 6/1987 | Funk | |
| 4,679,396 A | 7/1987 | Heggie | |
| 4,691,524 A | 9/1987 | Holscher | |
| 4,693,080 A | 9/1987 | Van Hooff | |
| 4,706,456 A | 11/1987 | Backe | |
| 4,707,988 A | 11/1987 | Palmers | |
| 4,710,100 A | 12/1987 | Laing et al. | |
| 4,735,552 A | 4/1988 | Watson | |
| 4,739,620 A | 4/1988 | Pierce | |
| 4,760,697 A | 8/1988 | Heggie | |
| 4,761,118 A | 8/1988 | Zanarini et al. | |
| 4,765,142 A | 8/1988 | Nakhamkin | |
| 4,765,143 A | 8/1988 | Crawford et al. | |
| 4,767,938 A | 8/1988 | Bervig | |

| | | | |
|---|---|---|---|
| 4,792,700 A | 12/1988 | Ammons | |
| 4,849,648 A * | 7/1989 | Longardner ............... 290/54 | |
| 4,870,816 A | 10/1989 | Nakhamkin | |
| 4,872,307 A | 10/1989 | Nakhamkin | |
| 4,873,828 A | 10/1989 | Laing et al. | |
| 4,873,831 A | 10/1989 | Dehne | |
| 4,876,992 A | 10/1989 | Sobotowski | |
| 4,877,530 A | 10/1989 | Moses | |
| 4,885,912 A | 12/1989 | Nakhamkin | |
| 4,886,534 A | 12/1989 | Castan | |
| 4,907,495 A | 3/1990 | Sugahara | |
| 4,936,109 A | 6/1990 | Longardner | |
| 4,942,736 A | 7/1990 | Bronicki | |
| 4,947,977 A | 8/1990 | Raymond | |
| 4,955,195 A | 9/1990 | Jones et al. | |
| 4,984,432 A | 1/1991 | Corey | |
| 5,056,601 A | 10/1991 | Grimmer | |
| 5,058,385 A | 10/1991 | Everett, Jr. | |
| 5,062,498 A | 11/1991 | Tobias | |
| 5,107,681 A | 4/1992 | Wolfbauer, III | |
| 5,133,190 A | 7/1992 | Abdelmalek | |
| 5,138,838 A | 8/1992 | Crosser | |
| 5,140,170 A | 8/1992 | Henderson | |
| 5,152,260 A | 10/1992 | Erickson et al. | |
| 5,161,449 A | 11/1992 | Everett, Jr. | |
| 5,169,295 A | 12/1992 | Stogner et al. | |
| 5,182,086 A | 1/1993 | Henderson et al. | |
| 5,203,168 A | 4/1993 | Oshina | |
| 5,209,063 A | 5/1993 | Shirai et al. | |
| 5,213,470 A | 5/1993 | Lundquist | |
| 5,239,833 A | 8/1993 | Fineblum | |
| 5,259,345 A | 11/1993 | Richeson | |
| 5,271,225 A | 12/1993 | Adamides | |
| 5,279,206 A | 1/1994 | Krantz | |
| 5,296,799 A | 3/1994 | Davis | |
| 5,309,713 A | 5/1994 | Vassallo | |
| 5,321,946 A | 6/1994 | Abdelmalek | |
| 5,327,987 A | 7/1994 | Abdelmalek | |
| 5,339,633 A | 8/1994 | Fujii et al. | |
| 5,341,644 A | 8/1994 | Nelson | |
| 5,344,627 A | 9/1994 | Fujii et al. | |
| 5,364,611 A | 11/1994 | Iijima et al. | |
| 5,365,980 A | 11/1994 | Deberardinis | |
| 5,375,417 A | 12/1994 | Barth | |
| 5,379,589 A | 1/1995 | Cohn et al. | |
| 5,384,489 A | 1/1995 | Bellac | |
| 5,387,089 A | 2/1995 | Stogner et al. | |
| 5,394,693 A | 3/1995 | Plyter | |
| 5,427,194 A | 6/1995 | Miller | |
| 5,436,508 A | 7/1995 | Sorensen | |
| 5,448,889 A | 9/1995 | Bronicki | |
| 5,454,408 A | 10/1995 | Dibella et al. | |
| 5,454,426 A | 10/1995 | Moseley | |
| 5,467,722 A | 11/1995 | Meratla | |
| 5,477,677 A | 12/1995 | Krnavek | |
| 5,491,969 A | 2/1996 | Cohn et al. | |
| 5,491,977 A | 2/1996 | Cho | |
| 5,524,821 A | 6/1996 | Yie et al. | |
| 5,537,822 A | 7/1996 | Shnaid et al. | |
| 5,544,698 A | 8/1996 | Paulman | |
| 5,561,978 A | 10/1996 | Buschur | |
| 5,562,010 A | 10/1996 | McGuire | |
| 5,579,640 A | 12/1996 | Gray, Jr. et al. | |
| 5,584,664 A | 12/1996 | Elliott et al. | |
| 5,592,028 A | 1/1997 | Pritchard | |
| 5,598,736 A | 2/1997 | Erskine | |
| 5,599,172 A | 2/1997 | Mccabe | |
| 5,600,953 A | 2/1997 | Oshita et al. | |
| 5,616,007 A | 4/1997 | Cohen | |
| 5,634,340 A | 6/1997 | Grennan | |
| 5,641,273 A | 6/1997 | Moseley | |
| 5,674,053 A | 10/1997 | Paul et al. | |
| 5,685,155 A | 11/1997 | Brown | |
| 5,768,893 A | 6/1998 | Hoshino et al. | |
| 5,769,610 A | 6/1998 | Paul et al. | |
| 5,771,693 A | 6/1998 | Coney | |
| 5,775,107 A | 7/1998 | Sparkman | |
| 5,778,675 A | 7/1998 | Nakhamkin | |
| 5,794,442 A | 8/1998 | Lisniansky | |
| 5,797,980 A | 8/1998 | Fillet | |
| 5,819,533 A | 10/1998 | Moonen | |
| 5,819,635 A * | 10/1998 | Moonen ............... 92/65 |
| 5,831,757 A | 11/1998 | DiFrancesco | |
| 5,832,728 A | 11/1998 | Buck | |
| 5,832,906 A | 11/1998 | Douville et al. | |
| 5,839,270 A | 11/1998 | Jirnov et al. | |
| 5,845,479 A | 12/1998 | Nakhamkin | |
| 5,873,250 A | 2/1999 | Lewis | |
| 5,901,809 A | 5/1999 | Berkun | |
| 5,924,283 A | 7/1999 | Burke, Jr. | |
| 5,934,063 A | 8/1999 | Nakhamkin | |
| 5,934,076 A | 8/1999 | Coney | |
| 5,937,652 A | 8/1999 | Abdelmalek | |
| 5,971,027 A | 10/1999 | Beachley et al. | |
| 6,012,279 A | 1/2000 | Hines | |
| 6,023,105 A | 2/2000 | Youssef | |
| 6,026,349 A | 2/2000 | Heneman | |
| 6,029,445 A | 2/2000 | Lech | |
| 6,073,445 A | 6/2000 | Johnson | |
| 6,073,448 A | 6/2000 | Lozada | |
| 6,085,520 A | 7/2000 | Kohno | |
| 6,090,186 A | 7/2000 | Spencer | |
| 6,119,802 A | 9/2000 | Puett, Jr. | |
| 6,132,181 A | 10/2000 | Mccabe | |
| 6,145,311 A * | 11/2000 | Cyphelly ............... 60/456 |
| 6,148,602 A | 11/2000 | Demetri | |
| 6,153,943 A | 11/2000 | Mistr, Jr. | |
| 6,158,499 A | 12/2000 | Rhodes | |
| 6,170,443 B1 | 1/2001 | Hofbauer | |
| 6,178,735 B1 | 1/2001 | Frutschi | |
| 6,179,446 B1 | 1/2001 | Sarmadi | |
| 6,188,182 B1 | 2/2001 | Nickols et al. | |
| 6,202,707 B1 | 3/2001 | Woodall et al. | |
| 6,206,660 B1 | 3/2001 | Coney et al. | |
| 6,210,131 B1 | 4/2001 | Whitehead | |
| 6,216,462 B1 | 4/2001 | Gray, Jr. | |
| 6,225,706 B1 | 5/2001 | Keller | |
| 6,276,123 B1 | 8/2001 | Chen et al. | |
| 6,327,858 B1 | 12/2001 | Negre et al. | |
| 6,327,994 B1 | 12/2001 | Labrador | |
| 6,349,543 B1 | 2/2002 | Lisniansky | |
| RE37,603 E | 3/2002 | Coney | |
| 6,352,576 B1 | 3/2002 | Spencer et al. | |
| 6,360,535 B1 | 3/2002 | Fisher | |
| 6,367,570 B1 | 4/2002 | Long, III | |
| 6,372,023 B1 | 4/2002 | Kiyono et al. | |
| 6,389,814 B2 | 5/2002 | Viteri et al. | |
| 6,397,578 B2 | 6/2002 | Tsukamoto | |
| 6,401,458 B2 | 6/2002 | Jacobson | |
| 6,407,465 B1 | 6/2002 | Peltz et al. | |
| 6,419,462 B1 | 7/2002 | Horie et al. | |
| 6,422,016 B2 | 7/2002 | Alkhamis | |
| 6,478,289 B1 | 11/2002 | Trewin | |
| 6,512,966 B2 | 1/2003 | Lof | |
| 6,513,326 B1 | 2/2003 | Maceda et al. | |
| 6,516,615 B1 | 2/2003 | Stockhausen et al. | |
| 6,516,616 B2 | 2/2003 | Carver | |
| 6,598,392 B2 | 7/2003 | Majeres | |
| 6,598,402 B2 | 7/2003 | Kataoka et al. | |
| 6,606,860 B2 | 8/2003 | McFarland | |
| 6,612,348 B1 | 9/2003 | Wiley | |
| 6,619,930 B2 | 9/2003 | Jansen et al. | |
| 6,626,212 B2 | 9/2003 | Morioka et al. | |
| 6,629,413 B1 | 10/2003 | Wendt et al. | |
| 6,637,185 B2 | 10/2003 | Hatamiya et al. | |
| 6,652,241 B1 | 11/2003 | Alder | |
| 6,652,243 B2 | 11/2003 | Krasnov | |
| 6,666,024 B1 | 12/2003 | Moskal | |
| 6,670,402 B1 | 12/2003 | Lee et al. | |
| 6,672,056 B2 | 1/2004 | Roth et al. | |
| 6,675,765 B2 | 1/2004 | Endoh | |
| 6,688,108 B1 | 2/2004 | Van Liere | |
| 6,698,472 B2 | 3/2004 | Camacho et al. | |
| 6,711,984 B2 | 3/2004 | Tagge et al. | |
| 6,712,166 B2 | 3/2004 | Rush et al. | |
| 6,715,514 B2 | 4/2004 | Parker, III | |
| 6,718,761 B2 * | 4/2004 | Merswolke et al. ............... 60/398 |
| 6,739,131 B1 | 5/2004 | Kershaw | |

| Patent | Date | Inventor |
|---|---|---|
| 6,745,569 B2 | 6/2004 | Gerdes |
| 6,745,801 B1 | 6/2004 | Cohen et al. |
| 6,748,737 B2 * | 6/2004 | Lafferty ................... 60/398 |
| 6,762,926 B1 | 7/2004 | Shiue et al. |
| 6,786,245 B1 | 9/2004 | Eichelberger |
| 6,789,387 B2 | 9/2004 | Brinkman |
| 6,789,576 B2 | 9/2004 | Umetsu et al. |
| 6,797,039 B2 | 9/2004 | Spencer |
| 6,815,840 B1 | 11/2004 | Aldendeshe |
| 6,817,185 B2 | 11/2004 | Coney et al. |
| 6,834,737 B2 | 12/2004 | Bloxham |
| 6,848,259 B2 | 2/2005 | Keller-sornig |
| 6,857,450 B2 | 2/2005 | Rupp |
| 6,886,326 B2 | 5/2005 | Holtzapple et al. |
| 6,892,802 B2 | 5/2005 | Kelly et al. |
| 6,900,556 B2 | 5/2005 | Provanzana |
| 6,922,991 B2 | 8/2005 | Polcuch |
| 6,925,821 B2 | 8/2005 | Sienel |
| 6,927,503 B2 | 8/2005 | Enish et al. |
| 6,935,096 B2 | 8/2005 | Haiun |
| 6,938,415 B2 | 9/2005 | Last |
| 6,938,654 B2 | 9/2005 | Gershtein et al. |
| 6,946,017 B2 | 9/2005 | Leppin et al. |
| 6,948,328 B2 | 9/2005 | Kidwell |
| 6,952,058 B2 | 10/2005 | Mccoin |
| 6,959,546 B2 | 11/2005 | Corcoran |
| 6,963,802 B2 | 11/2005 | Enis |
| 6,964,165 B2 | 11/2005 | Uhl et al. |
| 6,964,176 B2 | 11/2005 | Kidwell |
| 6,974,307 B2 | 12/2005 | Antoune et al. |
| 7,000,389 B2 | 2/2006 | Lewellin |
| 7,007,474 B1 | 3/2006 | Ochs et al. |
| 7,017,690 B2 | 3/2006 | Burke |
| 7,028,934 B2 | 4/2006 | Burynski, Jr. |
| 7,040,083 B2 | 5/2006 | Horii et al. |
| 7,040,108 B1 | 5/2006 | Flammang |
| 7,040,859 B2 | 5/2006 | Kane |
| 7,043,920 B2 | 5/2006 | Viteri et al. |
| 7,047,744 B1 | 5/2006 | Robertson et al. |
| 7,055,325 B2 | 6/2006 | Wolken |
| 7,067,937 B2 | 6/2006 | Enish et al. |
| 7,075,189 B2 | 7/2006 | Heronemus |
| RE39,249 E | 8/2006 | Link, Jr. |
| 7,084,520 B2 | 8/2006 | Zambrano |
| 7,086,231 B2 | 8/2006 | Pinkerton |
| 7,093,450 B2 | 8/2006 | Jimenez Haertel et al. |
| 7,093,626 B2 | 8/2006 | Li et al. |
| 7,098,552 B2 | 8/2006 | Mccoin |
| 7,107,766 B2 | 9/2006 | Zacche' et al. |
| 7,107,767 B2 | 9/2006 | Frazer et al. |
| 7,116,006 B2 | 10/2006 | Mccoin |
| 7,124,576 B2 | 10/2006 | Cherney et al. |
| 7,124,586 B2 | 10/2006 | Negre et al. |
| 7,127,895 B2 | 10/2006 | Pinkerton et al. |
| 7,128,777 B2 | 10/2006 | Spencer |
| 7,134,279 B2 | 11/2006 | White |
| 7,155,912 B2 | 1/2007 | Enis et al. |
| 7,168,928 B1 | 1/2007 | West |
| 7,168,929 B2 | 1/2007 | Siegel et al. |
| 7,169,489 B2 | 1/2007 | Redmond |
| 7,177,751 B2 | 2/2007 | Froloff |
| 7,178,337 B2 | 2/2007 | Pflanz |
| 7,191,603 B2 | 3/2007 | Taube |
| 7,197,871 B2 | 4/2007 | Yoshino |
| 7,201,095 B2 | 4/2007 | Hughey |
| 7,218,009 B2 | 5/2007 | Hendrickson et al. |
| 7,219,779 B2 | 5/2007 | Bauer et al. |
| 7,225,762 B2 | 6/2007 | Mahlanen |
| 7,228,690 B2 | 6/2007 | Barker |
| 7,230,348 B2 | 6/2007 | Poole |
| 7,231,998 B1 | 6/2007 | Schechter |
| 7,240,812 B2 | 7/2007 | Kamikozuru |
| 7,249,617 B2 | 7/2007 | Musselman et al. |
| 7,254,944 B1 | 8/2007 | Goetzinger et al. |
| 7,273,122 B2 | 9/2007 | Rose |
| 7,281,371 B1 | 10/2007 | Heidenreich |
| 7,308,361 B2 | 12/2007 | Enis et al. |
| 7,317,261 B2 | 1/2008 | Rolt |
| 7,322,377 B2 | 1/2008 | Baltes |
| 7,325,401 B1 | 2/2008 | Kesseli et al. |
| 7,328,575 B2 | 2/2008 | Hedman |
| 7,329,099 B2 | 2/2008 | Hartman |
| 7,347,049 B2 | 3/2008 | Rajendran et al. |
| 7,353,786 B2 | 4/2008 | Scuderi et al. |
| 7,353,845 B2 | 4/2008 | Underwood et al. |
| 7,354,252 B2 | 4/2008 | Baatrup et al. |
| 7,364,410 B2 | 4/2008 | Lin, Jr. |
| 7,392,871 B2 | 7/2008 | Severinsky et al. |
| 7,406,828 B1 | 8/2008 | Nakhamkin |
| 7,407,501 B2 | 8/2008 | Zvuloni |
| 7,415,835 B2 | 8/2008 | Cowans et al. |
| 7,415,995 B2 | 8/2008 | Plummer et al. |
| 7,417,331 B2 | 8/2008 | De La Torre et al. |
| 7,418,820 B2 | 9/2008 | Harvey et al. |
| 7,436,086 B2 | 10/2008 | Mcclintic |
| 7,441,399 B2 | 10/2008 | Utamura |
| 7,448,213 B2 | 11/2008 | Mitani |
| 7,453,164 B2 | 11/2008 | Borden et al. |
| 7,469,527 B2 | 12/2008 | Negre et al. |
| 7,471,010 B1 | 12/2008 | Fingersh |
| 7,481,337 B2 | 1/2009 | Luharuka et al. |
| 7,488,159 B2 | 2/2009 | Bhatt et al. |
| 7,527,483 B1 | 5/2009 | Glauber |
| 7,579,700 B1 | 8/2009 | Meller |
| 7,603,970 B2 | 10/2009 | Scuderi et al. |
| 7,607,503 B1 | 10/2009 | Schechter |
| 7,693,402 B2 | 4/2010 | Hudson et al. |
| 7,802,426 B2 | 9/2010 | Bollinger |
| 7,827,787 B2 | 11/2010 | Cherney et al. |
| 7,832,207 B2 * | 11/2010 | McBride et al. ................ 60/410 |
| 7,843,076 B2 * | 11/2010 | Gogoana et al. ................ 290/42 |
| 7,874,155 B2 * | 1/2011 | McBride et al. ................ 60/645 |
| 7,900,444 B1 * | 3/2011 | McBride et al. ................ 60/410 |
| 2001/0045093 A1 | 11/2001 | Jacobson |
| 2003/0131599 A1 | 7/2003 | Gerdes |
| 2003/0145589 A1 | 8/2003 | Tillyer |
| 2003/0177767 A1 | 9/2003 | Keller-sornig et al. |
| 2003/0180155 A1 | 9/2003 | Coney et al. |
| 2004/0050042 A1 | 3/2004 | Frazer |
| 2004/0050049 A1 | 3/2004 | Wendt et al. |
| 2004/0146406 A1 | 7/2004 | Last |
| 2004/0146408 A1 | 7/2004 | Anderson |
| 2004/0148934 A1 | 8/2004 | Pinkerton et al. |
| 2004/0211182 A1 | 10/2004 | Gould |
| 2004/0244580 A1 | 12/2004 | Coney et al. |
| 2004/0261415 A1 | 12/2004 | Negre et al. |
| 2005/0016165 A1 | 1/2005 | Enis et al. |
| 2005/0028529 A1 | 2/2005 | Bartlett et al. |
| 2005/0047930 A1 | 3/2005 | Schmid |
| 2005/0072154 A1 | 4/2005 | Frutschi |
| 2005/0115234 A1 | 6/2005 | Asano et al. |
| 2005/0155347 A1 | 7/2005 | Lewellin |
| 2005/0166592 A1 | 8/2005 | Larson et al. |
| 2005/0274334 A1 | 12/2005 | Warren |
| 2005/0275225 A1 | 12/2005 | Bertolotti |
| 2005/0279086 A1 | 12/2005 | Hoos |
| 2005/0279292 A1 | 12/2005 | Hudson et al. |
| 2006/0055175 A1 | 3/2006 | Grinblat |
| 2006/0059936 A1 | 3/2006 | Radke et al. |
| 2006/0059937 A1 | 3/2006 | Perkins et al. |
| 2006/0075749 A1 | 4/2006 | Cherney et al. |
| 2006/0090467 A1 | 5/2006 | Crow |
| 2006/0090477 A1 | 5/2006 | Rolff |
| 2006/0107664 A1 | 5/2006 | Hudson et al. |
| 2006/0162543 A1 | 7/2006 | Abe et al. |
| 2006/0162910 A1 | 7/2006 | Kelly et al. |
| 2006/0175337 A1 | 8/2006 | Defosset |
| 2006/0201148 A1 | 9/2006 | Zabtcioglu |
| 2006/0248886 A1 | 11/2006 | Ma |
| 2006/0248892 A1 | 11/2006 | Ingersoll |
| 2006/0254281 A1 | 11/2006 | Badeer et al. |
| 2006/0260311 A1 | 11/2006 | Ingersoll |
| 2006/0260312 A1 | 11/2006 | Ingersoll |
| 2006/0262465 A1 | 11/2006 | Wiederhold |
| 2006/0266034 A1 | 11/2006 | Ingersoll |
| 2006/0266035 A1 | 11/2006 | Ingersoll et al. |
| 2006/0266036 A1 | 11/2006 | Ingersoll |
| 2006/0266037 A1 | 11/2006 | Ingersoll |

| | | |
|---|---|---|
| 2006/0280993 A1 | 12/2006 | Keefer et al. |
| 2006/0283967 A1 | 12/2006 | Cho et al. |
| 2007/0006586 A1 | 1/2007 | Hoffman et al. |
| 2007/0022754 A1 | 2/2007 | Perkins et al. |
| 2007/0022755 A1 | 2/2007 | Pinkerton et al. |
| 2007/0062194 A1 | 3/2007 | Ingersoll |
| 2007/0074533 A1 | 4/2007 | Hugenroth et al. |
| 2007/0095069 A1 | 5/2007 | Joshi et al. |
| 2007/0113803 A1 | 5/2007 | Froloff et al. |
| 2007/0116572 A1 | 5/2007 | Barbu et al. |
| 2007/0137595 A1 | 6/2007 | Greenwell |
| 2007/0151528 A1 | 7/2007 | Hedman |
| 2007/0158946 A1 | 7/2007 | Annen et al. |
| 2007/0181199 A1 | 8/2007 | Weber |
| 2007/0182160 A1 | 8/2007 | Enis et al. |
| 2007/0205298 A1 | 9/2007 | Harrison et al. |
| 2007/0234749 A1 | 10/2007 | Enis et al. |
| 2007/0243066 A1 | 10/2007 | Baron |
| 2007/0245735 A1 | 10/2007 | Ashikian |
| 2007/0258834 A1 | 11/2007 | Froloff et al. |
| 2008/0000436 A1 | 1/2008 | Goldman |
| 2008/0016868 A1 | 1/2008 | Ochs et al. |
| 2008/0047272 A1 | 2/2008 | Schoell |
| 2008/0050234 A1* | 2/2008 | Ingersoll et al. .......... 416/132 B |
| 2008/0072870 A1 | 3/2008 | Chomyszak et al. |
| 2008/0087165 A1 | 4/2008 | Wright et al. |
| 2008/0104939 A1 | 5/2008 | Hoffmann et al. |
| 2008/0112807 A1 | 5/2008 | Uphues et al. |
| 2008/0127632 A1 | 6/2008 | Finkenrath et al. |
| 2008/0138265 A1 | 6/2008 | Lackner et al. |
| 2008/0155975 A1 | 7/2008 | Brinkman |
| 2008/0155976 A1 | 7/2008 | Smith et al. |
| 2008/0157528 A1 | 7/2008 | Wang et al. |
| 2008/0157537 A1 | 7/2008 | Richard |
| 2008/0164449 A1 | 7/2008 | Gray et al. |
| 2008/0185194 A1 | 8/2008 | Leone |
| 2008/0202120 A1 | 8/2008 | Karyambas |
| 2008/0211230 A1 | 9/2008 | Gurin |
| 2008/0228323 A1 | 9/2008 | Laumer et al. |
| 2008/0233029 A1 | 9/2008 | Fan et al. |
| 2008/0238105 A1 | 10/2008 | Ortiz et al. |
| 2008/0238187 A1 | 10/2008 | Garnett et al. |
| 2008/0250788 A1 | 10/2008 | Nuel et al. |
| 2008/0251302 A1 | 10/2008 | Lynn et al. |
| 2008/0272597 A1 | 11/2008 | Althaus |
| 2008/0272598 A1 | 11/2008 | Nakhamkin |
| 2008/0272605 A1 | 11/2008 | Borden et al. |
| 2008/0308168 A1 | 12/2008 | O'Brien, II et al. |
| 2008/0308270 A1 | 12/2008 | Wilson |
| 2008/0315589 A1 | 12/2008 | Malmrup |
| 2009/0000290 A1 | 1/2009 | Brinkman |
| 2009/0007558 A1 | 1/2009 | Hall et al. |
| 2009/0008173 A1 | 1/2009 | Hall et al. |
| 2009/0010772 A1 | 1/2009 | Siemroth |
| 2009/0020275 A1 | 1/2009 | Neher et al. |
| 2009/0021012 A1* | 1/2009 | Stull et al. .......... 290/44 |
| 2009/0056331 A1 | 3/2009 | Zhao et al. |
| 2009/0071153 A1 | 3/2009 | Boyapati et al. |
| 2009/0107784 A1 | 4/2009 | Gabriel et al. |
| 2009/0145130 A1 | 6/2009 | Kaufman |
| 2009/0158740 A1 | 6/2009 | Littau et al. |
| 2009/0178409 A1 | 7/2009 | Shinnar |
| 2009/0200805 A1 | 8/2009 | Kim et al. |
| 2009/0229902 A1 | 9/2009 | Stansbury, III |
| 2009/0249826 A1 | 10/2009 | Hugelman |
| 2009/0282822 A1 | 11/2009 | McBride et al. |
| 2009/0282840 A1 | 11/2009 | Chen et al. |
| 2009/0294096 A1 | 12/2009 | Mills et al. |
| 2009/0301089 A1 | 12/2009 | Bollinger |
| 2009/0317267 A1 | 12/2009 | Gill et al. |
| 2009/0322090 A1 | 12/2009 | Wolf |
| 2010/0018196 A1 | 1/2010 | Li et al. |
| 2010/0077765 A1 | 4/2010 | Japikse |
| 2010/0089063 A1 | 4/2010 | McBride et al. |
| 2010/0133903 A1 | 6/2010 | Rufer |
| 2010/0139277 A1 | 6/2010 | McBride et al. |
| 2010/0193270 A1 | 8/2010 | Deshaies et al. |
| 2010/0199652 A1 | 8/2010 | Lemofouet et al. |
| 2010/0205960 A1 | 8/2010 | Mcbride et al. |
| 2010/0229544 A1 | 9/2010 | Bollinger et al. |
| 2010/0307156 A1 | 12/2010 | Bollinger |
| 2010/0326062 A1 | 12/2010 | Fong et al. |
| 2010/0326064 A1 | 12/2010 | Fong et al. |
| 2010/0326066 A1 | 12/2010 | Fong et al. |
| 2010/0326068 A1 | 12/2010 | Fong et al. |
| 2010/0326069 A1 | 12/2010 | Fong et al. |
| 2010/0326075 A1 | 12/2010 | Fong et al. |
| 2010/0329891 A1 | 12/2010 | Fong et al. |
| 2010/0329903 A1 | 12/2010 | Fong et al. |
| 2010/0329909 A1 | 12/2010 | Fong et al. |
| 2011/0023488 A1 | 2/2011 | Fong et al. |
| 2011/0023977 A1 | 2/2011 | Fong et al. |
| 2011/0030359 A1 | 2/2011 | Fong et al. |
| 2011/0030552 A1 | 2/2011 | Fong et al. |
| 2011/0056193 A1 | 3/2011 | McBride et al. |
| 2011/0056368 A1 | 3/2011 | McBride et al. |
| 2011/0079010 A1* | 4/2011 | McBride et al. .......... 60/641.1 |

FOREIGN PATENT DOCUMENTS

| | | |
|---|---|---|
| CN | 1061262 | 5/1992 |
| CN | 1171490 | 1/1998 |
| CN | 1276308 | 12/2000 |
| CN | 1277323 | 12/2000 |
| CN | 1412443 | 4/2003 |
| CN | 1743665 | 3/2006 |
| CN | 2821162 | 9/2006 |
| CN | 2828319 | 10/2006 |
| CN | 2828368 | 10/2006 |
| CN | 1884822 | 12/2006 |
| CN | 1888328 | 1/2007 |
| CN | 1967091 | 5/2007 |
| CN | 101033731 | 9/2007 |
| CN | 101042115 | 9/2007 |
| CN | 101070822 | 11/2007 |
| CN | 101149002 | 3/2008 |
| CN | 101162073 | 4/2008 |
| CN | 201103518 | 8/2008 |
| CN | 201106527 | 8/2008 |
| CN | 101289963 | 10/2008 |
| CN | 101377190 | 4/2009 |
| CN | 101408213 | 4/2009 |
| CN | 101435451 | 5/2009 |
| DE | 19530253 A1 * | 11/1996 |
| DE | 19903907 | 8/2000 |
| DE | 19911534 | 9/2000 |
| DE | 10042020 | 5/2001 |
| DE | 20118183 | 3/2003 |
| DE | 20120330 | 4/2003 |
| DE | 10147940 | 5/2003 |
| DE | 10205733 | 8/2003 |
| DE | 10212480 | 10/2003 |
| DE | 20312293 | 12/2003 |
| DE | 10220499 | 4/2004 |
| DE | 10334637 | 2/2005 |
| DE | 10 2005 047622 | 4/2007 |
| EP | 0204748 | 3/1981 |
| EP | 0091801 | 10/1983 |
| EP | 0097002 | 12/1983 |
| EP | 0196690 | 10/1986 |
| EP | 0212692 | 3/1987 |
| EP | 0364106 | 4/1990 |
| EP | 0507395 | 10/1992 |
| EP | 0821162 | 1/1998 |
| EP | 1 388 442 | 2/2004 |
| EP | 1405662 | 4/2004 |
| EP | 1726350 | 11/2006 |
| EP | 1741899 | 1/2007 |
| EP | 1 780 058 | 5/2007 |
| FR | 2449805 A * | 10/1980 |
| FR | 2816993 | 5/2002 |
| FR | 2829805 | 3/2003 |
| GB | 722524 | 11/1951 |
| GB | 772703 | 4/1957 |
| GB | 1449076 | 9/1976 |
| GB | 1479940 | 7/1977 |
| GB | 2106992 | 4/1983 |
| GB | 2223810 | 4/1990 |
| GB | 2 300 673 | 11/1996 |

| | | |
|---|---|---|
| GB | 2373546 | 9/2002 |
| GB | 2403356 | 12/2004 |
| JP | 57010778 | 1/1982 |
| JP | 57070970 | 5/1982 |
| JP | 57120058 | 7/1982 |
| JP | 58183880 | 10/1982 |
| JP | 58150079 | 9/1983 |
| JP | 58192976 | 11/1983 |
| JP | 60206985 | 10/1985 |
| JP | 62101900 | 5/1987 |
| JP | 63227973 | 9/1988 |
| JP | 2075674 | 3/1990 |
| JP | 2247469 | 10/1990 |
| JP | 3009090 | 1/1991 |
| JP | 3281984 | 12/1991 |
| JP | 4121424 | 4/1992 |
| JP | 6185450 | 7/1994 |
| JP | 8145488 | 6/1996 |
| JP | 9166079 | 6/1997 |
| JP | 2000-346093 | 6/1999 |
| JP | 11351125 | 12/1999 |
| JP | 2000166128 | 6/2000 |
| JP | 200346093 | 12/2000 |
| JP | 2002127902 | 5/2002 |
| JP | 2003083230 | 3/2003 |
| JP | 2005023918 | 1/2005 |
| JP | 2005036769 | 2/2005 |
| JP | 2005068963 | 3/2005 |
| JP | 2006220252 | 8/2006 |
| JP | 2007001872 | 1/2007 |
| JP | 2007145251 | 6/2007 |
| JP | 2008038658 | 2/2008 |
| KR | 840000180 | 2/1984 |
| KR | 2004004637 | 1/2004 |
| RU | 2101562 | 1/1998 |
| RU | 2169857 | 6/2001 |
| RU | 2213255 | 9/2003 |
| SU | 800438 B * | 2/1981 |
| UA | 69030 | 8/2004 |
| WO | WO-82/00319 | 2/1982 |
| WO | WO-88/02818 | 4/1988 |
| WO | WO-92/22741 | 12/1992 |
| WO | WO-93/06367 | 4/1993 |
| WO | WO-93/11363 | 6/1993 |
| WO | WO-93/24754 | 12/1993 |
| WO | WO-9412785 | 6/1994 |
| WO | WO-95/25381 | 9/1995 |
| WO | WO-96/01942 | 1/1996 |
| WO | WO-96/22456 | 7/1996 |
| WO | WO-96/34213 | 10/1996 |
| WO | WO-97/01029 | 1/1997 |
| WO | WO-97/17546 | 5/1997 |
| WO | WO-98/02818 | 1/1998 |
| WO | WO-98/17492 | 4/1998 |
| WO | WO-99/41498 | 8/1999 |
| WO | WO-00/01945 | 1/2000 |
| WO | WO-00/37800 | 6/2000 |
| WO | WO-00/65212 | 11/2000 |
| WO | WO-00/68578 | 11/2000 |
| WO | WO-0175290 | 10/2001 |
| WO | WO-02/25083 | 3/2002 |
| WO | WO-02/46621 | 6/2002 |
| WO | WO-02/103200 | 12/2002 |
| WO | WO-03/021702 | 3/2003 |
| WO | WO-03/078812 | 9/2003 |
| WO | WO-2004/034391 | 5/2004 |
| WO | WO-2004/059155 | 7/2004 |
| WO | WO-2004/072452 | 8/2004 |
| WO | WO-2004/074679 | 9/2004 |
| WO | WO-2004/109172 | 12/2004 |
| WO | WO-2005/044424 | 5/2005 |
| WO | WO-2005/062969 | 7/2005 |
| WO | WO-2005/067373 | 7/2005 |
| WO | WO-2005/079461 | 9/2005 |
| WO | WO-2005/088131 | 9/2005 |
| WO | WO-2005/095155 | 10/2005 |
| WO | WO-2006/029633 | 3/2006 |
| WO | WO-2006/058085 | 6/2006 |
| WO | WO-2006/124006 | 11/2006 |
| WO | WO-2007/002094 | 1/2007 |
| WO | WO-2007/003954 | 1/2007 |
| WO | WO-2007/012143 | 2/2007 |
| WO | WO-2007/035997 | 4/2007 |
| WO | WO-2007/051034 | 5/2007 |
| WO | WO-2007/066117 | 6/2007 |
| WO | WO-2007/086792 | 8/2007 |
| WO | WO-2007/089872 | 8/2007 |
| WO | WO-2007/096656 | 8/2007 |
| WO | WO-2007/111839 | 10/2007 |
| WO | WO-2007/136765 | 11/2007 |
| WO | WO-2008/003950 | 1/2008 |
| WO | WO-2008/014769 | 2/2008 |
| WO | WO-2008023901 | 2/2008 |
| WO | WO-2008/027259 | 3/2008 |
| WO | WO-2008/028881 | 3/2008 |
| WO | WO-2008/039725 | 4/2008 |
| WO | WO-2008/045468 | 4/2008 |
| WO | WO-2008045468 | 4/2008 |
| WO | WO-2008/051427 | 5/2008 |
| WO | WO-2008/074075 | 6/2008 |
| WO | WO-2008/084507 | 7/2008 |
| WO | WO-2008/091373 | 7/2008 |
| WO | WO-2008102292 | 8/2008 |
| WO | WO-2008/106967 | 9/2008 |
| WO | WO-2008/108870 | 9/2008 |
| WO | WO-2008/109006 | 9/2008 |
| WO | WO-2008/110018 | 9/2008 |
| WO | WO-2008/115479 | 9/2008 |
| WO | WO-2008/121378 | 10/2008 |
| WO | WO-2008139267 | 11/2008 |
| WO | WO-2008/152432 | 12/2008 |
| WO | WO-2008/153591 | 12/2008 |
| WO | WO-2008/157327 | 12/2008 |
| WO | WO-2009/034421 | 3/2009 |
| WO | WO-2009/034548 | 3/2009 |
| WO | WO-2009/038973 | 3/2009 |
| WO | WO-2009/044139 | 4/2009 |
| WO | WO-2009/045110 | 4/2009 |
| WO | WO-2009/114205 | 9/2009 |
| WO | WO-2009/126784 | 10/2009 |
| WO | WO-2010/006319 | 1/2010 |
| WO | WO-2010/009053 | 1/2010 |
| WO | WO 2010105155 A2 * | 9/2010 |
| WO | WO-2010/135658 | 11/2010 |
| WO | WO-2011/008321 | 1/2011 |
| WO | WO-2011/008325 | 1/2011 |
| WO | WO-2011/008500 | 1/2011 |

OTHER PUBLICATIONS

"Hydraulic Transformer Supplies Continuous High Pressure," Machine Design, Penton Media, vol. 64, No. 17, (Aug. 1992), 1 page.

Lemofouet, "Investigation and Optimisation of Hybrid Electricity Storage Systems Based on Compressed Air and Supercapacitors," (Oct. 20, 2006), 250 pages.

Cyphelly et al., "Usage of Compressed Air Storage Systems," BFE-Program "Electricity," Final Report May 2004, 14 pages.

Lemofouet et al., "A Hybrid Energy Storage System Based on Compressed Air and Supercapacitors with Maximum Efficiency Point Tracking (MEPT)," IEEE Transactions on Industrial Electron, vol. 53, No. 4, (Aug. 2006) pp. 1105-1115.

International Search Report and Written Opinion issued Sep. 15, 2009 for International Application No. PCT/US2009/040027, 8 pages.

International Search Report and Written Opinion issued Aug. 30, 2010 for International Application No. PCT/US2010/029795, 9 pages.

International Search Report and Written Opinion issued Dec. 3, 2009 for International Application No. PCT/US2009/046725, 9 pages.

International Search Report and Written Opinion for International Appln. No. PCT/US2010/055279, mailed Jan. 24, 2011 (13 pages).

* cited by examiner

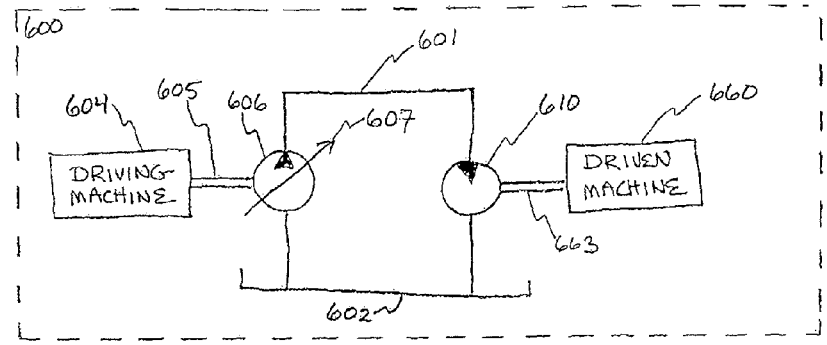
FIG. 17A
FIG. 17B
$$\tau = \Delta P \cdot V_g$$
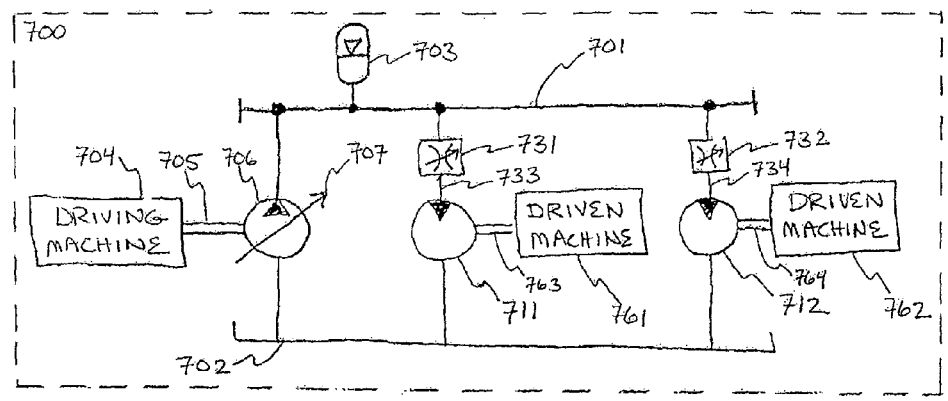
FIG. 18A
FIG. 18B
$$\tau_1 = \Delta P_1 \cdot V_{g1} \qquad \tau_2 = \Delta P_2 \cdot V_{g2}$$

FIG. 19A
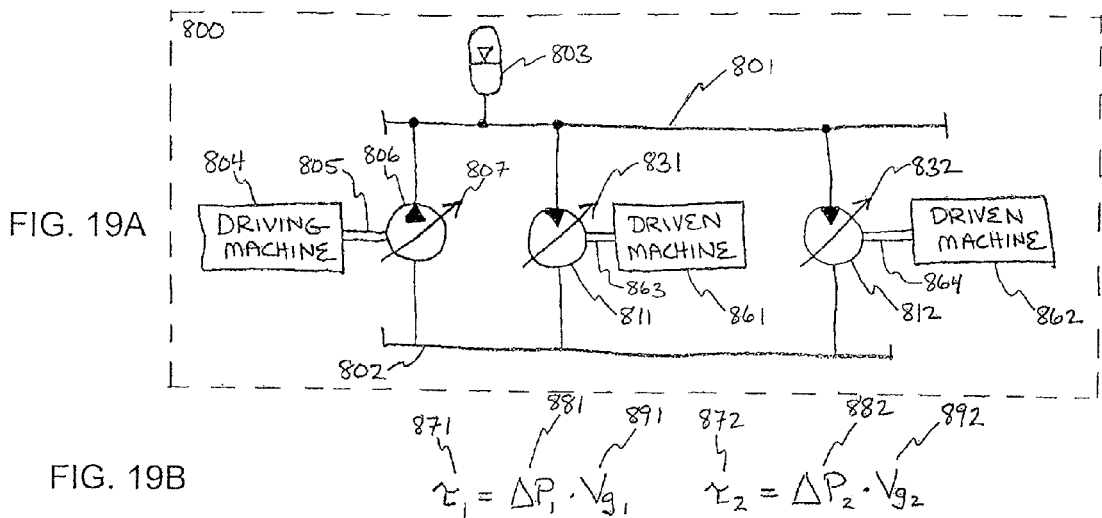
FIG. 19B
$$\tau_1 = \Delta P_1 \cdot V_{g_1} \qquad \tau_2 = \Delta P_2 \cdot V_{g_2}$$
FIG. 20A
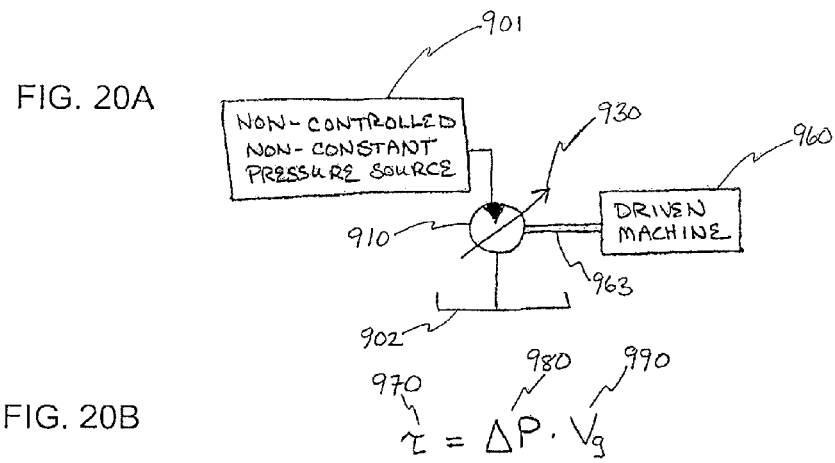
FIG. 20B
$$\tau = \Delta P \cdot V_g$$

SYSTEMS AND METHODS FOR IMPROVING DRIVETRAIN EFFICIENCY FOR COMPRESSED GAS ENERGY STORAGE

CROSS-REFERENCE TO RELATED APPLICATIONS

This application claims priority to U.S. Provisional Patent Application Ser. Nos. 61/159,623, filed on Mar. 12, 2009; 61/227,591, filed on Jul. 22, 2009; and 61/229,853, filed on Jul. 30, 2009, the disclosures of which are hereby incorporated herein by reference in their entireties.

STATEMENT REGARDING FEDERALLY SPONSORED RESEARCH

This invention was made with government support under IIP-0810590 and IIP-0923633 awarded by the NSF. The government has certain rights in the invention.

FIELD OF THE INVENTION

The invention relates to hydraulics and pneumatics, power generation, and control systems. More particularly, the invention relates the integration of variable and fixed displacement hydraulic motor-pumps in hydraulic-pneumatic energy storage and recovery systems and related control systems and methods to provide constant electrical power therefrom.

BACKGROUND OF THE INVENTION

Storing energy in the form of compressed gas has a long history and components tend to be well tested, reliable, and have long lifetimes. The general principles for compressed gas energy storage are generated energy (e.g., electric energy, etc.) is used to compress gas and thus converts the original energy to pressure potential energy; the energy is later recovered in a useful form (e.g. converted back to electric energy, etc.) via appropriate gas expansion. Advantages to compressed gas energy storage include low specific energy costs, long-lifetime, low maintenance, reasonable energy density, and good reliability. However, recovering the energy from the stored compressed gas has certain drawbacks. For example, systems that utilize pneumatic to hydraulic conversion to drive a hydraulic motor are subject to a decaying pressure profile, which in turn produces decreasing and/or irregular power output.

Conventional usage of a fixed displacement (FD) hydraulic motor is to convert fluid power into rotational mechanical power. This is used, for example, in a hydraulically powered crane where a fluid power source is used to drive a FD hydraulic motor whose rotating shaft drives a winch that raises or lowers a load. Increasing or decreasing the pressure to the FD hydraulic motor increases or decreases the torque to the winch, allowing the load to be raised or lowered. In the afore-mentioned pneumatic to hydraulic conversion systems, especially those with accumulator discharge, the input to the hydraulic motor has a decaying pressure profile. For such a decaying pressure profile and for a FD hydraulic motor, in which torque is proportional to pressure, torque decreases proportionally. Likewise, hydraulic flow rate and motor RPM are typically proportional to pressure. With decaying pressure and torque and with the FD motor driving a constant load, RPM and flow rate also decay, which decreases power (torque times RPM) in a quadratic fashion.

In addition, in a system in which a single fluid power source (usually at constant pressure) is used to power multiple FD hydraulic motors to drive multiple loads (e.g., to drive multiple winches with different loads), throttling valves are necessary to decrease the source pressure to a controlled pressure and provide torque control of each FD hydraulic motor, allowing each load to be independently controlled. The disadvantage with this approach is that a significant amount of energy is lost and converted to heat in the throttling valves, greatly reducing system efficiency.

Variable displacement (VD) hydraulic motors were developed to provide torque control from a constant or nearly constant pressure fluid power source without the need for throttling valves. By eliminating the energy losses associated with throttling control valves, system efficiencies are greatly increased. To do this, the control system for the VD hydraulic motor increases or decreases the displacement of the motor to increase or decrease the torque output to account for changes in load.

The prior art does not disclose systems and methods for providing constant electrical power with a staged hydraulic-pneumatic energy conversion system having hydraulic outputs having widely-varying pressures.

SUMMARY OF THE INVENTION

The control systems and methods disclosed herein can be used in such applications as, for example, short-term power storage, long-term power storage, frequency regulation, and power quality control. The systems and methods allow a user to maintain electric output at constant power and frequency from a decaying, or otherwise widely-varying, pressure signal at the input to the hydraulic motor. For example, the systems and methods can be used with a fixed or variable displacement hydraulic motor in combination with a varying pressure profile, for example, such as a decaying pressure profile that results from a discharging accumulator. The control systems and methods disclosed herein are used with novel compressed air energy storage and recovery systems as described in U.S. patent application Ser. Nos. 12/421,057; 12/639,703; and 12/481,235; the disclosures of which are hereby incorporated by reference herein in their entireties, that include a hydraulic motor-pump which is driven by or used to pump hydraulic fluid over a range of pressures—from a mid-pressure to a high pressure (e.g. 300 psi to 3000 psi). The various systems include the use of staged hydraulic conversion and isothermal gas expansion and compression.

Nearly constant power can be achieved by a FD hydraulic motor operating over a broad pressure range by varying RPM. With active control, as torque decreases with pressure, the FD hydraulic motor load can be reduced (e.g., by using power electronics) such that hydraulic flow rate and motor RPM increase, keeping a nearly constant power output (i.e., as pressure and torque decrease, RPM is increased proportionally, keeping power constant). Using a VD hydraulic motor with active control, as described herein, constant power can be achieved while also maintaining constant RPM and torque. By actively controlling the displacement as the pressure decays, the torque can be maintained as a constant. Likewise, RPM can be maintained as a constant through a feedback loop. Using the system to drive an electric generator, constant power can be achieved. By running the system with a synchronous generator with RPM fixed with line frequency and by performing VD system control based on torque feedback (or open-loop based on pressure measurements, or based on known pressure profiles), a constant RPM, constant torque, and thus constant power output can be achieved over a broad pressure range as described herein.

For compressed gas systems, when the gas expands, the pressure will drop. When coupled with a hydraulic system, such as is the case with a hydraulic-pneumatic accumulator, hydraulic pressure similarly drops. In a hydraulic system where this pressure drops over the range of an expansion, when using a fixed displacement hydraulic motor with a constant load, as pressure drops, the torque and power drops. In many instances, it would be advantageous to minimize these changes in power level over the pressure range. For example, operating at a fixed electric power and frequency during system discharge would potentially allow an electric generator to be coupled to the grid without additional power conditioning equipment that would be required for a variable frequency, variable voltage, and/or variable power output.

In pneumatic accumulator-discharge systems where an electric machine (motor-generator) is coupled directly to an FD hydraulic motor, if constant power is to be maintained, the RPM of the hydraulic motor and electric machine must be increased as accumulator pressure (and thus torque on the FD hydraulic motor shaft) decreases. Increased RPM can be achieved by modifying the load on the electric machine and thus on the hydraulic motor. If this is done, and if electric power output at grid frequency (e.g., 60 Hz) is to be produced by the system, then the electric output of the electric machine must be appropriately conditioned. A class of devices suitable for such load adjustment and power conditioning is the variable-frequency drive. As used herein, the term "variable frequency drive" (VFD) denotes an electronic device that is coupled to alternating-current line voltage on one side and to an electrical machine on the other, and through which power may flow in either direction. The frequency on the VFD's line side remains constant (e.g., 60 Hz) and the frequency on its machine side can vary. Such a device will be familiar to persons acquainted with the art of electrical machinery and power electronics.

However, with active control, as described herein, as torque decreases the load on the FD hydraulic motor can be modified such that hydraulic flow rate and motor RPM increase, keeping power output constant: i.e., as torque decreases, RPM is increased proportionally, keeping power constant. One such system and method of control using power electronics is described herein. For example, one method for maintaining nearly constant power output over the range of pressures is to use an FD hydraulic motor to drive an electrical machine whose load is controlled by a VFD. Despite varying torque at the output of the hydraulic motor, RPM can be controlled in such a way so as to keep power nearly constant, while the VFD conditions the electric machine's electrical output to have a constant frequency (e.g., 60 Hz).

Alternatively, a continuously variable transmission (CVT) can be placed between the shaft of the FD hydraulic motor and the shaft of the electrical machine. As used herein, the term "continuously variable transmission" denotes a mechanical device providing a connection between two rotating shafts, said connection having an effective gear ratio that can adjusted to any value within a certain range. The effective gear ratio of the CVT can be varied in such a way that as torque on the FD hydraulic motor shaft decays with accumulator discharge, constant RPM is maintained at the CVT's output (i.e., the shaft of the electric machine). In effect, the CVT adjusts the load on the hydraulic machine to keep mechanical power constant. Consequently, constant-power, constant-frequency electricity are produced by the electric machine. One such system and method of control using a mechanical transmission is described herein.

Generally, the foregoing systems and methods for providing constant power can be used to control one or more parameters of the VFD, such as the load presented to the electric machine, and include monitoring at least one operational parameter of the FD hydraulic motor (e.g., torque on hydraulic motor shaft, torque on shaft of electric generator coupled to the hydraulic motor, output voltage of electric generator coupled to the hydraulic motor) and operating the VFD to vary the load seen by the electric machine. The operational parameter or parameters can also be used to control the effective gear ratio of the CVT so as to vary the load seen by the hydraulic motor.

Additionally, the control system can be used to vary electrical load on the generator. That is, the control system may be configured to increase the RPM of an electric generator by controlling a VFD in such a way as to modify the generator's load in response to decreasing torque on its shaft. Constant power output from the electric generator is thereby maintained and the output voltage of the electric generator can be synchronized to a power grid. Additionally, or alternatively, the control system can be used to vary the mechanical load on the hydraulic motor. The control system may be configured to increase the RPM of the hydraulic motor by adjusting the CVT in such a way as to decrease the hydraulic motor's load in response to decreasing torque on its shaft. Motor RPM consequently increases, constant power output from the electric generator is maintained, and the output voltage of the electric generator can be synchronized to a power grid.

Other systems and methods for providing constant power, improving efficiency, and overcoming the limitations of fixed displacement motors when operating over a wide pressure range include using active control with a VD hydraulic motor. For example, efficiency for an electric motor-generator can vary substantially based on torque and RPM; when the hydraulic motor-pump in the staged hydraulic conversion system is attached to an electric motor-generator, it would be advantageous to operate at a narrow range or fixed value for RPM (e.g. 1800 RPM) and torque to operate at peak efficiency, increasing electric motor, and thus system, efficiency. Likewise, operating at a fixed RPM and power (and thus constant voltage, frequency, and current for an electric generator) during system discharge would allow an electric generator to be synchronized with the grid and potentially eliminate additional power conditioning equipment that would be required for a variable frequency, variable voltage, and/or variable power output. By using the VD hydraulic motor-pump in lieu of the FD hydraulic motor, the displacement per revolution can be controlled in such a way as to maintain a nearly constant torque and proportionally increasing flow rate such that the RPM and power output are kept nearly constant. For the novel compressed air energy storage and recovery system using staged hydraulic conversion described in the above-referenced applications, this constant RPM and power allows for a reduction in electric system costs by potentially eliminating power conditioning equipment necessary for a variable frequency, voltage, or power output, while at the same time improving overall system efficiency by operating at the peak efficiency region of the electric generator; likewise, the increasing flow rate maintains a nearly constant power throughout a decreasing pressure range, also adding value to the energy storage and recovery system.

Furthermore, high efficiency standard commercial variable displacement motor-pump designs include radial piston style (external cam), which are used primarily at low speeds, and axial piston styles (swash-plate, bent-axis). For axial piston motors, the piston assembly typically rotates in an oil bath; for large displacement axial piston motors, viscous drag (which is proportional to speed squared) limits efficiency at high rotational speeds. Additionally, for the radial and axial piston styles displacement is reduced by reducing piston stroke; as piston stroke drops below half the total possible stroke, efficiency typically drops substantially. As described herein, newly developed VD hydraulic motor-pumps which use digital control to open and close valves to control displacement are able to achieve substantially higher efficiencies at large displacement sizes (no longer rotating the entire piston assembly in an oil bath) and maintain high efficiency at low relative displacements (by not changing piston stroke length). In these digitally controlled pumps/motors, relative displacement is controlled by actively opening and closing valves to each piston, such that each piston may or may not be exposed to high pressure each time the rotating cam completes a revolution. Unlike the standard commercial VD motor-pumps, the piston always completes a full stroke, maintaining high motor-pump efficiency even at low relative displacements.

In one aspect, the invention relates to a system for providing a constant electrical output from a compressed gas energy storage and recovery system. The system includes a hydraulic-pneumatic energy storage and recovery system configured to provide a varying pressure profile at, at least one outlet, a variable displacement hydraulic motor-pump in fluid communication with the at least one outlet, and a control system in communication with the variable displacement hydraulic motor-pump. The control system controls at least one variable, such as pressure, piston position, power, flow rate, torque, RPM, current, voltage, frequency, and displacement per revolution. The use of the variable displacement hydraulic motor and associated control system allow a user to achieve near constant expansion and compression power in the hydraulic-pneumatic energy storage and recovery system, while maintaining near constant RPM or torque at the shaft of an electric motor-generator.

In various embodiments, the system also includes an electric motor-generator mechanically coupled to the variable displacement hydraulic motor-pump. The variable displacement hydraulic motor-pump converts hydraulic work to mechanical energy to drive a drive shaft of the electric motor-generator, and the electric motor generator converts the mechanical energy to electrical energy. The system may further include power electronics in communication with the electric motor-generator to synchronize an output (e.g., voltage, current, power, frequency) of the electric motor-generator to a power supply. In one embodiment, the control system is configured to vary the displacement per revolution of the variable displacement hydraulic motor-pump in response to the varying pressure profile at the at least one outlet. The control system can vary flow rate inversely with pressure as a function of time. For example, during an expansion cycle (energy recovery), the control system increases the displacement per revolution of the variable displacement hydraulic motor as the pressure profile decays. During a compression cycle (energy storage), the control system decreases the displacement per revolution as the pressure profile increases, which reduces fluctuations in the energy drawn from the power supply during an energy storage cycle. In another embodiment, the control system is configured to maintain a constant torque or RPM of the variable displacement hydraulic motor-pump to maintain an output (e.g., voltage) by the electric motor-generator. The output can include an output produced at either the shaft side of the electric motor-generator (e.g., torque) or the electric side of the motor-generator (e.g., voltage). The control system controls the variable displacement hydraulic motor-pump to maintain an output at the electric motor-generator that matches a required input for a power supply.

In additional embodiments, the system includes a graphical display in communication with the variable displacement hydraulic motor-pump, which can display one or more parameters, such as piston position, power, pressure, flow rate, torque, RPM, current, and voltage versus time. The hydraulic-pneumatic energy storage and recovery system can use staged hydraulic conversion to provide the varying pressure profile and include a cylinder assembly including a staged pneumatic side and a hydraulic side, the sides being separated by a movable mechanical boundary mechanism that transfers energy therebetween, and a compressed gas storage system in fluid communication with the cylinder assembly. The hydraulic-pneumatic storage and recovery system can include any of the components and their associated configurations as disclosed in the incorporated patent applications. The hydraulic-pneumatic storage and recovery system can also include a heat transfer subsystem to provide isothermal expansion and compression of the gas.

In another aspect, the invention relates to a system for providing a constant electrical output from a compressed gas energy storage and recovery system. The system includes a hydraulic-pneumatic energy storage and recovery system configured to provide a varying pressure profile at, at least one outlet, a fixed displacement hydraulic motor-pump in fluid communication with the at least one outlet, an electric motor-generator mechanically coupled to the fixed displacement hydraulic motor-pump, and a control system. The control system is in communication with a control device to control at least one variable, such as power, flow rate, torque, RPM, current, voltage, and frequency.

In various embodiments, the control system is configured to maintain a constant torque or RPM of the fixed displacement hydraulic motor-pump to maintain a constant output (e.g., voltage, current, power, frequency) by the electric motor-generator. The control system is also configured to vary a flow rate of the fixed displacement hydraulic motor-pump in response to the varying pressure profile at the at least one outlet. For example, increasing the flow rate in response to a decaying pressure profile during an expansion cycle or decreasing the flow rate in response to an increasing pressure profile during a compression cycle. In one embodiment, the control device includes a variable frequency drive coupled to the electric motor-generator to control a load on the hydraulic motor-pump. In another embodiment, the control device includes a continuously variable transmission disposed between the hydraulic motor-pump and the electric motor-generator to control a load on the hydraulic motor-pump. Additionally, the control device can include power electronics in communication with the electric motor-generator to synchronize an output of the electric motor-generator to a power supply.

The hydraulic-pneumatic energy storage and recovery system can use staged hydraulic conversion to provide the varying pressure profile and include a cylinder assembly including a staged pneumatic side and a hydraulic side, the sides being separated by a movable mechanical boundary mechanism that transfers energy therebetween, and a compressed gas storage system in fluid communication with the cylinder assembly. The hydraulic-pneumatic storage and recovery system can include any of the components and their associated configurations as disclosed in the incorporated patent applications. The hydraulic-pneumatic storage and recovery system can also include a heat transfer subsystem to provide isothermal expansion and compression of the gas.

In another aspect, the invention relates to a system for providing a constant electrical output from a compressed gas energy storage and recovery system. The system can include a hydraulic-pneumatic energy storage and recovery system configured to provide a varying pressure profile at, at least one outlet, a digital displacement hydraulic motor-pump in fluid communication with the at least one outlet, and a control system in communication with the digital displacement hydraulic motor-pump. The control system controls at least one variable, such as pressure, piston position, power, flow rate, torque, RPM, current, voltage, frequency, and displacement per revolution. As used herein, a digital-displacement hydraulic motor-pump is a hydraulic motor-pump that varies its effective displacement by actively changing the number of pistons powered during each rotation (e.g., via valving), with all powered piston providing a full stroke, as compared to a conventional hydraulic motor-pump in which every piston is powered each rotation, but the length of the stroke is changed to change displacement.

In various embodiments, the system also includes an electric motor-generator mechanically coupled to the digital displacement hydraulic motor-pump. The hydraulic motor-pump converts hydraulic work to mechanical energy to drive a drive shaft of the electric motor-generator, and the electric motor generator converts the mechanical energy to electrical energy. The system can also include power electronics in communication with the electric motor-generator to synchronize an output (e.g., current, voltage, power, frequency) of the electric motor-generator to a power supply. Additionally, the control system can be configured to vary the displacement per revolution of the digital displacement hydraulic motor-pump in response to the varying pressure profile at the at least one outlet; for example, increasing the flow rate in response to a decaying pressure profile during an expansion cycle or decreasing the flow rate in response to an increasing pressure profile during a compression cycle. In one embodiment, the control system is configured to maintain a constant torque or RPM of the digital displacement hydraulic motor-pump to maintain an output by the electric motor-generator. The control system can control the digital displacement hydraulic motor-pump to maintain an output at the electric motor-generator that matches a required input for a power supply.

In one embodiment, the digital displacement hydraulic motor-pump includes a high pressure input-output, a low pressure input-output, an off-center rotating cam, a plurality of radial piston assemblies coupled to the off-center rotating cam, and a control valve arrangement responsive to the control system for operating the hydraulic motor-pump at, at least one of a substantially constant pressure, power output, flow rate, torque, RPM, or displacement per revolution. In one embodiment, the control valve arrangement includes pairs of high speed valves in fluid communication with each piston assembly and the control system actuates the high speed valves to control aggregate displacement of the hydraulic motor-pump. In one embodiment, the digital displacement hydraulic motor-pump can include a plurality of high-pressure inputs-outputs and a plurality of low-pressure inputs-outputs.

Furthermore, the hydraulic-pneumatic energy storage and recovery system can use staged hydraulic conversion to provide the varying pressure profile and include a cylinder assembly including a staged pneumatic side and a hydraulic side, the sides being separated by a movable mechanical boundary mechanism that transfers energy therebetween, and a compressed gas storage system in fluid communication with the cylinder assembly. The hydraulic-pneumatic storage and recovery system can include any of the components and their associated configurations as disclosed in the incorporated patent applications. The hydraulic-pneumatic storage and recovery system can also include a heat transfer subsystem to provide isothermal expansion and compression of the gas.

In another aspect, the invention relates to a method of providing a constant output from a compressed gas energy storage and recovery system. The method includes the steps of providing a hydraulic-pneumatic energy storage and recovery system configured to provide a varying pressure profile at, at least one outlet, providing a variable displacement hydraulic motor-pump in fluid communication with the at least one pressure outlet, providing an electric motor-generator mechanically coupled to the variable displacement hydraulic motor-pump, monitoring a pressure of the at least one hydraulic outlet, monitoring at least one operational parameter of at least one of the variable displacement hydraulic motor-pump or the electric motor-generator, and operating a control system to vary an operational parameter of at least one of the variable displacement hydraulic motor-pump or the electric motor-generator to maintain at least one output parameter of the system constant. The variable displacement hydraulic motor-pump converts hydraulic work to mechanical energy to drive a drive shaft of the electric motor-generator, and the electric motor generator converts the mechanical energy an electrical output.

In various embodiments, the at least one constant output parameter can be a torque, RPM, power, voltage, current, and/or frequency. The operational parameter of the hydraulic motor-pump can be pressure, piston position, power, flow rate, torque, RPM, and/or displacement per revolution. The operational parameter of the electric motor-generator can be power, torque, RPM, current, voltage, and/or frequency.

In one embodiment, the step of operating the control system includes varying a displacement per revolution of the variable displacement hydraulic motor-pump to maintain the at least one output parameter constant, as described above to compensate for a decaying pressure profile during expansion or an increasing pressure profile during compression. For example, the control system can be configured to increase the flow rate of the variable displacement hydraulic motor-pump in response to a decreasing pressure at the at least one outlet. Additionally, the step of operating the control system can include maintaining at least one of constant torque or RPM of the variable displacement hydraulic motor-pump to maintain a constant output at the electric motor-generator. The step of operating the control system can also include synchronizing an output (e.g., voltage) of the electric motor-generator with a power grid.

These and other objects, along with the advantages and features of the present invention herein disclosed, will become apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which:

FIG. 17A is a schematic representation of a hydraulic drivetrain including a single fluid power source and a single fluid power consumer, wherein the fluid power consumer is a fixed displacement hydraulic motor;

FIG. 17B is an equation describing the torque, pressure, and displacement relationship for the hydraulic motor in FIG. 17A;

FIG. 18A is a schematic representation of a hydraulic drivetrain including a single fluid power source and multiple fluid power consumers, wherein the fluid power consumers are fixed displacement hydraulic motors;

FIG. 18B is a set of equations describing the torque, pressure, and displacement relationships for the hydraulic motors in FIG. 18A;

FIG. 19A is a schematic representation of a hydraulic drivetrain including a single fluid power source and multiple fluid power consumers wherein the fluid power consumers are variable displacement hydraulic motors;

FIG. 19B is a set of equations describing the torque, pressure, and displacement relationships for the hydraulic motors in FIG. 19B;

FIG. 20A is a schematic representation of a hydraulic drivetrain including a single fluid power source and a single fluid power consumer, wherein the fluid power source is a non-controlled, non-constant pressure source and the fluid power consumer is a variable displacement motor producing a constant output speed;

FIG. 20B is an equation describing the torque, pressure, and displacement relationship for the hydraulic motor in FIG. 20A;

DETAILED DESCRIPTION

Figure 1:
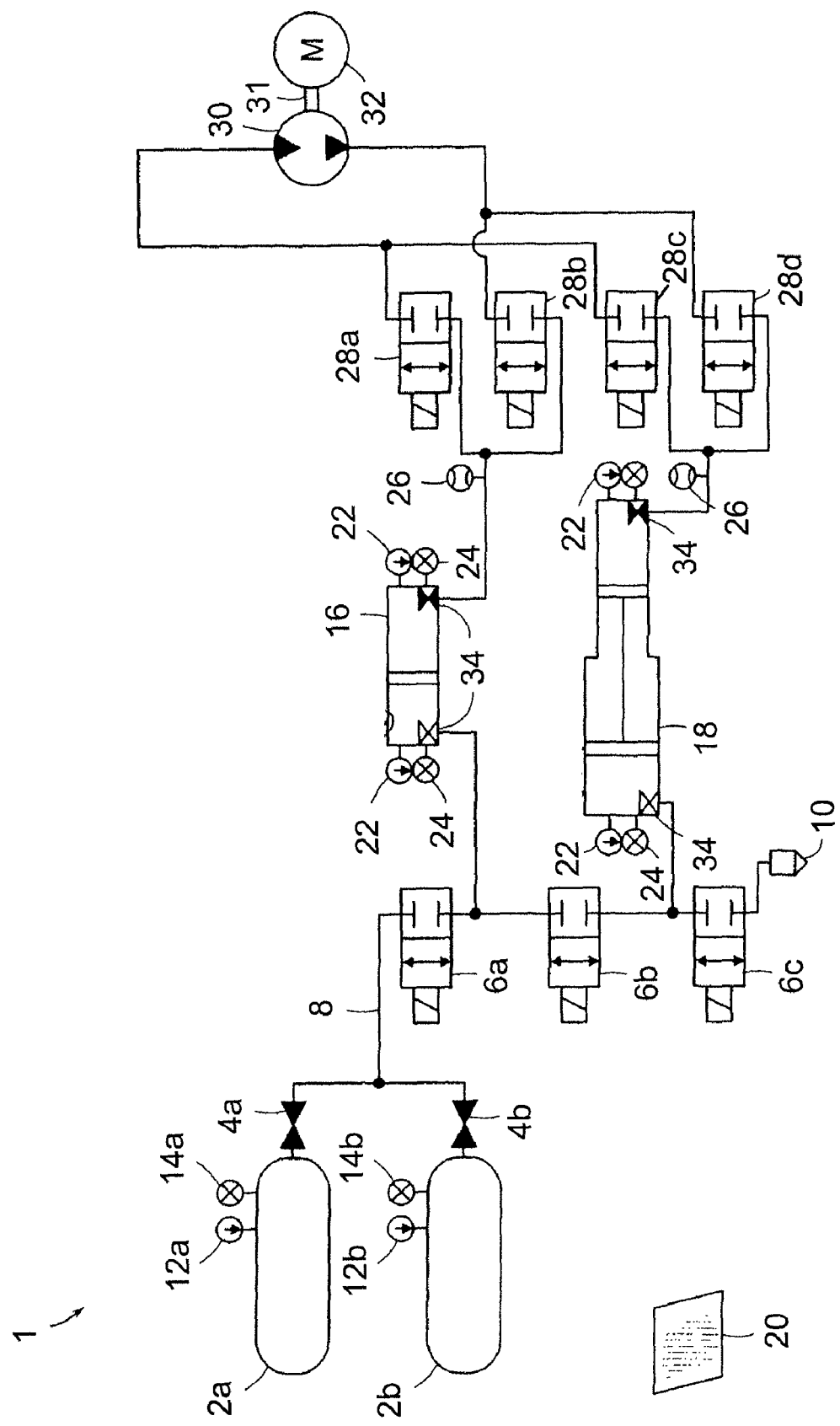
FIG. 1 is a schematic diagram of an open-air hydraulic-pneumatic energy storage and recovery system using a hydraulic motor for generating electrical power in accordance with one embodiment of the invention.

FIG. 1 depicts generally a basic hydraulic-pneumatic energy conversion system 1 that stores and recovers electrical energy using at least one hydraulic motor. Various hydraulic-pneumatic energy conversion systems are described in detail in the above incorporated patent applications. The system 1 includes one or more high-pressure gas/air storage tanks 2a, 2b, . . . 2n. Each tank 2 is joined in parallel via a manual valve(s) 4a, 4b, . . . 4n, respectively, to a main air line 8. The valves 4 are not limited to manual operation, as the valves can be electrically, hydraulically, or pneumatically actuated, as can all of the valves described herein. The tanks 2 are each provided with a pressure sensor 12a, 12b . . . 12n and a temperature sensor 14a, 14b . . . 14n. These sensors 12, 14 can output electrical signals that can be monitored by a control system 20 via appropriate wired and wireless connections/communications. Additionally, the sensors 12, 14 could include visual indicators.

The control system 20 can be any acceptable control device with a human-machine interface. For example, the control system 20 could include a computer (for example a PC-type) that executes a stored control application in the form of a computer-readable software medium. The control application receives telemetry from the various sensors to be described below, and provides appropriate feedback to control valve actuators, motors, and other needed electromechanical/electronic devices.

The system 1 further includes pneumatic valves 6a, 6b, 6c, . . . 6n that control the communication of the main air line 8 with an accumulator 16 and an intensifier 18. As previously stated, the system 1 can include any number and combination of accumulators 16 and intensifiers 18 to suit a particular application. The pneumatic valves 6 are also connected to a vent 10 for exhausting air/gas from the accumulator 16, the intensifier 18, and/or the main air line 8.

The system 1 further includes hydraulic valves 28a, 28b, 28c, 28d . . . 28n that control the communication of the fluid connections of the accumulator 16 and the intensifier 18 with a hydraulic motor-pump 30. The specific number, type, and arrangement of the hydraulic valves 28 and the pneumatic valves 6 are collectively referred to as the control valve arrangements. In addition, the valves are generally depicted as simple two way valves (i.e., shut-off valves); however, the valves could essentially be any configuration as needed to control the flow of air and/or fluid in a particular manner. The hydraulic line between the accumulator 16 and valves 28a, 28b and the hydraulic line between the intensifier 18 and valves 28c, 28d can include flow sensors 26 that relay information to the control system 20.

The motor-pump 30 can be a fixed or variable displacement piston-type assembly having a shaft 31 (or other mechanical coupling) that drives, and is driven by, a combination electrical motor and generator assembly 32. The motor-pump 30 could also be, for example, an impeller, vane, or gear type assembly. The motor-generator assembly 32 is interconnected with a power distribution system and can be monitored for status and output/input level by the control system 20.

The system 1 can also include heat transfer subsystems in fluid communication with the air chambers of the accumulators and intensifiers and the high pressure storage tanks that provide improved isothermal expansion and compression of the gas. Various heat transfer subsystems are described in detail in the above incorporated patent applications.

Figure 2:
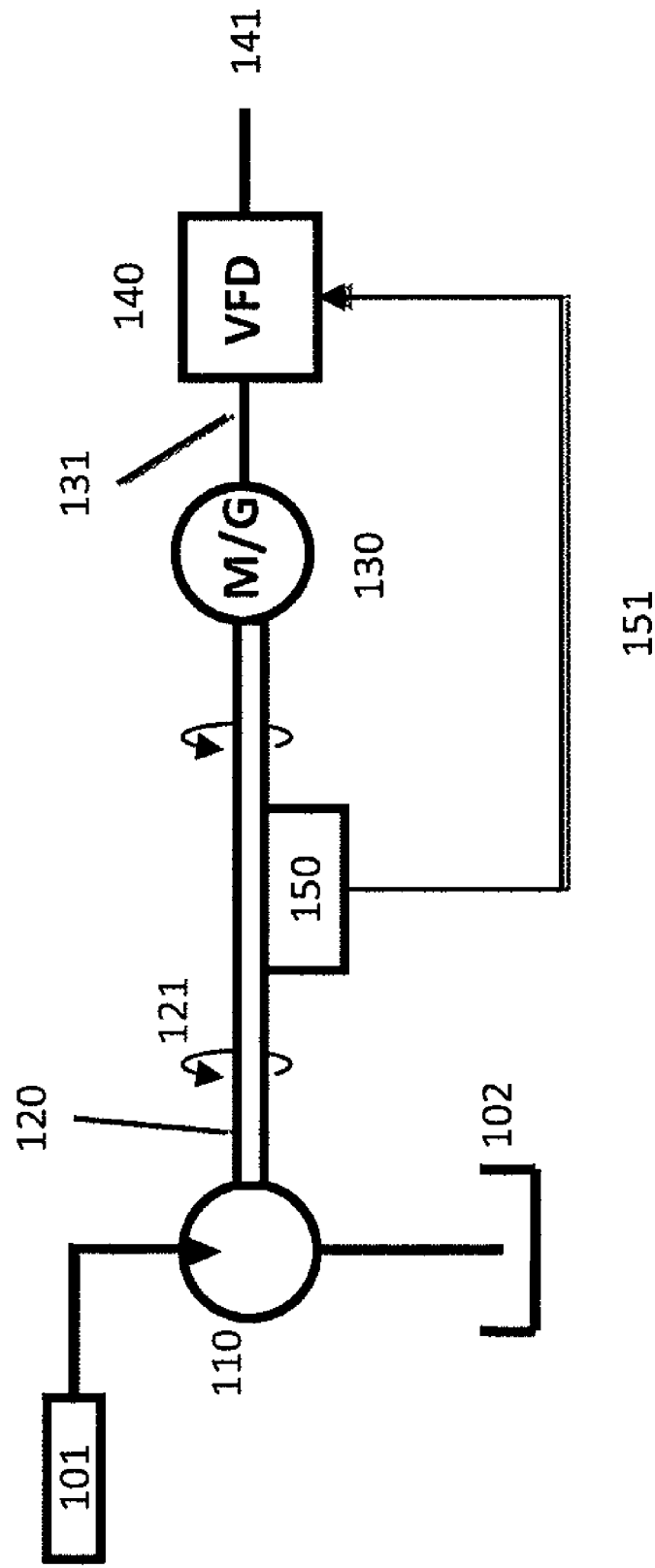
FIG. 2 is a schematic diagram of the major components related to a system and method for providing a constant output from a compressed gas energy storage and recovery system using a fixed displacement hydraulic motor-pump.

FIG. 2 depicts the major components related to a system and method for providing constant power from a hydraulic-pneumatic energy storage and recovery system using staged hydraulic conversion that provides a widely-varying pressure profile to a FD hydraulic motor-pump by using a closed loop control system and a variable frequency drive (VFD) to adjust the load seen by the electric generator and to produce constant electric power at a constant frequency.

The major regions illustrated in FIG. 2 include a source of pressurized hydraulic fluid 101, such as a hydraulic-pneumatic accumulator or system as described above with respect to FIG. 1, which is driving the FD hydraulic motor-pump 110 providing rotary motion (as indicated by arrow 121) of an output shaft 120.

The output shaft drives an electric motor-generator 130 having electric output 131. This electric output 131 is the input of the VFD 140 having an electric output 141. In this illustration, the outlet of the hydraulic motor 110 is at low pressure and is directed to a hydraulic fluid reservoir 102; however, the outlet could be directed back to the source of pressurized hydraulic fluid 101, as shown in FIG. 1. A torque sensor 150 on the shaft 120 provides information via a channel 151 to the VFD 140, which adjusts the load seen by the generator accordingly. The output 141 of the VFD 140 is a sinusoidal voltage having a constant frequency (e.g., 60 Hz) and constant power.

Figure 3A:
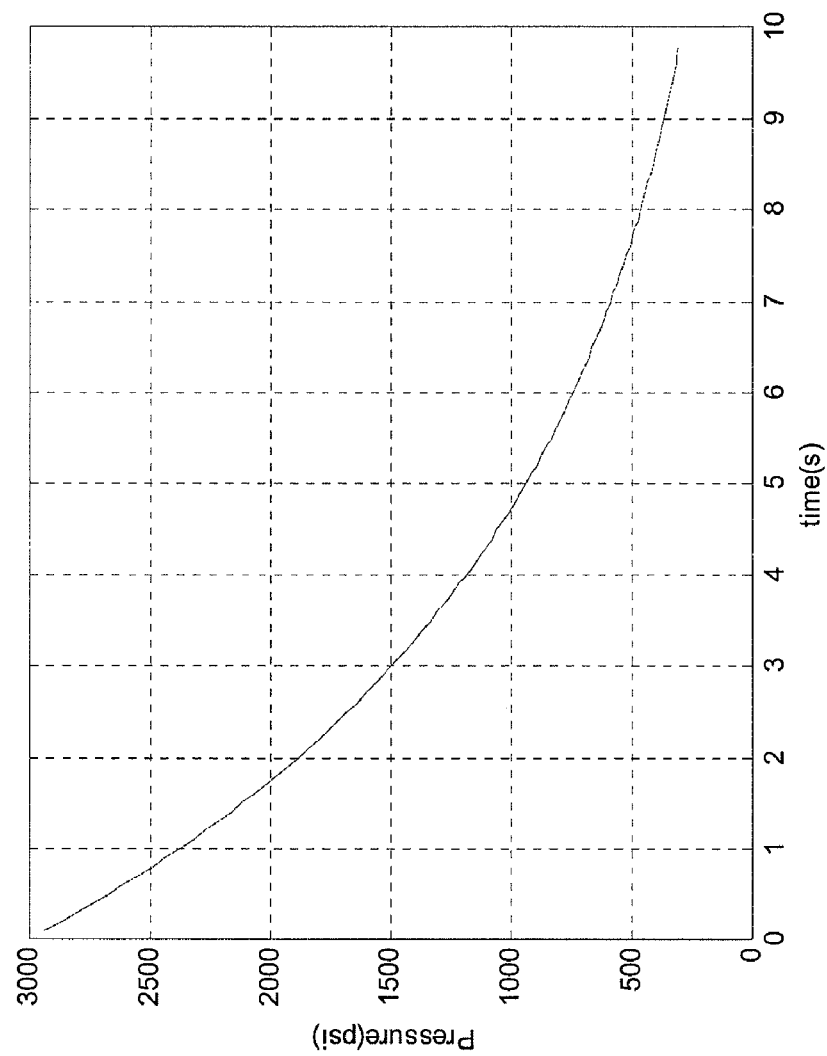
FIGS. 3A-3E are graphical representations of the hydraulic pressure, motor torque, hydraulic flow rate, shaft RPM, and generator output power for a single pressure profile for a representative pressure range produced by the system of FIG. 2.
Figure 3B:
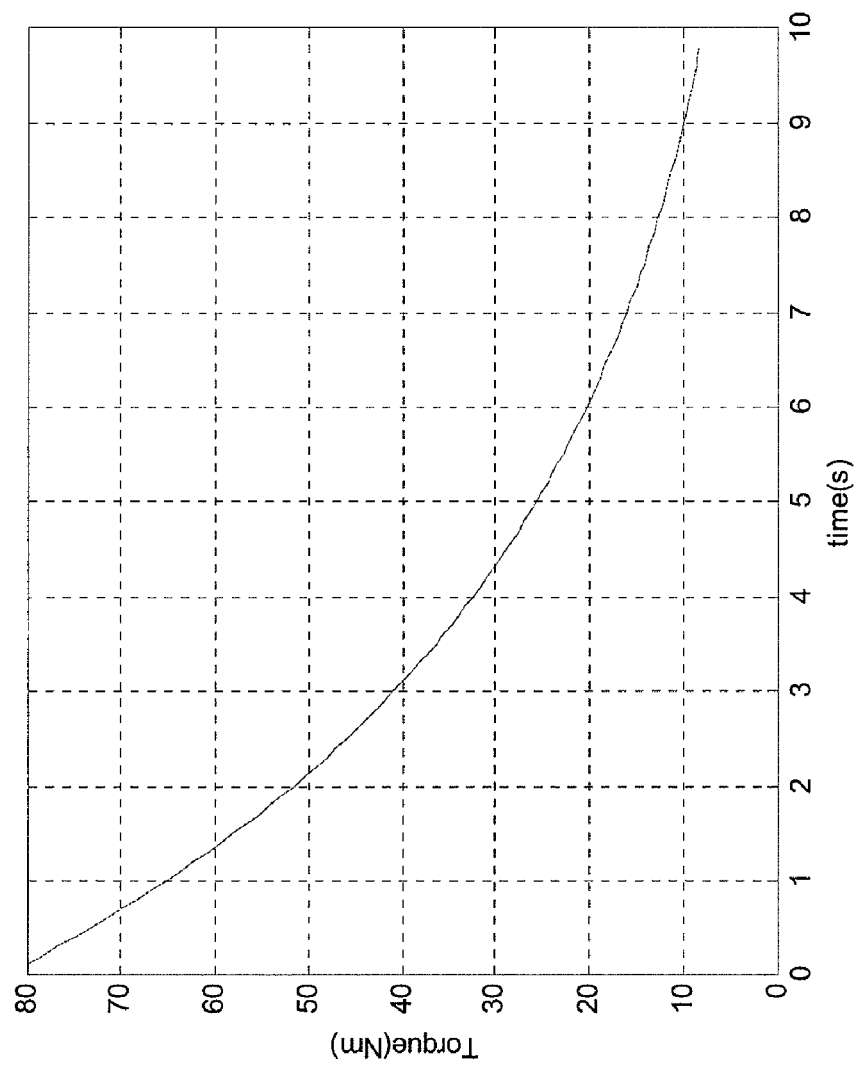
Figure 3C:
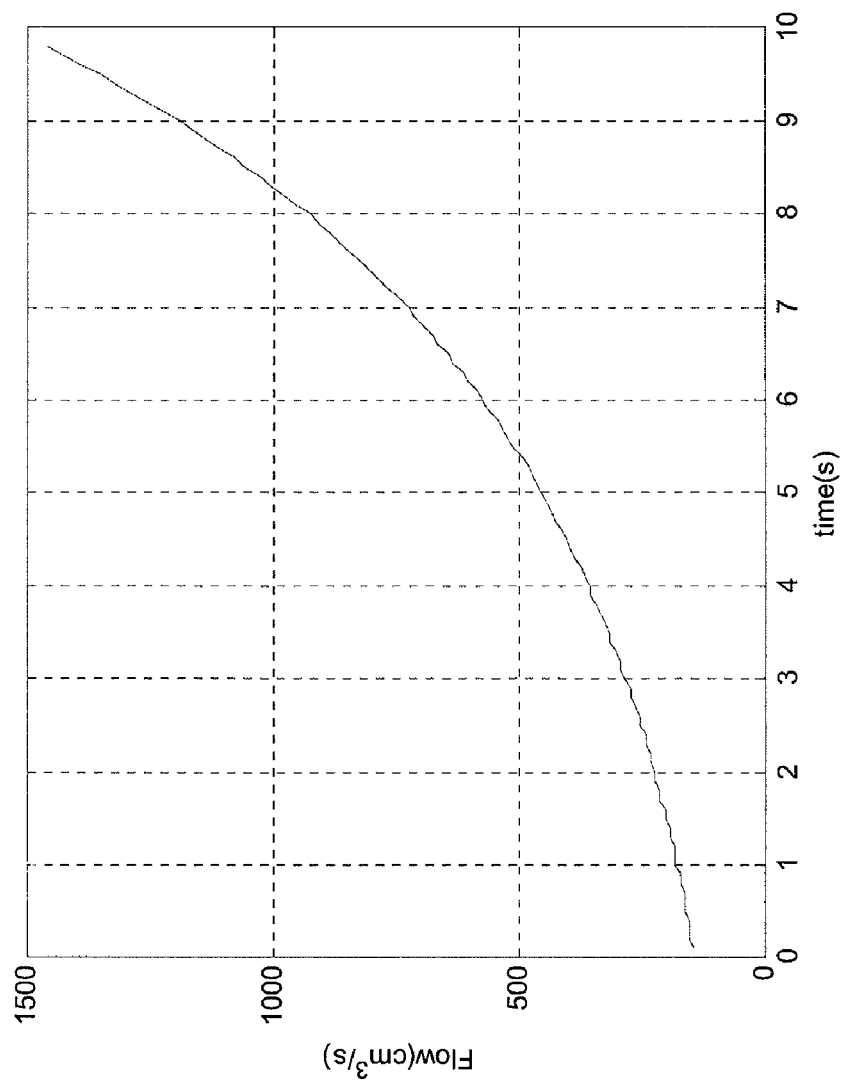
Figure 3D:
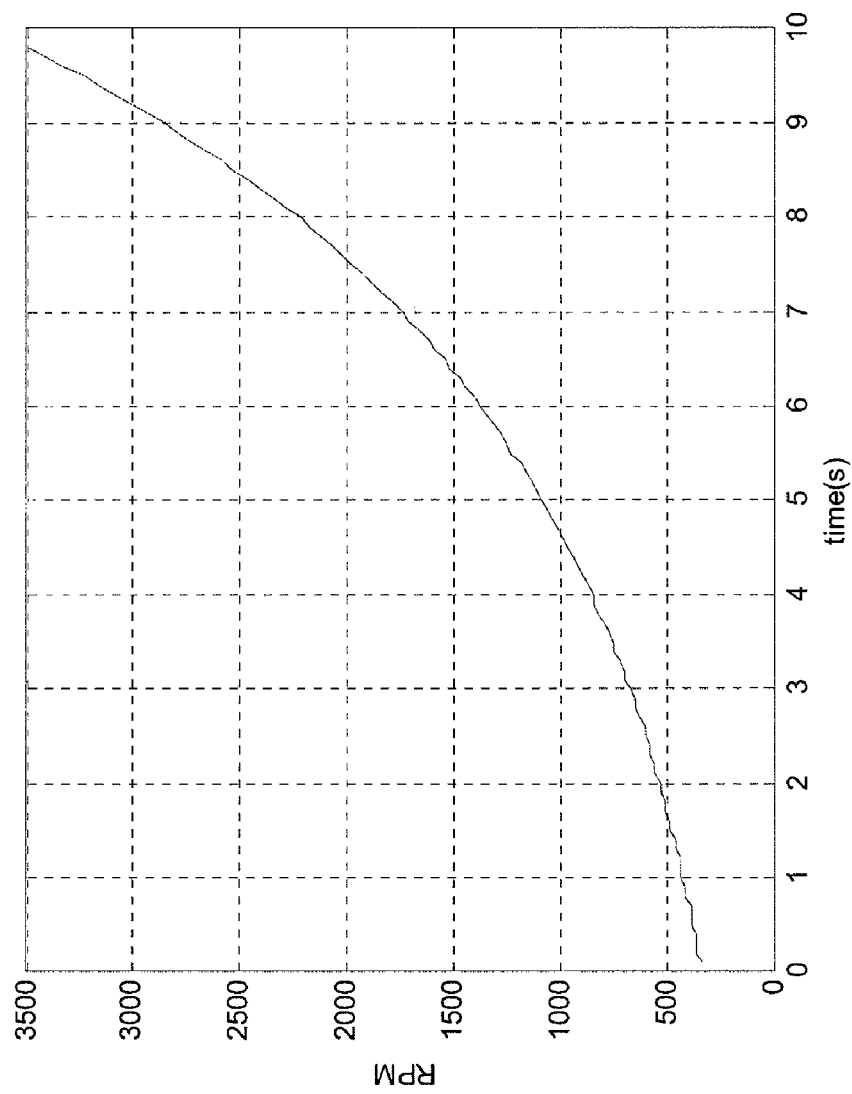
Figure 3E:
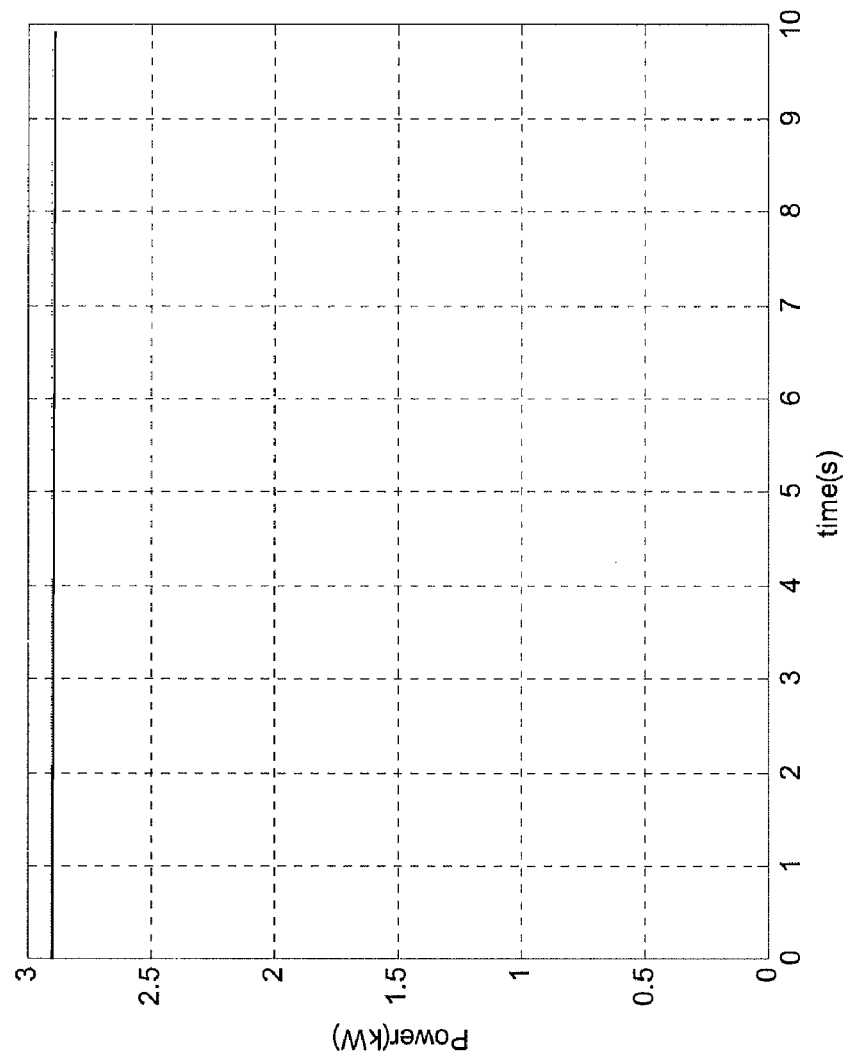

FIGS. 3A-3E are graphical representations of the hydraulic pressure (A), motor torque (B), hydraulic flow rate (C), shaft RPM (D), and generator output power (E) for a single pressure profile for a representative pressure range delivered to the FD hydraulic motor-pump using the system and method of the invention for providing constant power from the widely-varying pressure profile. As shown in FIG. 3A, a pressure profile is depicted for a simulated system using a hydraulic pneumatic accumulator with an initial pressure of 3000 psi. As the compressed gas expands in the accumulator forcing out hydraulic fluid, the pressure falls from 3000 psi to approximately 300 psi. Torque on the output shaft of the hydraulic motor decreases in proportion to the pressure (FIG. 3B), which in all exemplary figures is shown as a 25 cc/rev hydraulic motor. The load on the generator (and, consequently, the mechanical load on the FD hydraulic motor shaft) is decreased by the VFD in proportion to the sensed torque in such a way that flow rate through the FD motor increases as shown in FIG. 3C. Shaft RPM, identical for both the hydraulic and electric machines, increases proportionately as shown in FIG. 3D. In this way, the power output of both the hydraulic motor (which is identical to the output of the electric generator and VFD, assuming zero losses for schematic purposes) is kept nearly constant as a function of time, as shown in FIG. 3E. The output frequency of the electric generator increases in proportion to shaft RPM, but the output frequency of the VFD is constant.

Figure 4A:
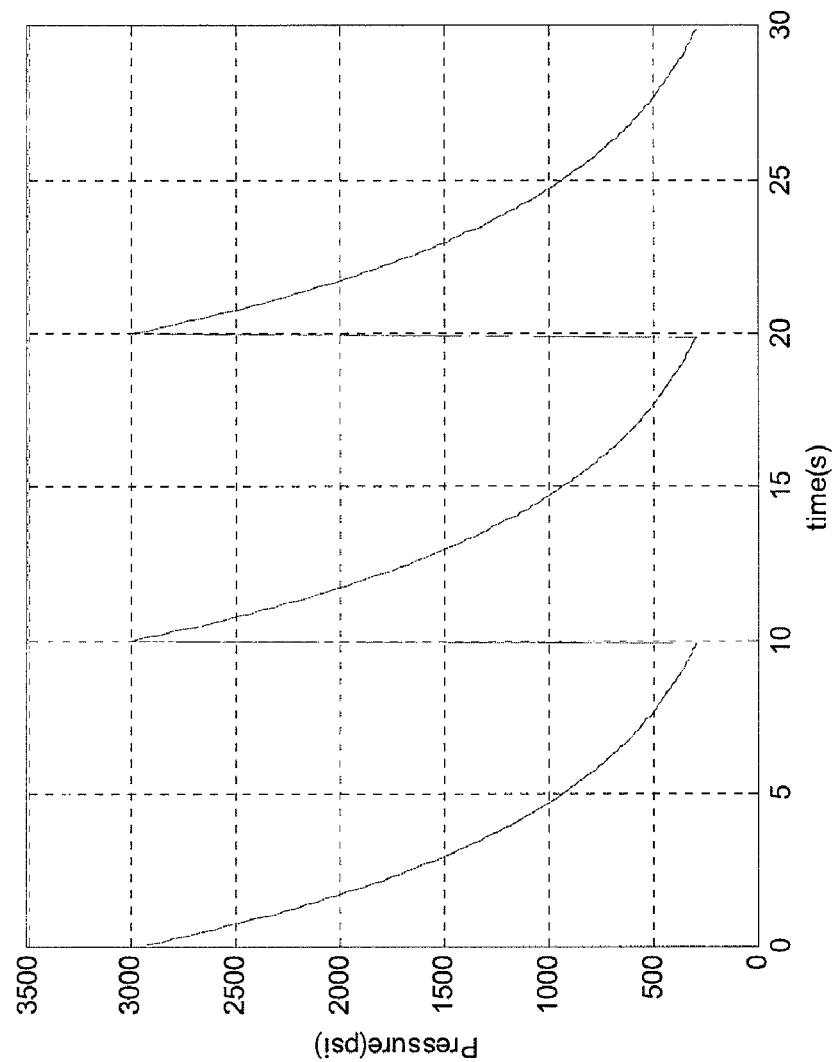
FIGS. 4A-4E are graphical representations of the hydraulic pressure, shaft torque, hydraulic flow rate, hydraulic motor RPM, and motor output power for a series of pressure profiles for an exemplary cyclic operation of the system of FIG. 2.
Figure 4B:
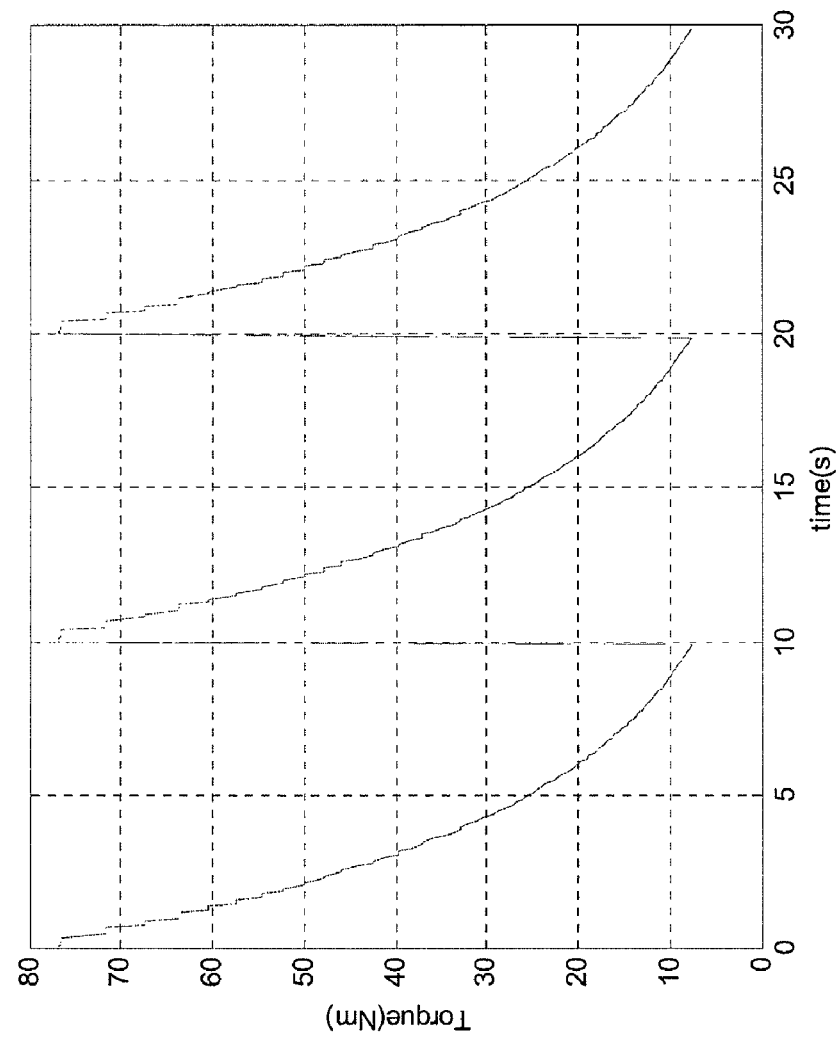
Figure 4C:
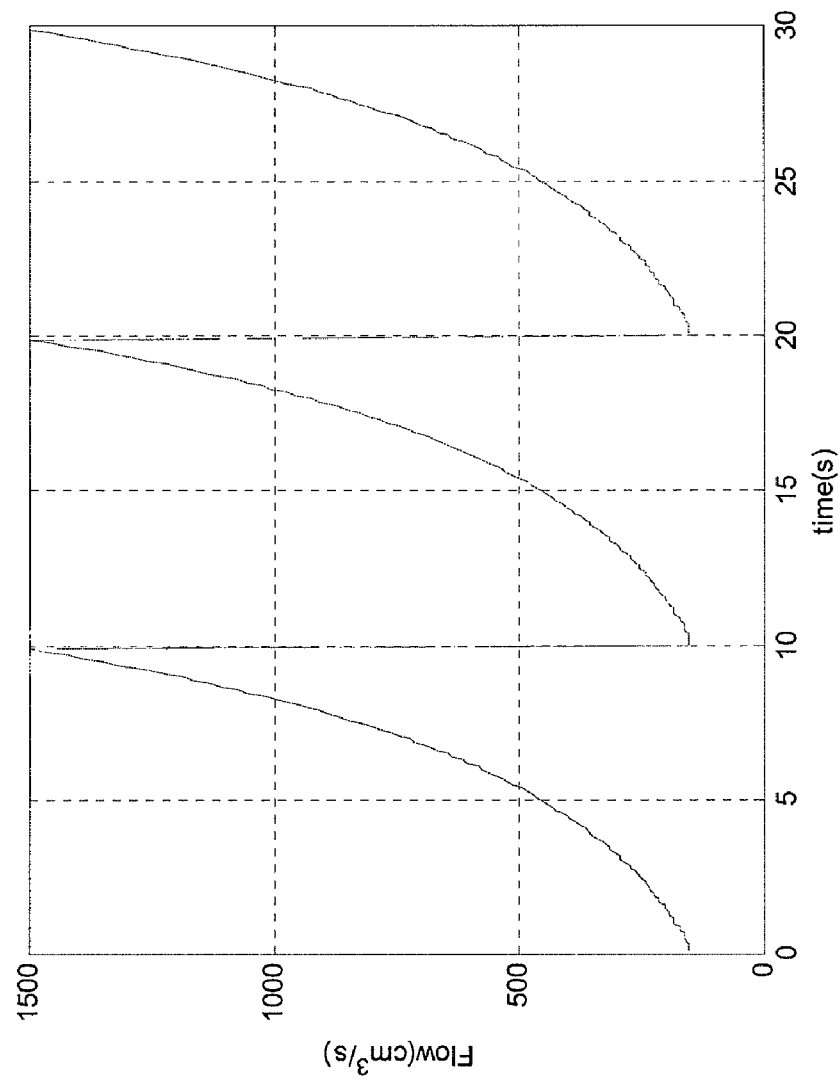
Figure 4D:
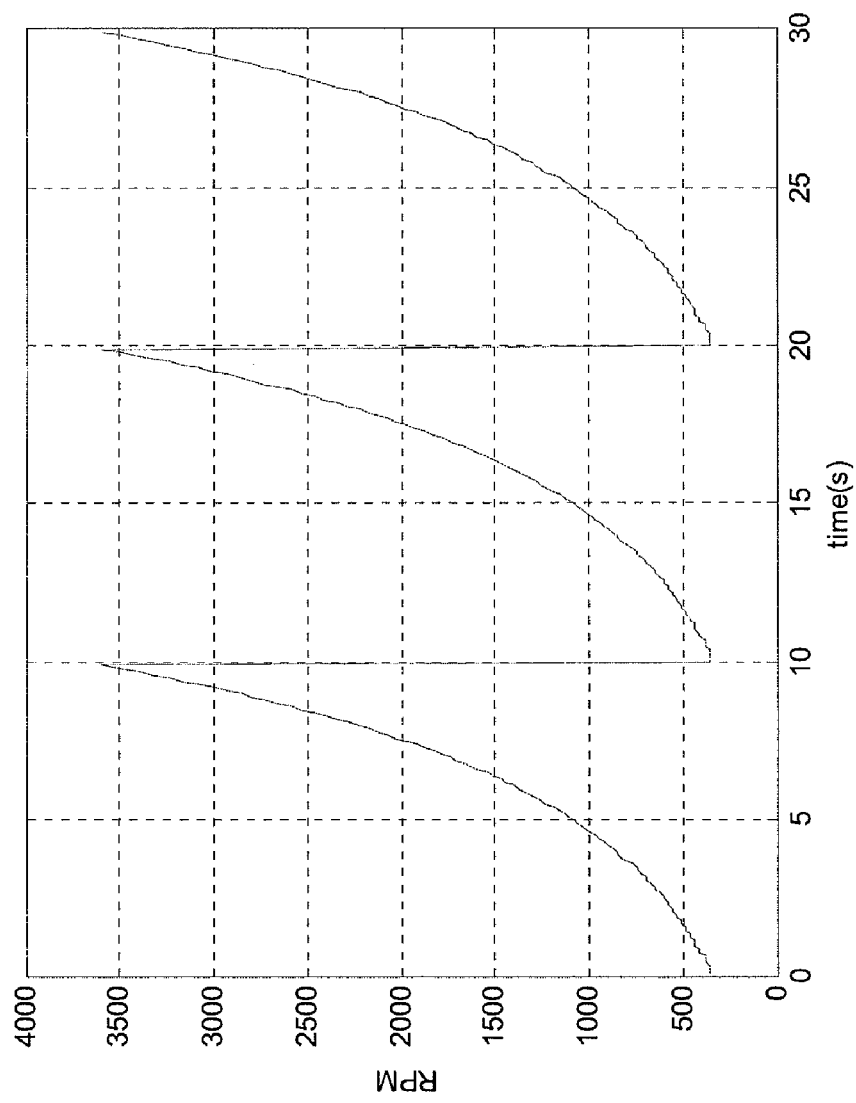
Figure 4E:
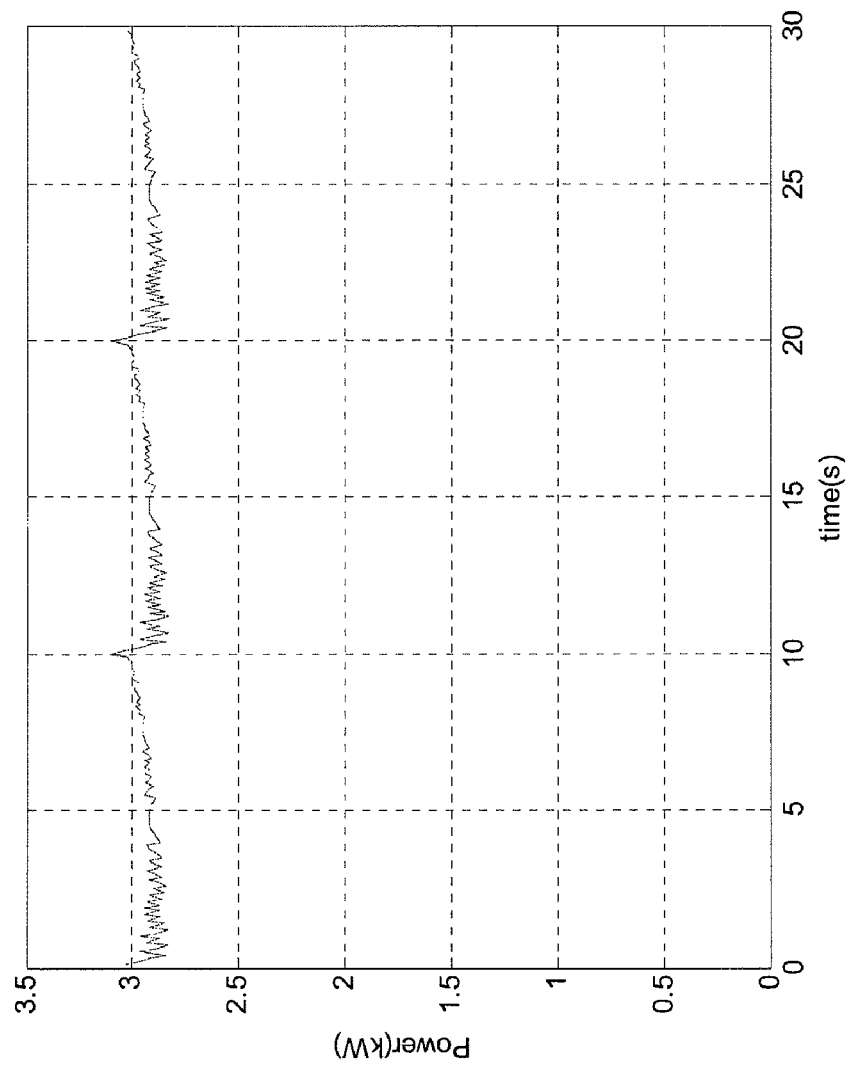

FIGS. 4A-4E are graphical representations of the hydraulic pressure (A), shaft torque (B), hydraulic flow rate (C), hydraulic motor RPM (D), and motor output power (E) for a series of pressure profiles during a cyclic operation of the system of FIG. 2. In FIG. 4A, a set of three cyclical pressure profiles are shown for a simulated process where successive hydraulic pneumatic accumulators are discharged with an initial pressure of 3000 psi. As the compressed gas expands in each successive accumulator forcing out hydraulic fluid, the pressure falls from 3000 psi to approximately 300 psi. As shown in FIG. 4B, for a FD motor, torque decreases with decreasing pressure. The load on the generator (and, consequently, the mechanical load on the FD hydraulic motor shaft) is decreased by the VFD in proportion to the sensed torque in such a way that flow rate through the FD motor increases as shown in FIG. 4C. Shaft RPM, identical for both the hydraulic and electric machines, increases proportionately as shown in FIG. 4D. In this way, power is kept nearly constant as a function of time as shown in FIG. 4E.

Figure 5:
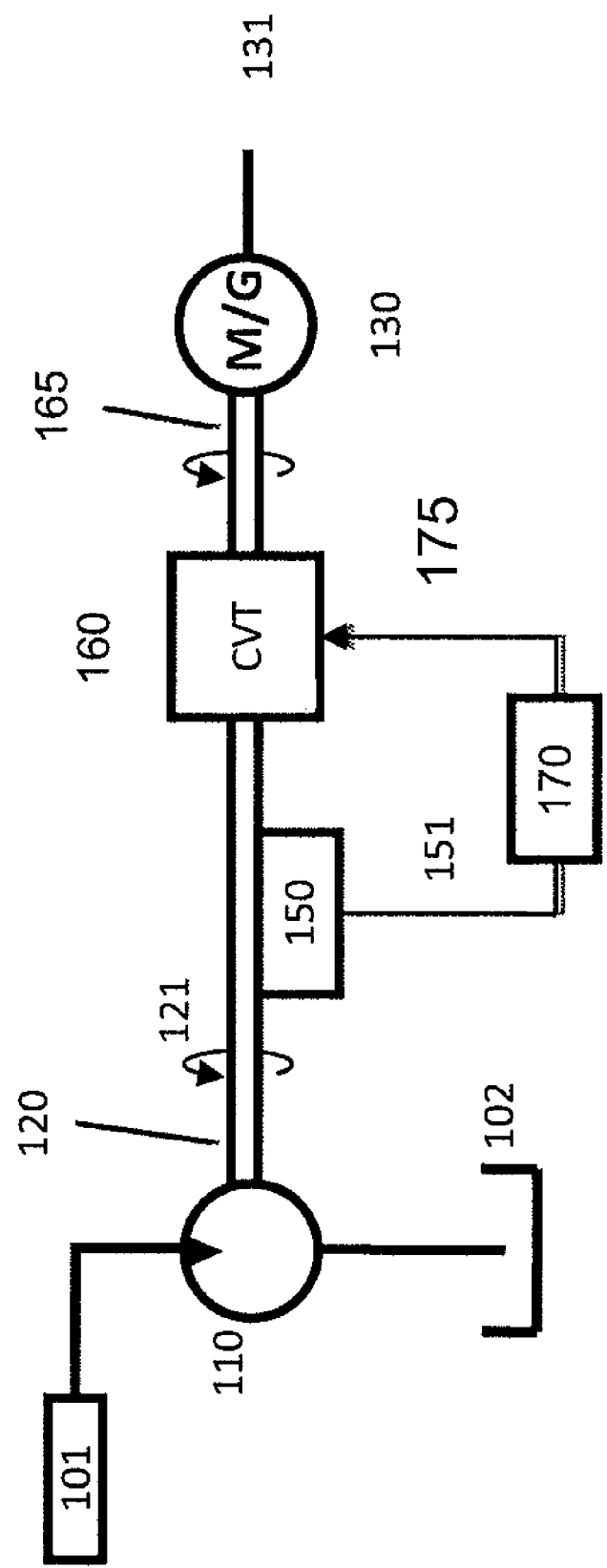
FIG. 5 is a schematic diagram of the major components related to a system and method for providing a constant output from a compressed gas energy storage and recovery system using a fixed displacement hydraulic motor-pump and a continuously variable transmission.

FIG. 5 depicts the major components related to an alternative system and method for providing a constant output (e.g., power, current, voltage, frequency) from a hydraulic-pneumatic energy storage and recovery system using staged hydraulic conversion that provides a widely-varying pressure profile to a FD hydraulic motor-pump by using a closed loop control system and a continuously variable transmission (CVT). The systems and methods of the invention are capable of maintaining constant RPM for the electric generator and so produce constant electric power at a constant frequency.

The major regions illustrated in FIG. 5 include the source of pressurized hydraulic fluid 101, as discussed above, which is driving the FD hydraulic motor 110, providing rotary motion (as indicated by arrow 121) of the output shaft 120. The output shaft 120 drives the CVT 160 whose output shaft 165 drives the electric motor-generator 130 having electric output 131. A torque sensor 150 on the shaft 120 of the FD hydraulic motor 110 communicates information by a channel 151 to a control unit (e.g., a computer) 170. This control unit controls the effective gear ratio of the CVT through a mechanical linkage (or combination of information channel and mechanical linkage) 175. The effective gear ratio of the CVT is adjusted in such a way as to provide constant RPM and torque to the shaft 165 of the electric generator 130. In this illustration, the outlet of the hydraulic motor 110 is at low pressure and is directed to a hydraulic fluid reservoir 102, but as discussed above could be directed back to the source of pressurized hydraulic fluid 101. The output 131 of the electric generator 130 is a sinusoidal voltage having a constant frequency (e.g., 60 Hz) and constant power.

Figure 6A:
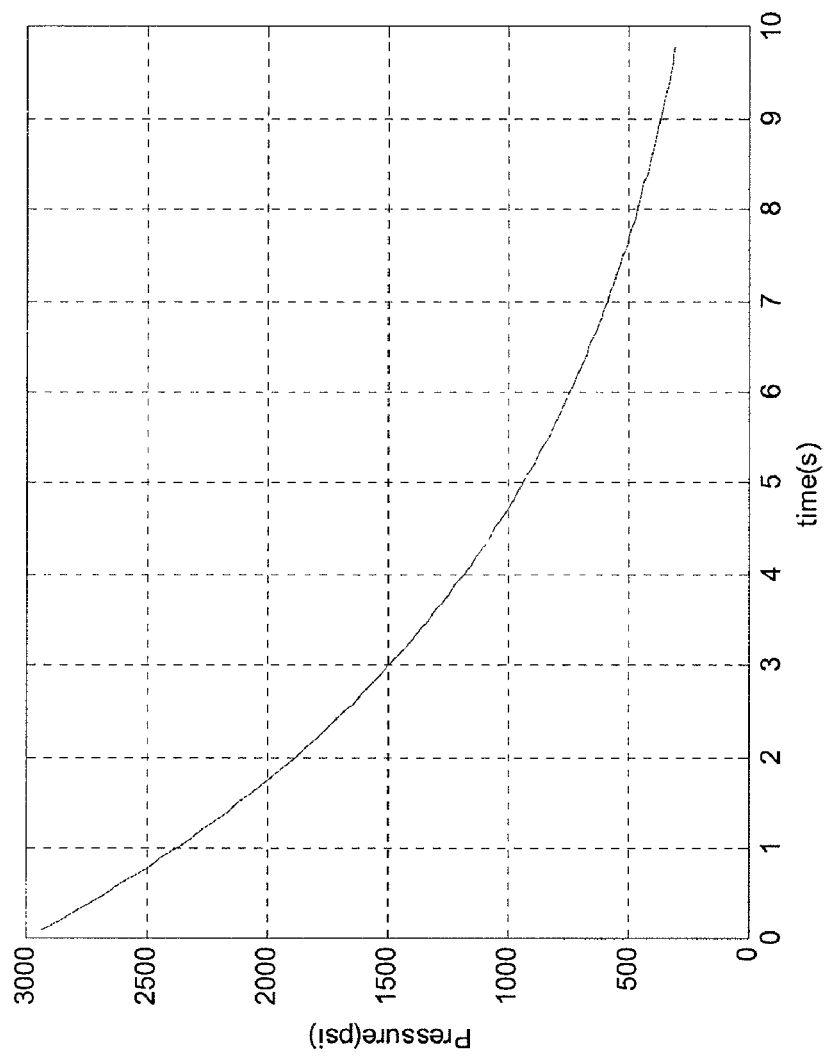
FIGS. 6A-6H are graphical representations of the hydraulic pressure, hydraulic motor torque, hydraulic flow rate, hydraulic motor shaft RPM, generator output power, CVT gear ratio, generator shaft RPM, and generator torque for a single pressure profile for a representative pressure range produced by the system of FIG. 5.
Figure 6B:
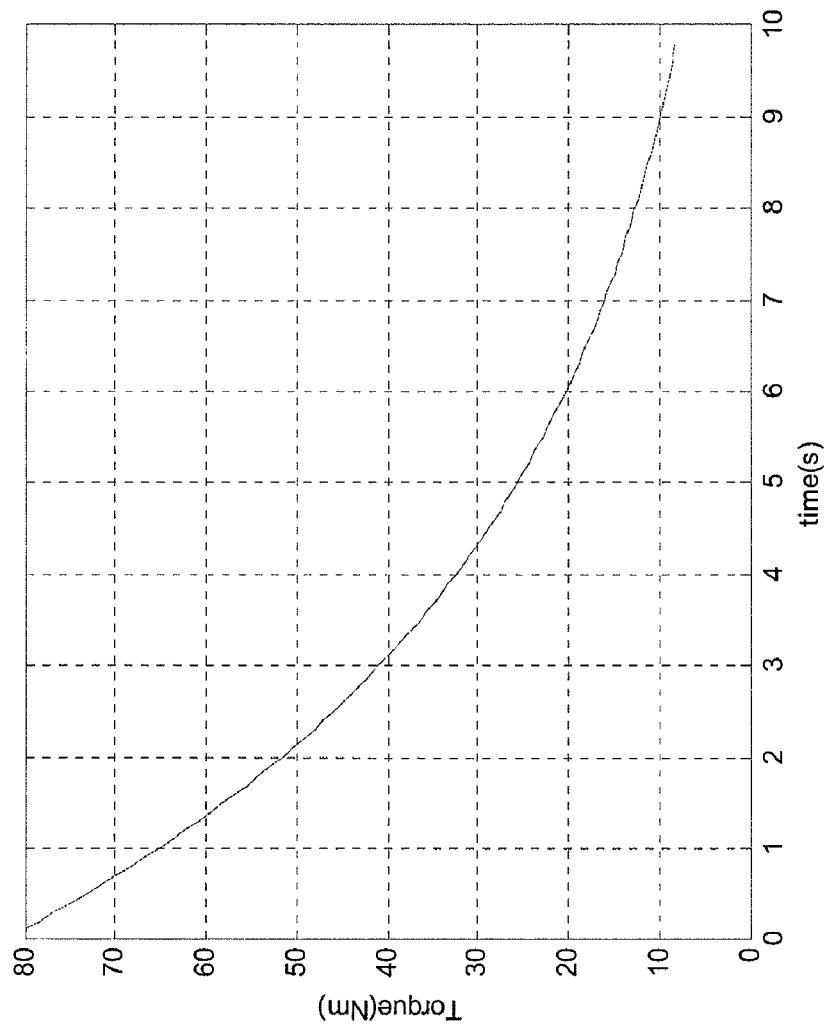
Figure 6C:
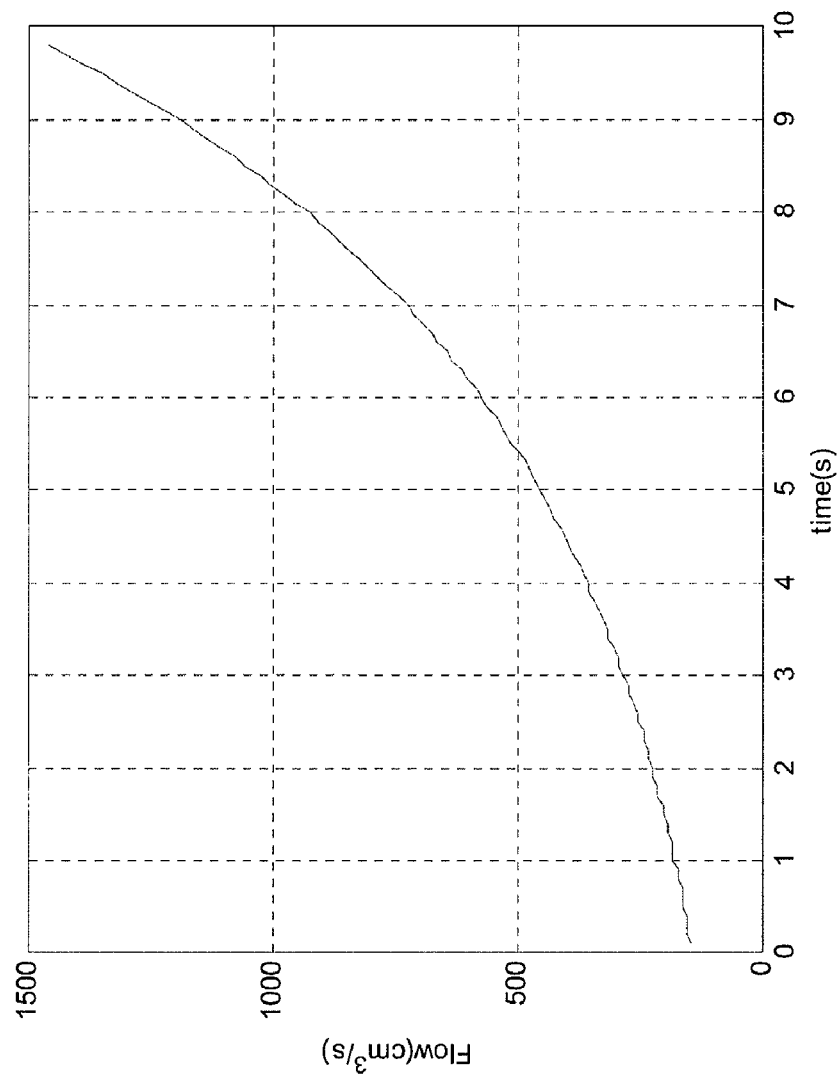
Figure 6D:
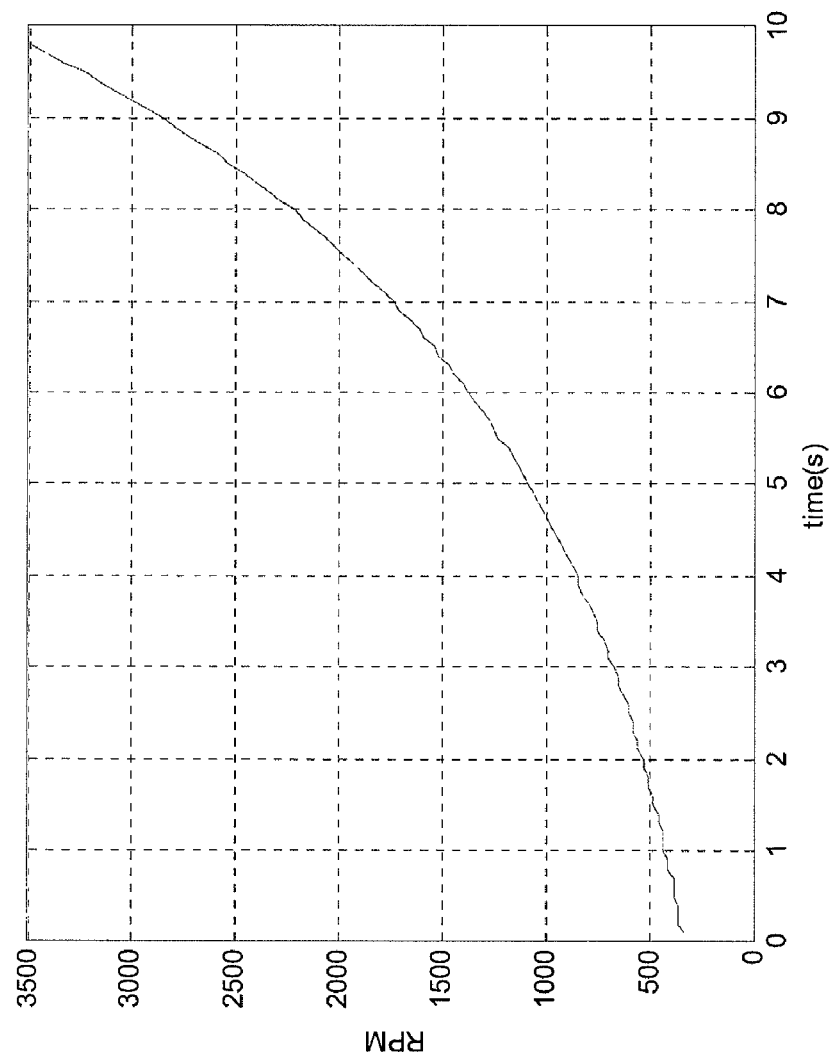
Figure 6E:
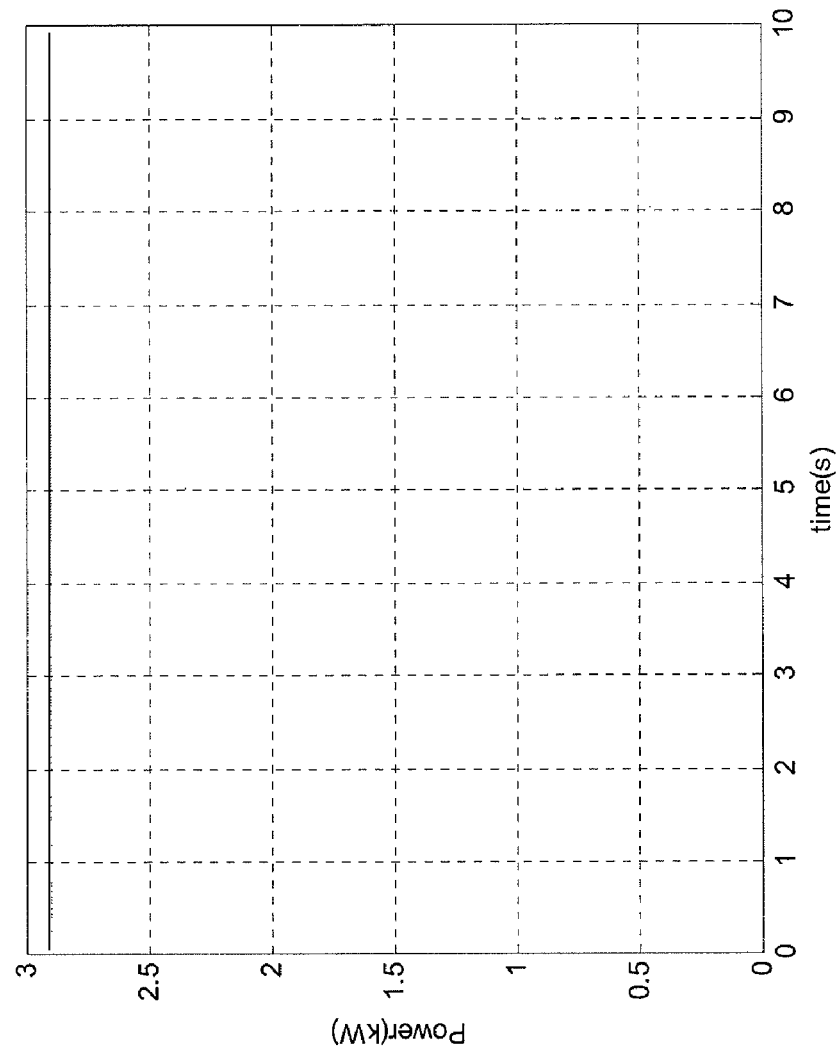
Figure 6F:
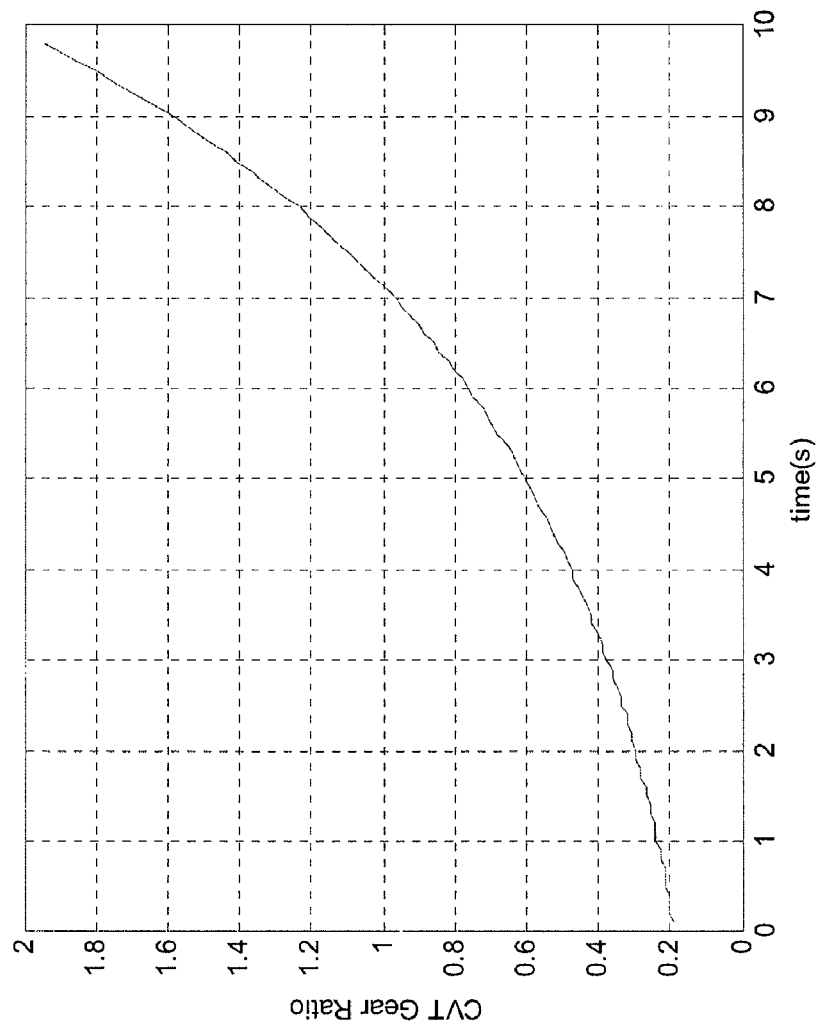
Figure 6G:
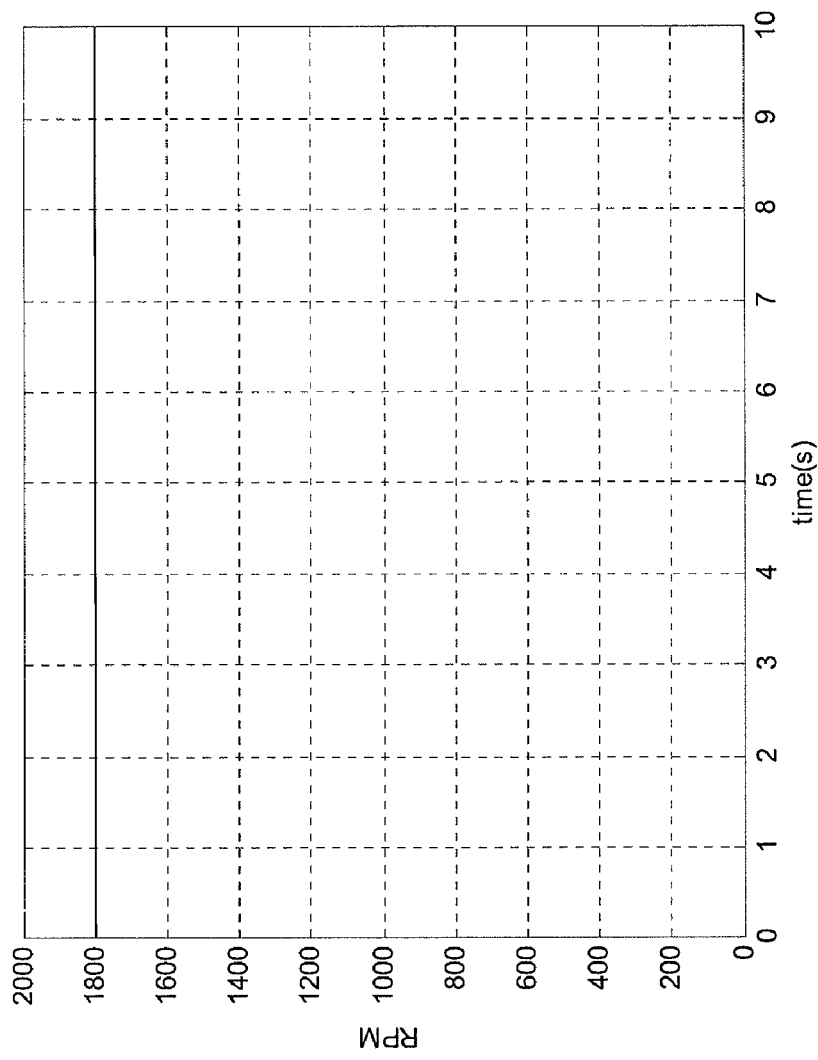
Figure 6H:
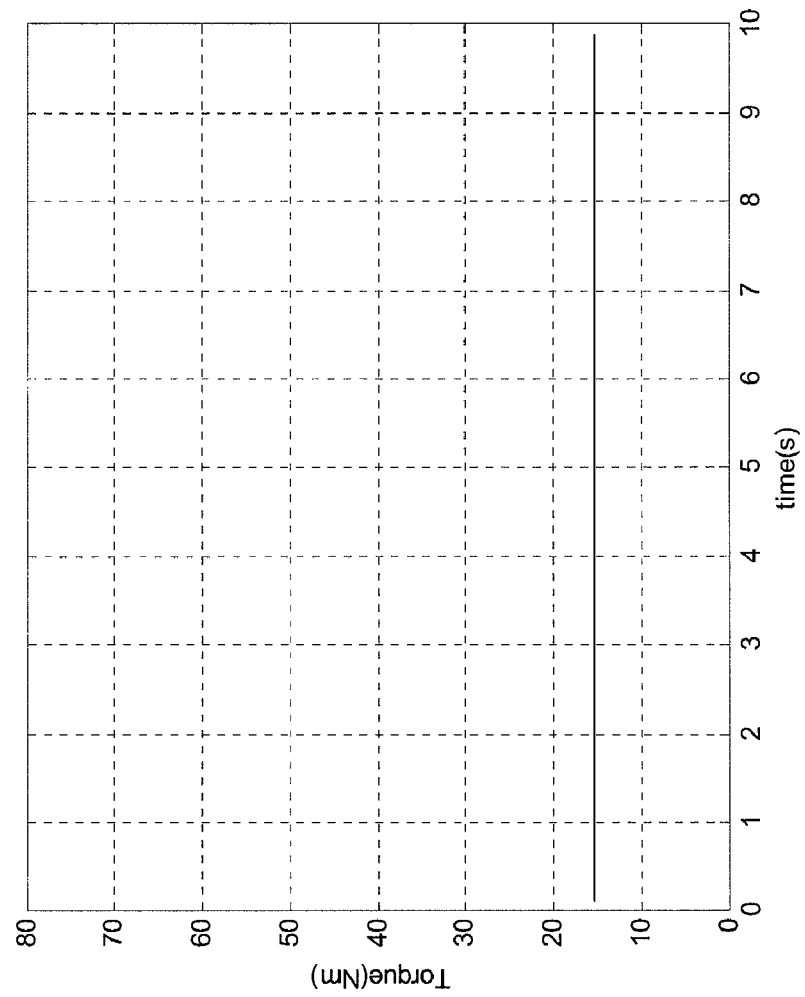

FIGS. 6A-6H are graphical representations of the hydraulic pressure (A), hydraulic motor torque (B), hydraulic flow rate (C), hydraulic motor shaft RPM (D), generator output power (E), CVT gear ratio (F), generator RPM (G), and generator torque (H) for a single pressure profile for a representative pressure range delivered to the fixed hydraulic motor-pump using the system and method of the invention for providing constant power from the widely-varying pressure profile. As shown in FIG. 6A, a pressure profile is depicted for a simulated system using a hydraulic pneumatic accumulator with an initial pressure of 3000 psi. As the compressed gas expands in the accumulator forcing out hydraulic fluid, the pressure falls from 3000 psi to approximately 300 psi. Torque on the output shaft of the hydraulic motor decreases in proportion to the pressure (FIG. 6B). The effective gear ratio of the CVT is adjusted in proportion to torque in such a way that load on the FD hydraulic motor shaft is decreased and the flow rate through the FD motor increases as shown in FIG. 6C. Shaft RPM of the FD hydraulic motor increases proportionately, as shown in FIG. 6D. In this way, the power output of the hydraulic motor is kept nearly constant as a function of time, as shown in FIG. 6E. Shaft RPM (FIG. 6G) and torque (FIG. 6H) on the other side of the CVT, i.e., at the input of the electric generator, remains constant by continuously varying the gear ratio as shown in FIG. 6F. In this way, the output frequency, voltage, current, and power of the electric generator remains nearly constant.

Figure 7A:
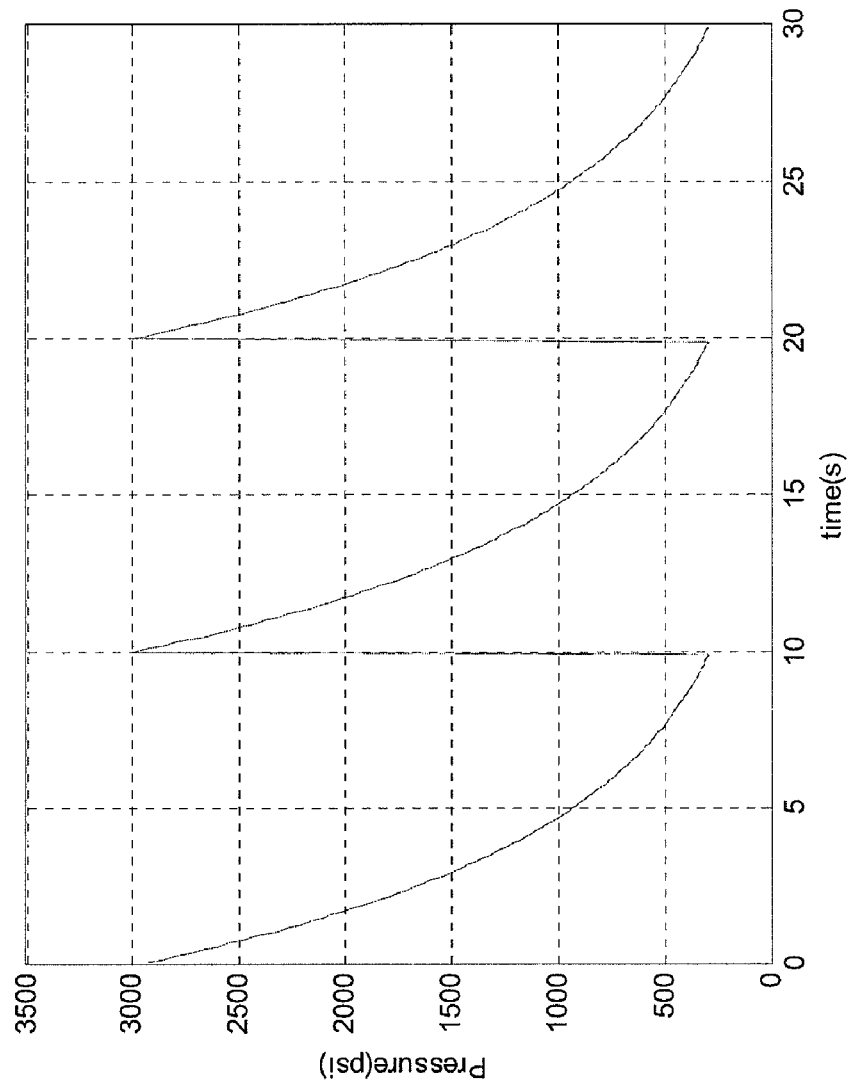
FIGS. 7A-7H are graphical representations of the hydraulic pressure, hydraulic motor torque, hydraulic flow rate, hydraulic motor shaft RPM, generator output power, CVT gear ratio, generator shaft RPM, and generator torque for a series of pressure profiles for an exemplary cyclic operation of the system of FIG. 5.
Figure 7B:
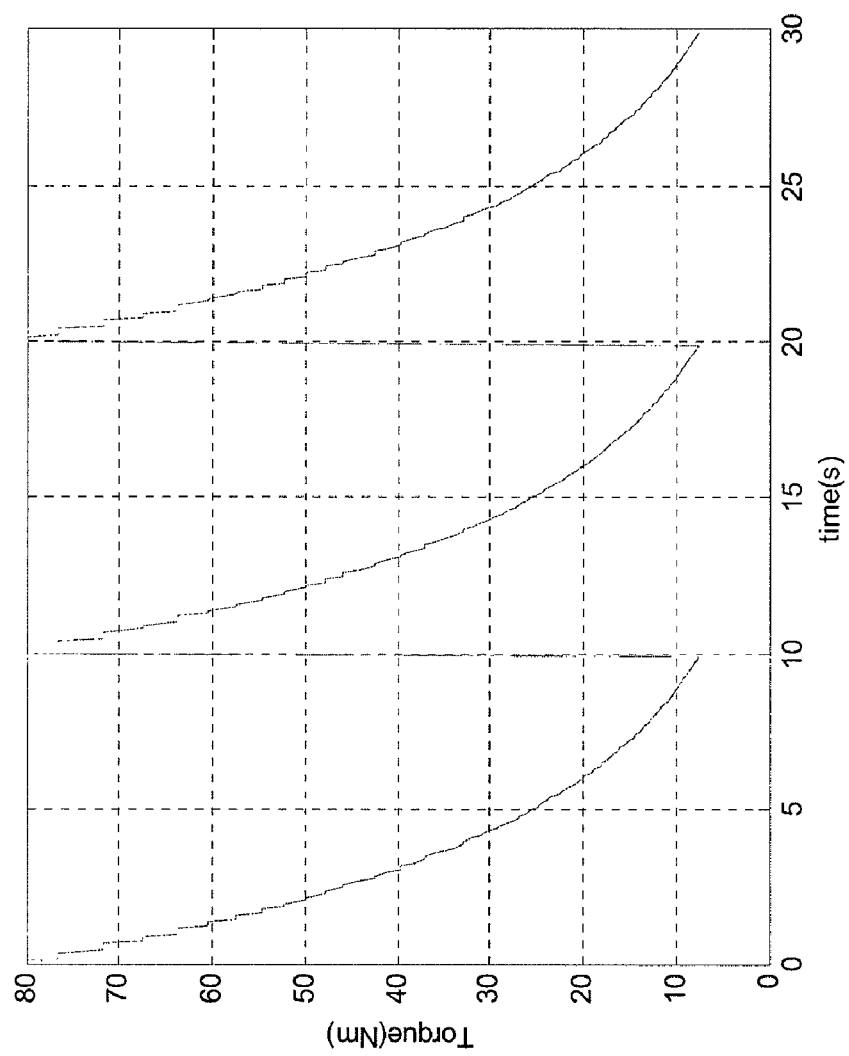
Figure 7C:
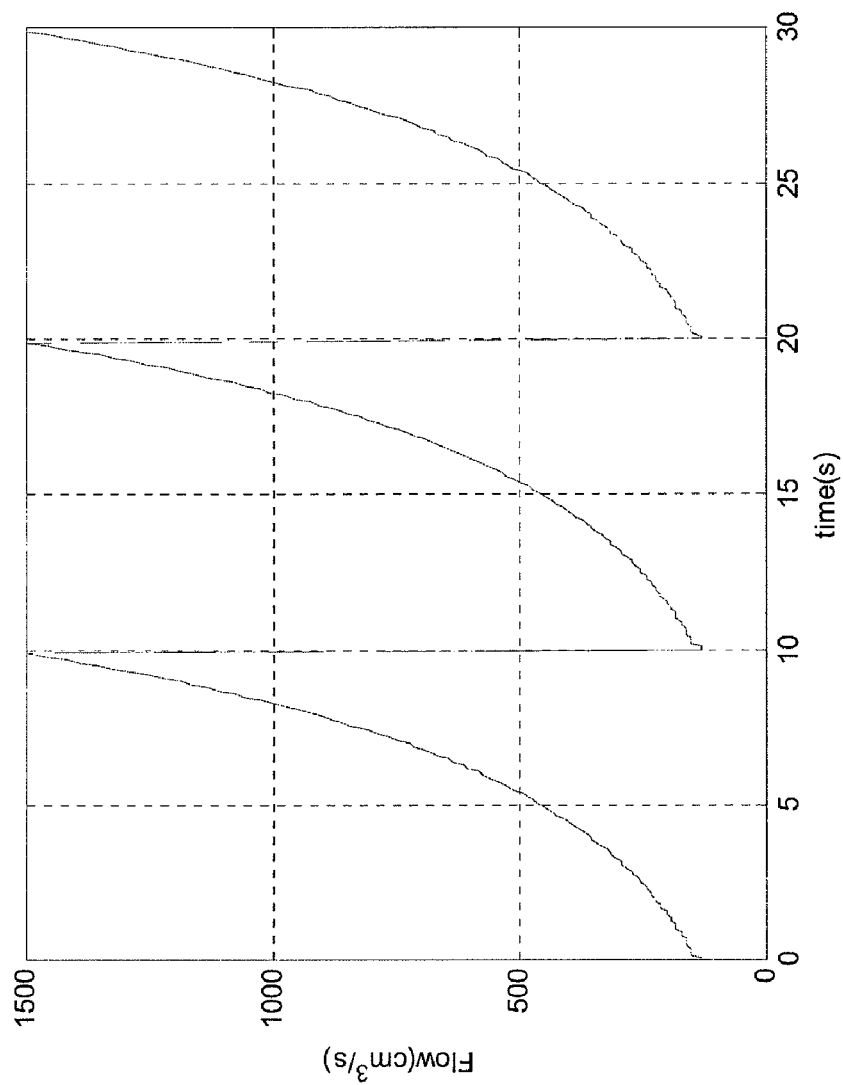
Figure 7D:
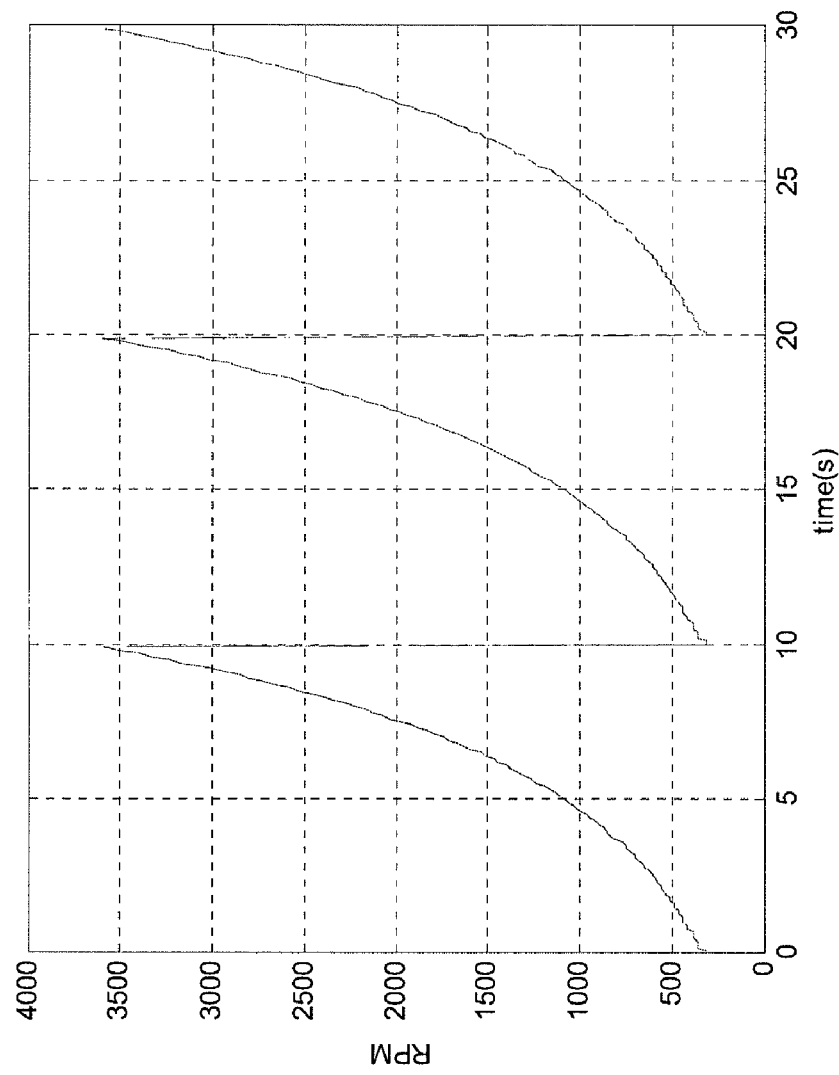
Figure 7E:
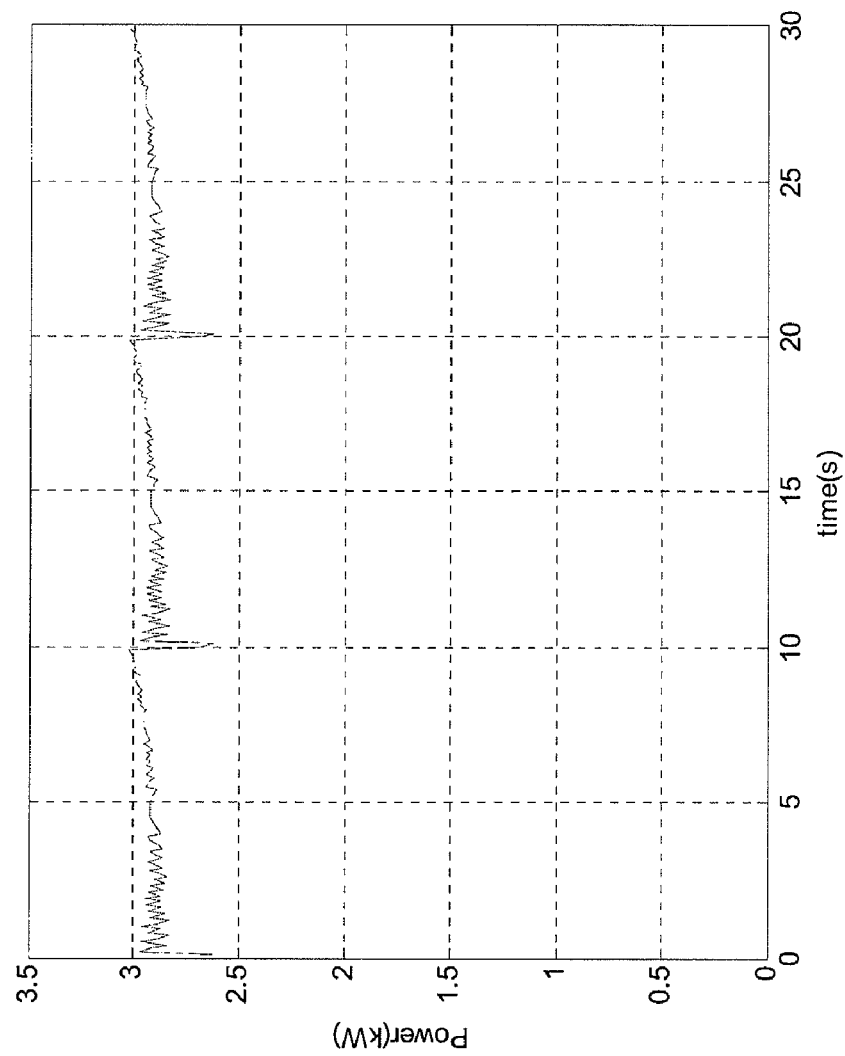
Figure 7F:
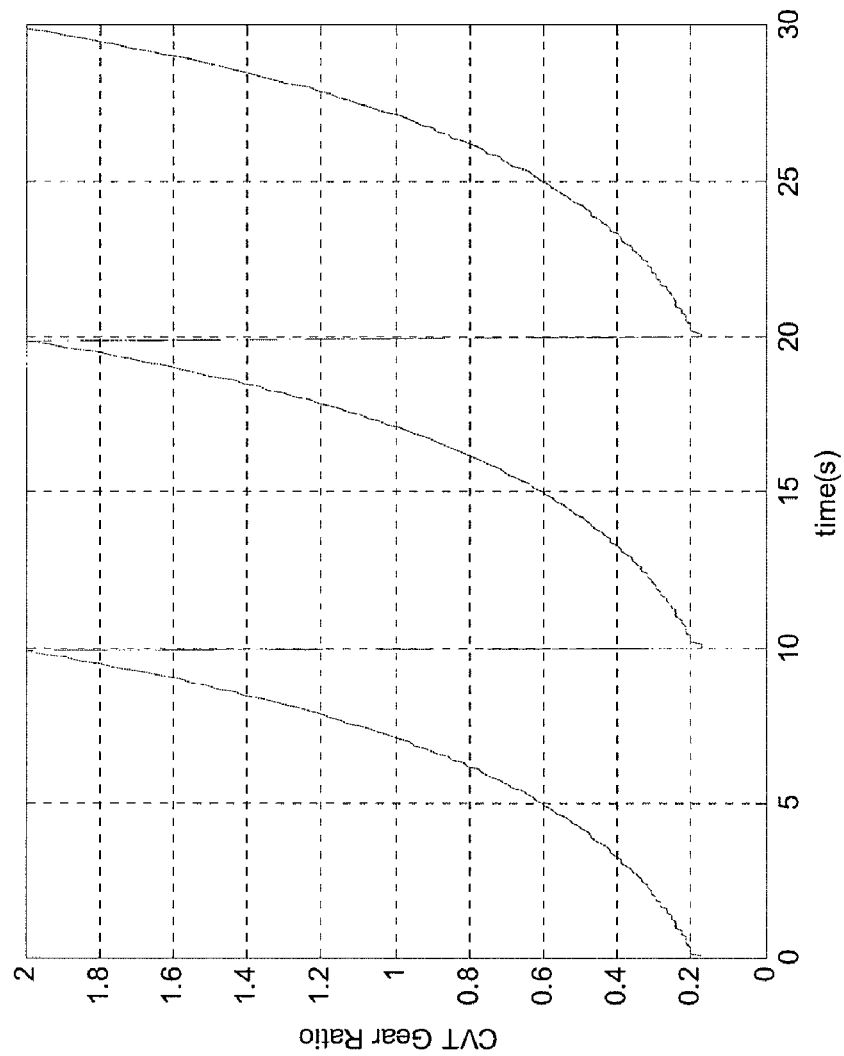
Figure 7G:
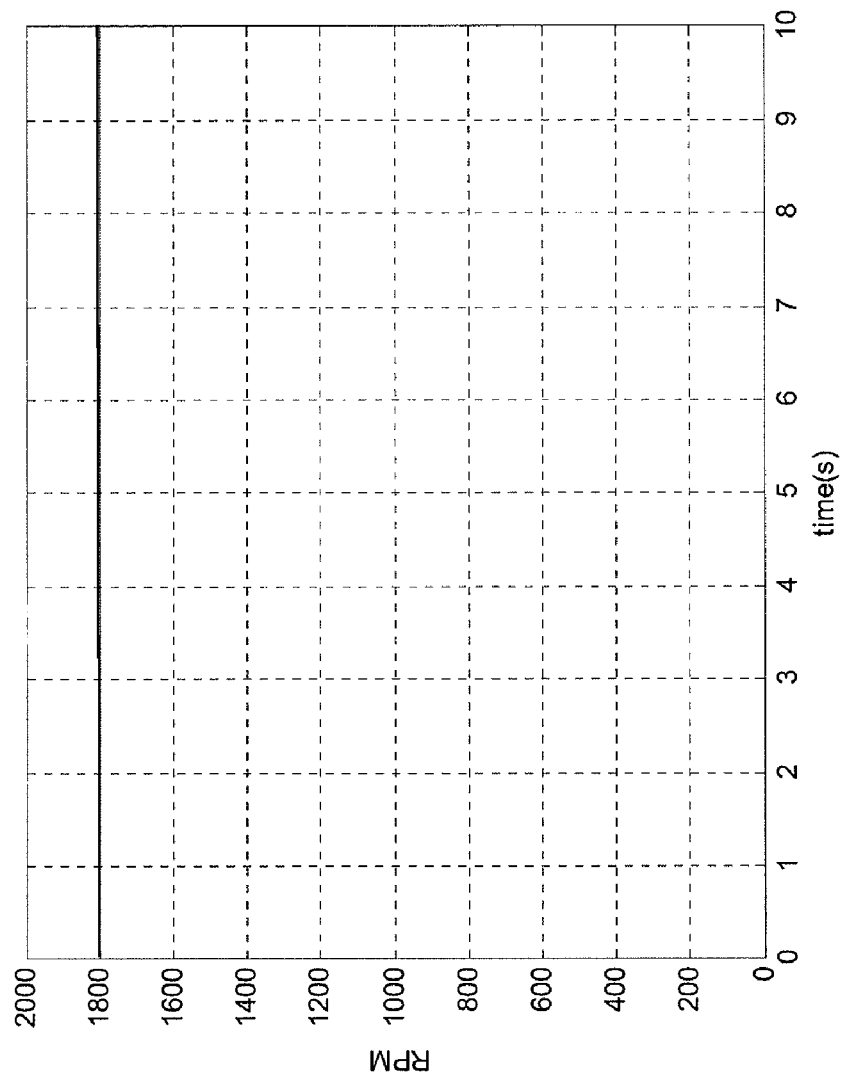
Figure 7H:
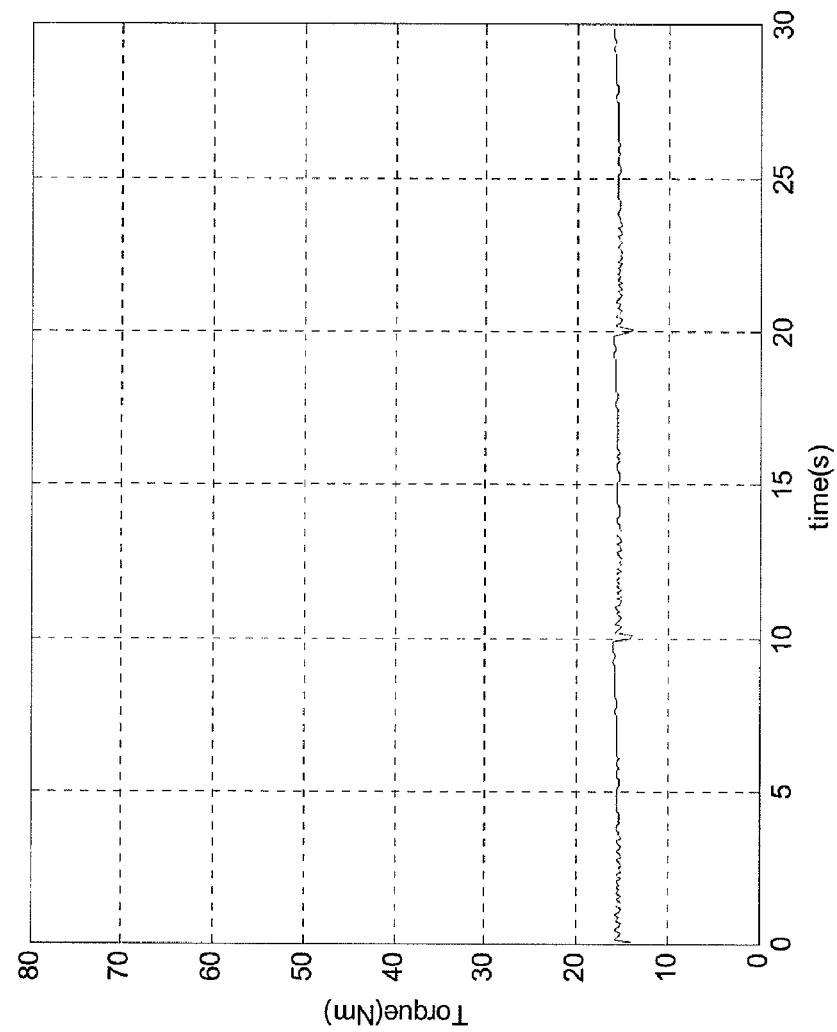

FIGS. 7A-7H are graphical representations of the hydraulic pressure (A), hydraulic flow rate (B), motor RPM (C), hydraulic motor shaft RPM (D), generator output power (E), CVT gear ratio (F), generator RPM (G), and generator torque (H) for a series of pressure profiles generated during a cyclic operation of the system of FIG. 5. In FIG. 7A, a set of three cyclical pressure profiles are shown for the simulated process where successive hydraulic pneumatic accumulators are discharged with an initial pressure of 3000 psi. As the compressed gas expands in each successive accumulator forcing out hydraulic fluid, the pressure falls from 3000 psi to approximately 300 psi. Torque on the output shaft of the hydraulic motor decreases in proportion to the pressure (FIG. 7B). The effective gear ratio of the CVT is adjusted in proportion to torque in such a way that load on the FD hydraulic motor shaft is decreased and the flow rate through the FD motor increases as shown in FIG. 7C. Shaft RPM of the FD hydraulic motor increases proportionately as shown in FIG. 7D. In this way, the power output of both the hydraulic motor and electric generator is kept nearly constant as a function of time, as shown in FIG. 7E. Shaft RPM (FIG. 7G) and torque (FIG. 7H) on the other side of the CVT, i.e. at the input of the electric generator, remains constant by continuously varying the gear ratio as shown in FIG. 7F. In this way, the output frequency, voltage, current, and power of the electric generator are kept nearly constant as a function of time.

Figure 8:
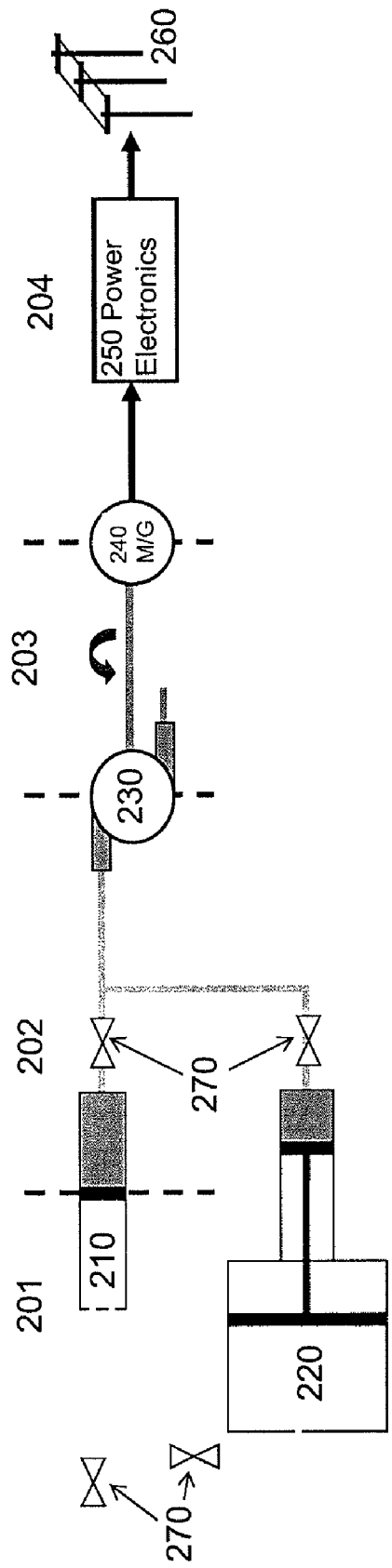
FIG. 8 is a schematic diagram of the major components related to conversion efficiency for a compressed air energy storage and recovery system using staged hydraulic conversion.

FIG. 8 depicts generally the major components for improving conversion efficiency of compressed air energy storage using staged hydraulic conversion and the four major energy conversion stages. The major regions illustrated in FIG. 8 include compressed gas energy 201, which is converted to hydraulic energy 202 via a pneumatic to hydraulic device, such as an accumulator 210 or intensifier 220, with the pneumatic to hydraulic pressure ratio determined by relative piston sizing and selected based on pressure levels and actuation of valves 270 as, for example, described in the above-incorporated patent applications. The dashed line separating compressed gas energy 201 and hydraulic energy 202 represents a transition between energy types and thus has an associated efficiency—compressed gas potential energy to work done by the hydraulic fluid. Optimization of this efficiency, in part through the use of near isothermal expansion and compression, is also discussed in the above incorporated patent applications.

The pressurized hydraulic fluid in region 202 is driven by or used to drive a hydraulic motor-pump 230, converting the work performed by or on the fluid to or from mechanical energy 203 typically in the form of a rotating drive shaft. This transition, indicated by the dashed line separating hydraulic energy 202 and mechanical energy 203, represents the hydraulic to mechanical conversion efficiency and is dependent in part on the efficiency characteristics of the hydraulic motor-pump 230, which vary with pressure/torque and flow/RPM. In practice, this drive shaft will be connected to an electric motor-generator 240, which converts the mechanical energy 203 to electrical energy 204. This transition, indicated by the dashed line separating mechanical energy 203 and electrical energy 204, represents the mechanical to electrical conversion efficiency and is dependent in part on the efficiency characteristics of the electric motor-generator 240, which vary with torque and RPM.

Typically, this electrical motor-generator 240 will be further connected to power electronics 250 to condition the electrical motor-generator 240 input/output power to the power supply 260 (e.g., an electrical power grid). The effect of the addition of power electronics 250 here is included in overall mechanical to final electrical efficiency. As proposed in FIGS. 10 and 11, direct operation of the electric motor-generator 250 from the power supply 260 can improve overall efficiency by removing any inefficiency from the addition of power electronics 250.

Figure 9:
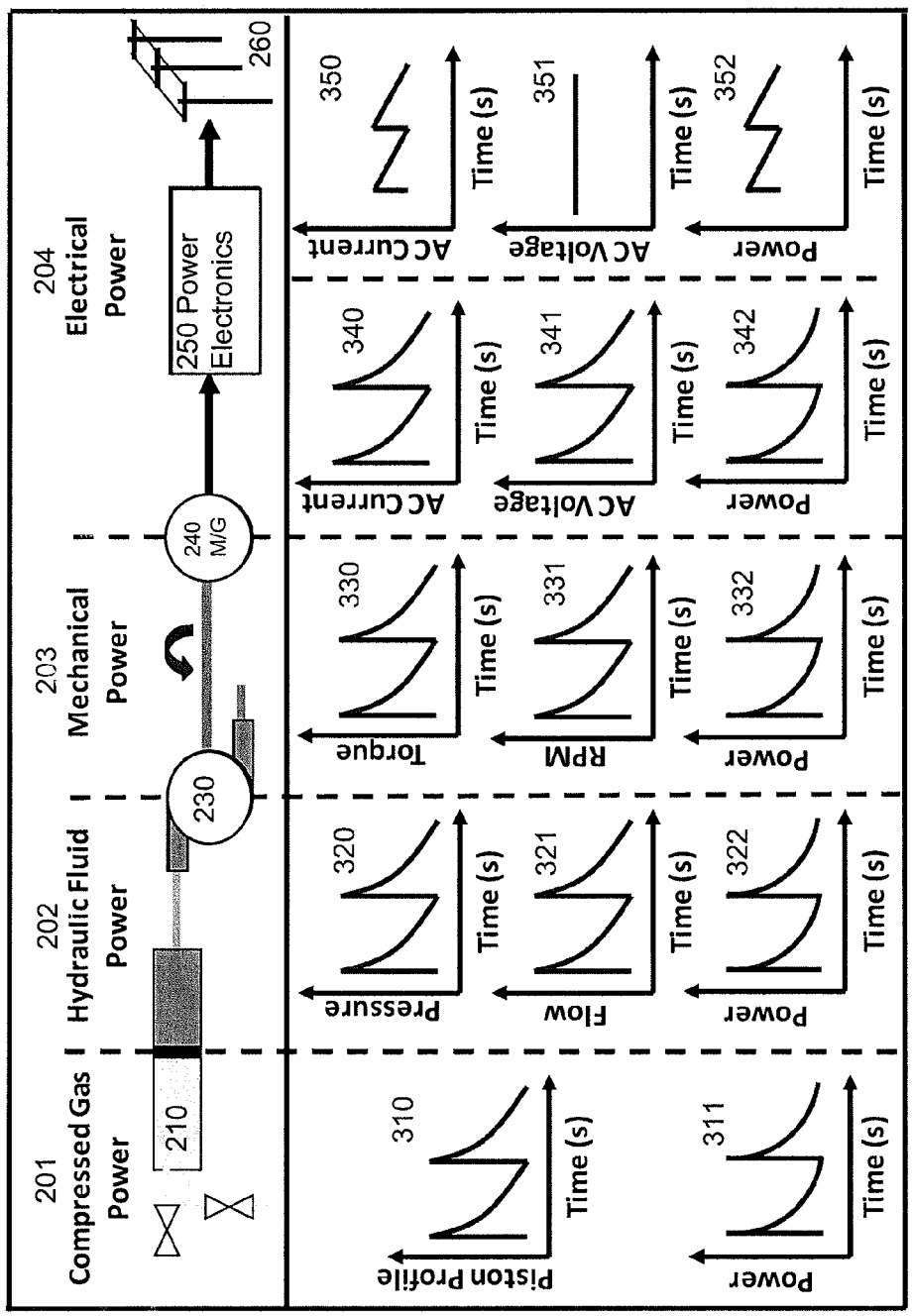
FIG. 9 is a schematic diagram of the major components related to conversion efficiency for a compressed air energy storage and recovery system using staged hydraulic conversion, where a fixed displacement hydraulic motor-pump is used, including graphic representations of the various operational parameters, such as piston profile, power, pressure, flow, torque, RPM, current and voltage versus time for various stages or operation.

FIG. 9 depicts generally the major components related to conversion efficiency for compressed air energy storage using staged hydraulic conversion, where a FD hydraulic motor-pump 230 is used. FIG. 9 illustrates the four major energy conversion stages discussed above (compressed gas energy 201, hydraulic energy 202, mechanical energy 203, and electrical energy 204). In addition, FIG. 9 graphically depicts the various operational parameters of the system, such as piston position, power, pressure, flow, torque, RPM, current and voltage versus time for those stages. It should be noted that for simplicity of description, the case of expansion (compressed air energy storage and recovery system discharge) is displayed and described for the graphs in FIG. 9, but the case of compression (system charging) can be imagined by reversing the time axis on the various plots.

Starting in compressed gas energy 201 region, a set amount of compressed gas is admitted and then expanded in a pneumatic hydraulic device such as the accumulator 210 driving hydraulic fluid through hydraulic motor-pump 230. The hydraulic fluid pressure (directly related to compressed gas pressure) falls as a function of time as indicated in the first half of graph 320. For all graphs, two expansions are shown for the time scale. At the mid-point in time, a second pneumatic hydraulic device such as the intensifier 220 admits and expands a fixed amount of compressed gas. For a FD hydraulic motor 230, the flow rate will tend to drop with pressure as indicated in graph 321, with a fixed load. Piston speed in the accumulator 210 changes with flow rate, and thus piston position is related in an integral fashion to flow rate as indicated in graph 310. As hydraulic power is pressure times flow rate, power drops as a function of time as the product of graph 320 and graph 321 as indicated in graph 322. For FD hydraulic motor 230, output torque is related to pressure, graph 320, as indicated in graph 330, and hydraulic motor output RPM is related to flow graph 321 as indicated in graph 331. Similarly, converting mechanical 203 to electrical 204 power, motor-generator 240 current is related to torque graph 330 as indicated in graph 340, and thus also tracks with pressure. Electric motor-generator 240 voltage is related to RPM graph 331 as indicated in graph 341. Power in each stage: compressed gas energy 201, hydraulic energy 202, mechanical energy 203, and electrical energy 204, are closely related, scaled by efficiencies of conversions, and fall with time.

Power electronics 250 can be used to transform voltage to a constant value as a function of time for a final power supply 260 (e.g. for use on the power grid), as indicated in graph 351. Additionally, short-term energy storage devices such as ultracapacitors can be used with the power electronics to smooth current, graph 350, and power supply, graph 352, as a function of time. This addition of power electronics and potentially short-term energy storage adds cost and complexity to the energy storage and recovery system, while adding additional electric conversion losses, potentially decreasing overall system efficiency. Additionally, efficiency of both the FD hydraulic motor-pump 230 and electric motor-generator 240 are dependent on operating torque and RPM, and thus when varied over a large range as indicated in graph 330 and graph 331 both may suffer lower efficiencies over the course of a full expansion than if operated over a narrow or fixed range of torque and RPM. As discussed with respect to FIGS. 2-7, near constant torque and RPM can be achieved by using a VFD or CVT. However, it is also possible to achieve constant power output by using a VD hydraulic motor-pump as discussed with respect to FIG. 11.

Figure 10:
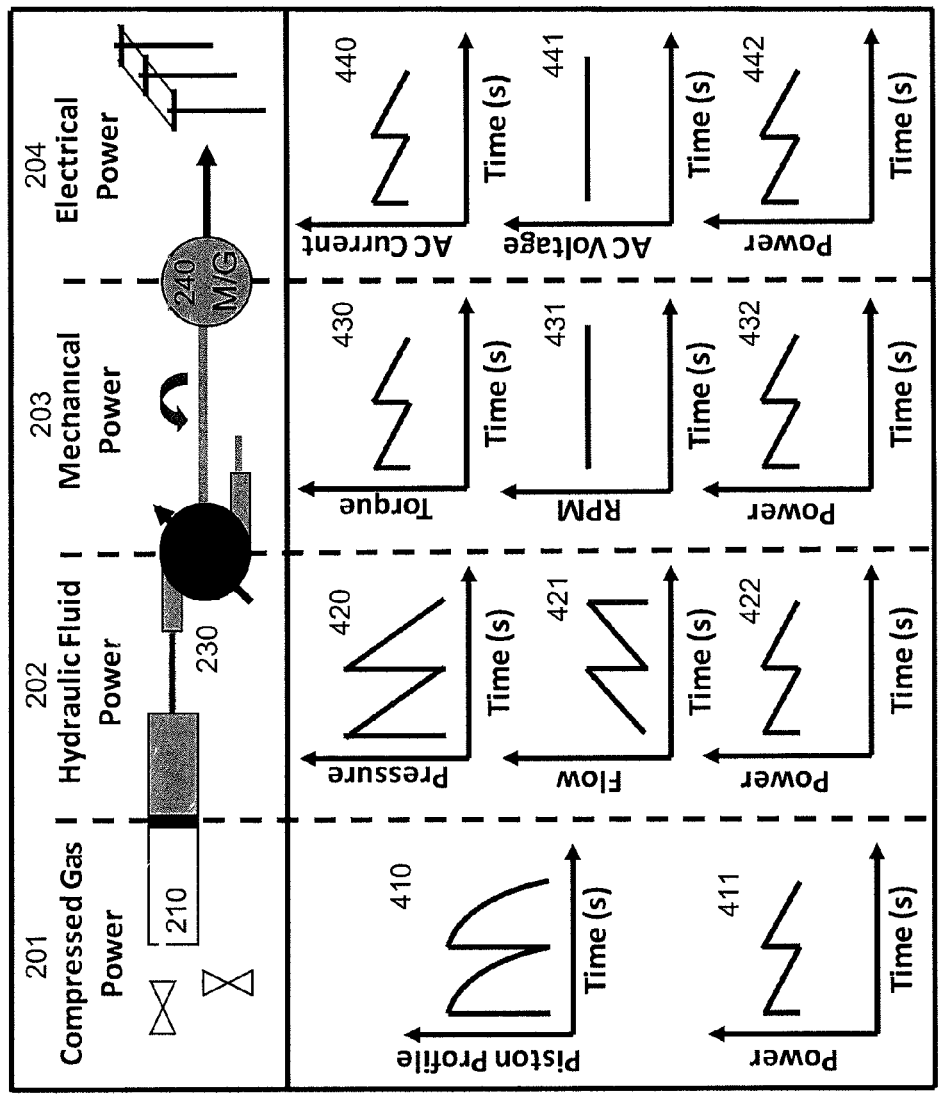
FIG. 10 is a schematic diagram of the major components related to conversion efficiency for a compressed air energy storage and recovery system using staged hydraulic conversion, where a variable displacement hydraulic motor-pump and non-optimized control scheme is used, including graphic representations of the various operational parameters, such as piston position, power, pressure, flow, torque, RPM, current and voltage versus time for the various stages.

FIG. 10 depicts generally the major components related to conversion efficiency for compressed air energy storage using staged hydraulic conversion, where a VD hydraulic motor-pump 230 is used. The use of the VD hydraulic motor-pump improves the conversion efficiency of the hydraulic-pneumatic energy storage and recovery system and allows a user to achieve near constant expansion or compression power in the system, while maintaining near constant RPM or torque at the shaft of an electric motor-generator. FIG. 10 illustrates the four major energy conversion stages discussed above (compressed gas energy 201, hydraulic energy 202, mechanical energy 203, and electrical energy 204). In addition, FIG. 10 graphically depicts the various operational parameters of the system, such as piston position, power, pressure, flow, torque, RPM, current and voltage versus time for those regions. It should be noted that for simplicity of description, the case of expansion (compressed air energy storage and recovery system discharge) is displayed and described for the graphs in FIG. 10, but the case of compression (system charging) can be imagined by reversing the time axis on the various plots.

Starting in the compressed gas energy 201 stage, a set amount of compressed gas is admitted and then expanded in a pneumatic hydraulic device such as the accumulator 210 driving hydraulic fluid through the hydraulic motor-pump 230. The hydraulic fluid pressure (directly related to compressed gas pressure) falls as a function of time as indicated in the first half of graph 420. For all graphs, two expansions are shown for the time scale. At the mid-point in time, a second pneumatic hydraulic device such as intensifier 220 admits and expands a fixed amount of compressed gas. For a VD hydraulic motor-pump 230, the flow rate is controlled by both by the RPM and the displacement per revolution of the motor.

The displacement per revolution of the motor can be controlled in a VD motor-pump. By using pressure, piston position, power, or other current operational information, the flow rate can be set in such a way as to increase with decreasing pressure as shown in graph 421, by increasing the displacement per revolution. In this instance, a control system is implemented to maintain a nearly constant RPM as indicated in graph 431. Piston speed in accumulator 210 changes with flow rate, and thus piston position is related in an integral fashion to flow rate as indicated in graph 410. As hydraulic power is pressure times flow rate, power varies as a function of time as the product of graph 420 and graph 421 as indicated in graph 422. For the VD hydraulic motor-pump 230, hydraulic motor-pump output torque is related to pressure, graph 420, times the displacement as a function of time (a fixed RPM displacement has the same curve as flow as shown in graph 421) as indicated in graph 430. Hydraulic motor-pump 230 output RPM is related to flow graph 421 as indicated in graph 431.

Similarly, converting mechanical energy 203 to electrical energy 204, electric motor-generator 240 current is related to torque graph 430 as indicated in graph 440. Electric motor-generator 240 voltage is related to RPM graph 431 as indicated in graph 441. Power in each compressed gas energy 201, hydraulic energy 202, mechanical energy 203, and electrical energy 204 stages is closely related, scaled by efficiencies of conversions, and fall with time. By maintaining a constant RPM via control of the VD hydraulic motor, output voltage from the electric motor-generator 240 can be matched to the required output, such as the electrical grid power. By matching voltage and frequency with the desired output, power electronics 250 can be removed from the system, saving substantial system costs. Short-term energy storage devices, such as ultracapacitors, could be used to smooth current 440 and power output 442 as a function of time. As the efficiency of the electric motor-generator 240 is dependent on operating torque and RPM, by limiting the variation in torque and RPM to operation operated over a narrow or fixed range, mechanical to electrical conversion can be increased.

Figure 11:
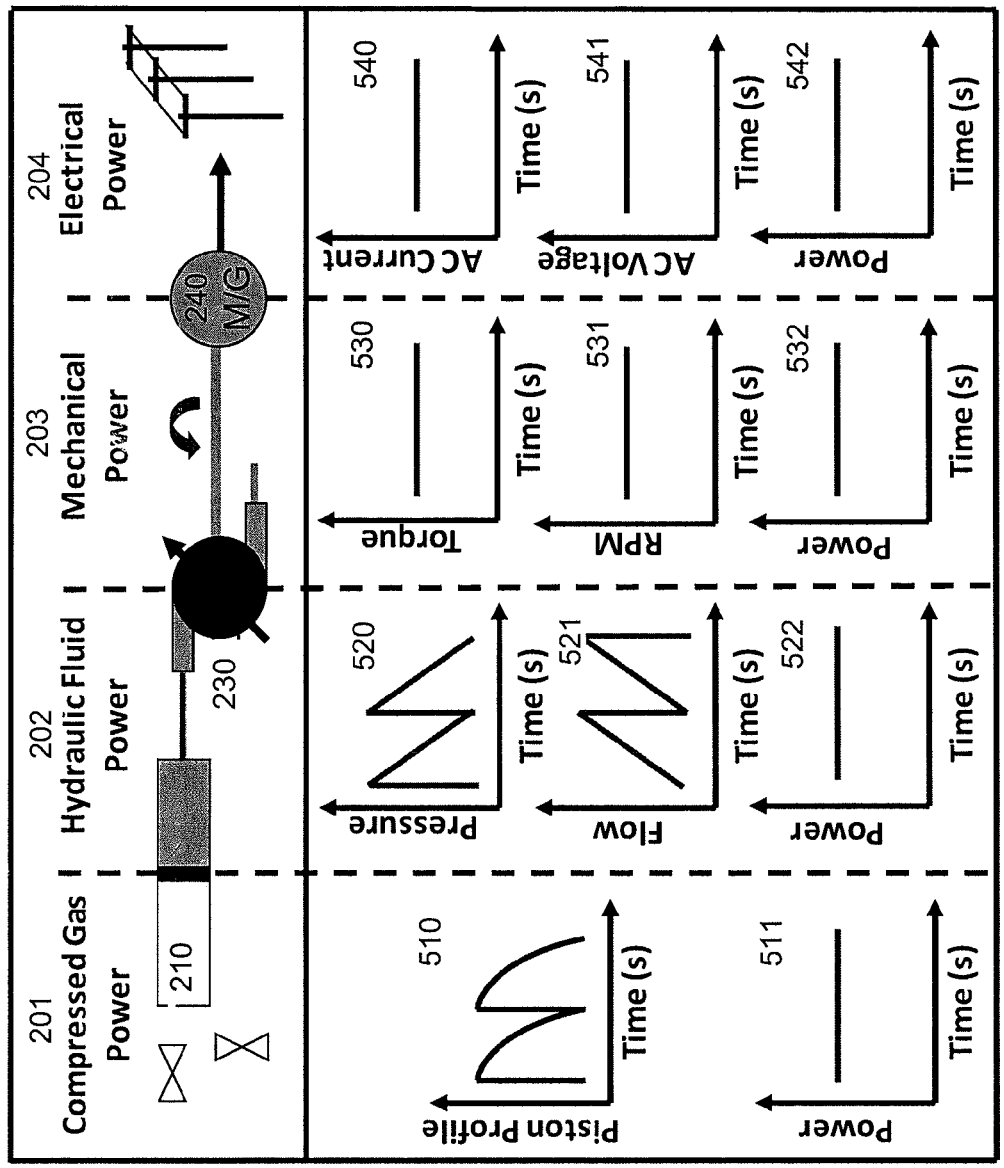
FIG. 11 is a schematic of the components related to conversion efficiency for compressed air energy storage using staged hydraulic conversion, where a variable displacement hydraulic motor-pump and optimal control scheme is used for providing constant power, and graphic representations of the various operational parameters, such as piston position, power, pressure, flow, torque, RPM, current and voltage versus time for the various stages.

FIG. 11 depicts generally the major components related to conversion efficiency for compressed air energy storage using staged hydraulic conversion, where a VD hydraulic motor-pump 230 is used. FIG. 11 illustrates the four major energy conversion stages discussed above and graphically depicts the various operational parameters, such as piston position, power, pressure, flow, torque, RPM, current and voltage versus time for those regions. FIG. 11 is closely related to FIG.

10, but shows the full potential of an optimized control scheme for the VD hydraulic motor-pump 230. It should be noted that for simplicity of description, the case of expansion (compressed air energy storage and recovery system discharge) is displayed and described for the graphs in FIG. 11, but the case of compression (system charging) can be imagined by reversing the time axis on the various plots.

Starting in region 201, a set amount of compressed gas is admitted and then expanded in a pneumatic hydraulic device, such as an accumulator 210 driving hydraulic fluid through the hydraulic motor-pump 230. The hydraulic fluid pressure (directly related to compressed gas pressure) falls as a function of time as indicated in the first half of graph 520. For all graphs, two expansions are shown for the time scale. At the mid-point in time, a second pneumatic hydraulic device such as an intensifier 220 admits and expands a fixed amount of compressed gas. For a VD hydraulic motor-pump 230, the flow rate is controlled by both the RPM and the displacement per revolution of the motor.

The displacement per revolution of the motor can be controlled in a VD motor-pump. By using pressure, piston position, power, or other current operational information, the flow rate can be set in such a way as to increase with decreasing pressure as shown in graph 521 by increasing the displacement per revolution. In this instance, as opposed to FIG. 10, a control system is implemented to maintain a nearly constant torque or RPM as indicated in graph 530 and graph 531. Piston speed in the accumulator 210 changes with flow rate, and thus piston position is related in an integral fashion to flow rate as indicated in graph 510. As hydraulic power is pressure times flow rate, power can be made constant as indicated in graph 522 if pressure varies inversely with flow rate as a function of time as indicated in graph 520 and graph 521. For the VD motor 230, hydraulic motor output torque is related to pressure, graph 520, times the displacement as a function of time (a fixed RPM displacement has the same curve as flow as shown in graph 521) as indicated in graph 530. Hydraulic motor output RPM is related to flow 521 as indicated in 531.

Similarly, converting mechanical 203 to electrical energy 204, electric motor-generator 240 current is related to torque graph 530 as indicated in graph 540. Electric motor-generator 240 voltage is related to RPM graph 531 as indicated in graph 541. Power in each stage: compressed gas energy 201, hydraulic energy 202, mechanical energy 203, and electrical energy 204, are closely related, scaled by efficiencies of conversions, and fall with time. By maintaining a constant torque and RPM via control of the VD hydraulic motor-pump 230 displacement, output voltage from 240 can be matched to the required output, such as the electrical grid power. By matching voltage and frequency with the desired output, power electronics can be removed from the system, saving substantial system costs. Further, by maintaining a constant power output as a function of time over each cycle, no limited short-term energy storage devices, such as ultracapacitors, would be needed to smooth current, graph 540, and power output, graph 542 as a function of time. As the efficiency of the electric motor-generator 240 is dependent on operating torque and RPM, by limiting the variation in torque and RPM to operation operated over a narrow or fixed range, mechanical to electrical conversion can be increased.

Figure 12:
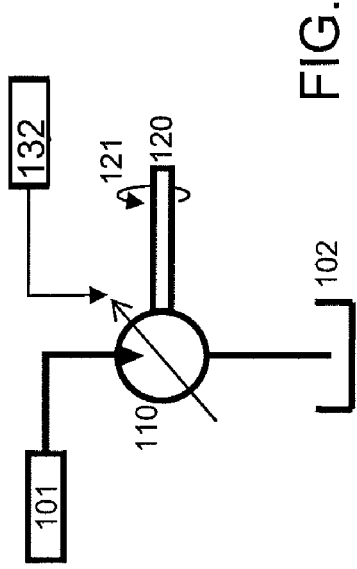
FIG. 12 is a schematic representation of the major components related to one embodiment of a system and method for providing constant power, RPM, and torque from a hydraulic input having a widely-varying pressure profile and using a variable displacement hydraulic motor.

FIG. 12 depicts an alternative arrangement of the major components related to the systems and methods for providing constant power, RPM, and torque from a hydraulic input having a widely-varying pressure profile, in this case using a VD motor-pump and open loop control system. Similar to those described above (see, e.g., FIGS. 2-7), the major regions illustrated in FIG. 12 include a source of pressurized hydraulic fluid 101, such as a hydraulic-pneumatic accumulator or system as described above, which is driving a VD hydraulic motor 110 providing rotary motion (as indicated by arrow 121) of an output shaft 120. In this illustration, the outlet of the motor 110 is at low pressure and is directed to a hydraulic fluid reservoir 102; however, the outlet could be directed back to the system providing the source of pressurized hydraulic fluid 101. The displacement of motor 110 is controlled via displacement controller 132.

Figure 13:
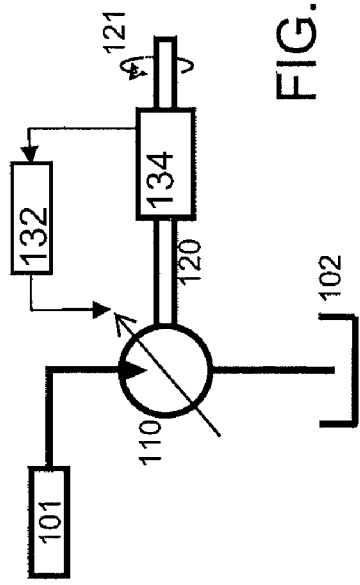
FIG. 13 is a schematic representation of the major components related to another embodiment of a system and method for providing constant power, RPM, and torque from a hydraulic input having a widely-varying pressure profile and using a variable displacement hydraulic motor.

FIG. 13 depicts an alternative arrangement of the major components related to the systems and methods for providing constant power, RPM, and torque from a hydraulic input having a widely-varying pressure profile, in this case using a VD motor-pump and a closed loop control system. Similar to those described above, the major regions illustrated in FIG. 13 include a source of pressurized hydraulic fluid 101, which is driving a VD hydraulic motor 110 providing rotary motion (arrow 121) of an output shaft 120. In this illustration, the outlet of the motor 110 is at low pressure and is directed to a hydraulic fluid reservoir 102, but could be returned to the system providing the source of pressurized hydraulic fluid 101. The displacement of the motor 110 is controlled via displacement controller 132, which is based on RPM and/or torque measurements from a RPM/torque sensor 134.

Figure 14A:
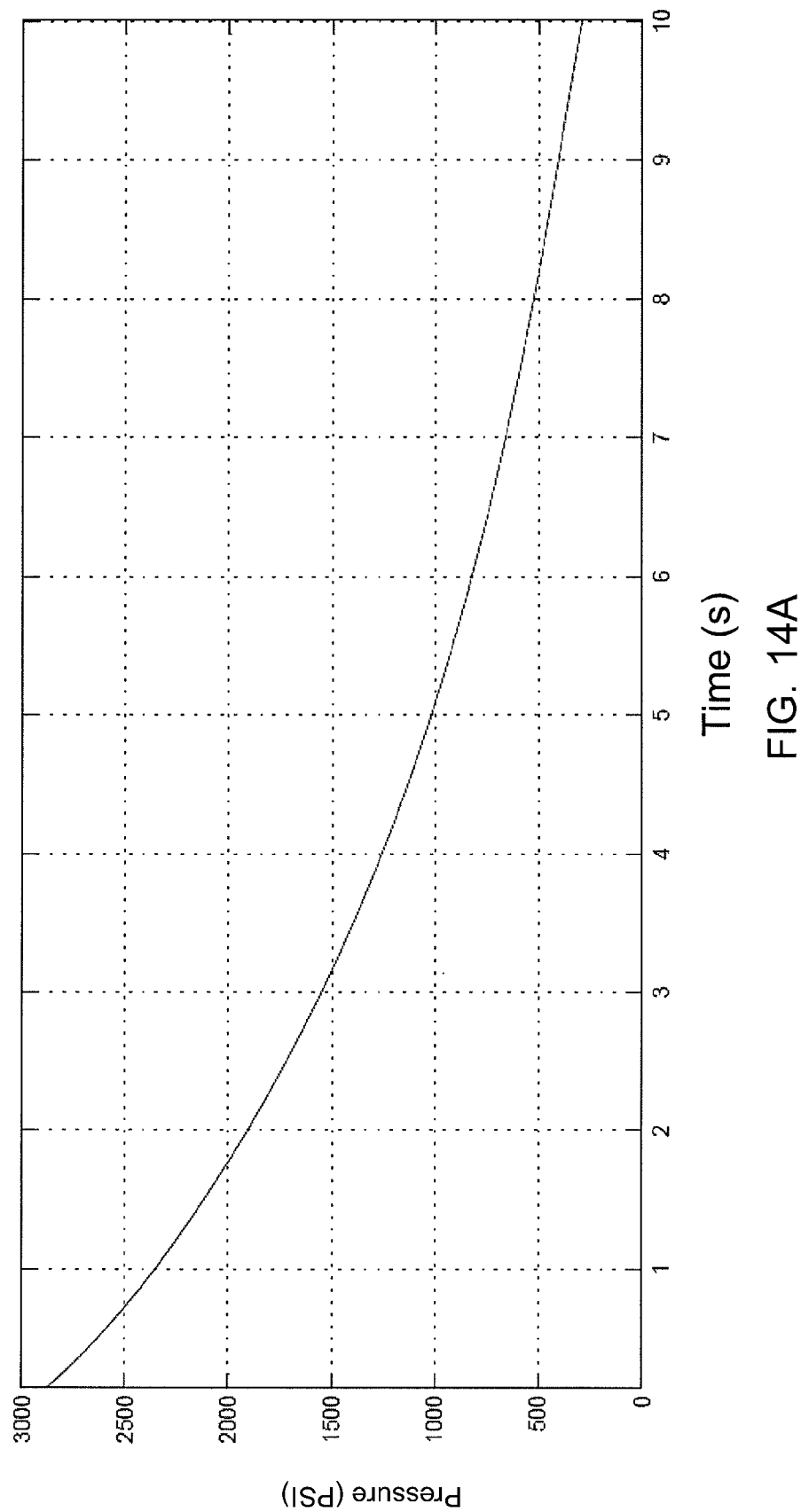
FIGS. 14A-14C are graphical representations of the hydraulic pressure, flow rate, and motor output power for a single pressure profile for a representative pressure range related to the systems and methods of FIGS. 12 and 13.
Figure 14B:
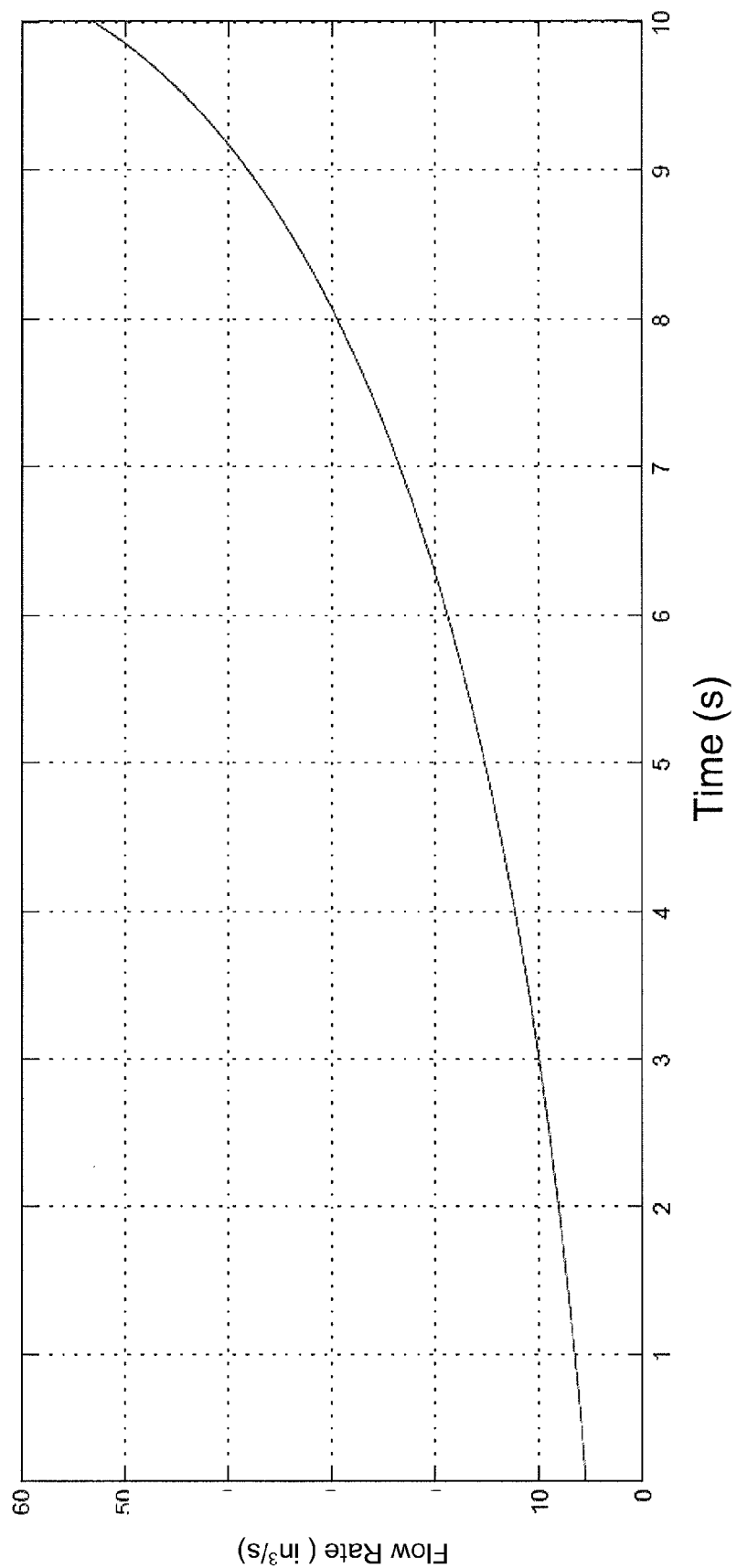
Figure 14C:
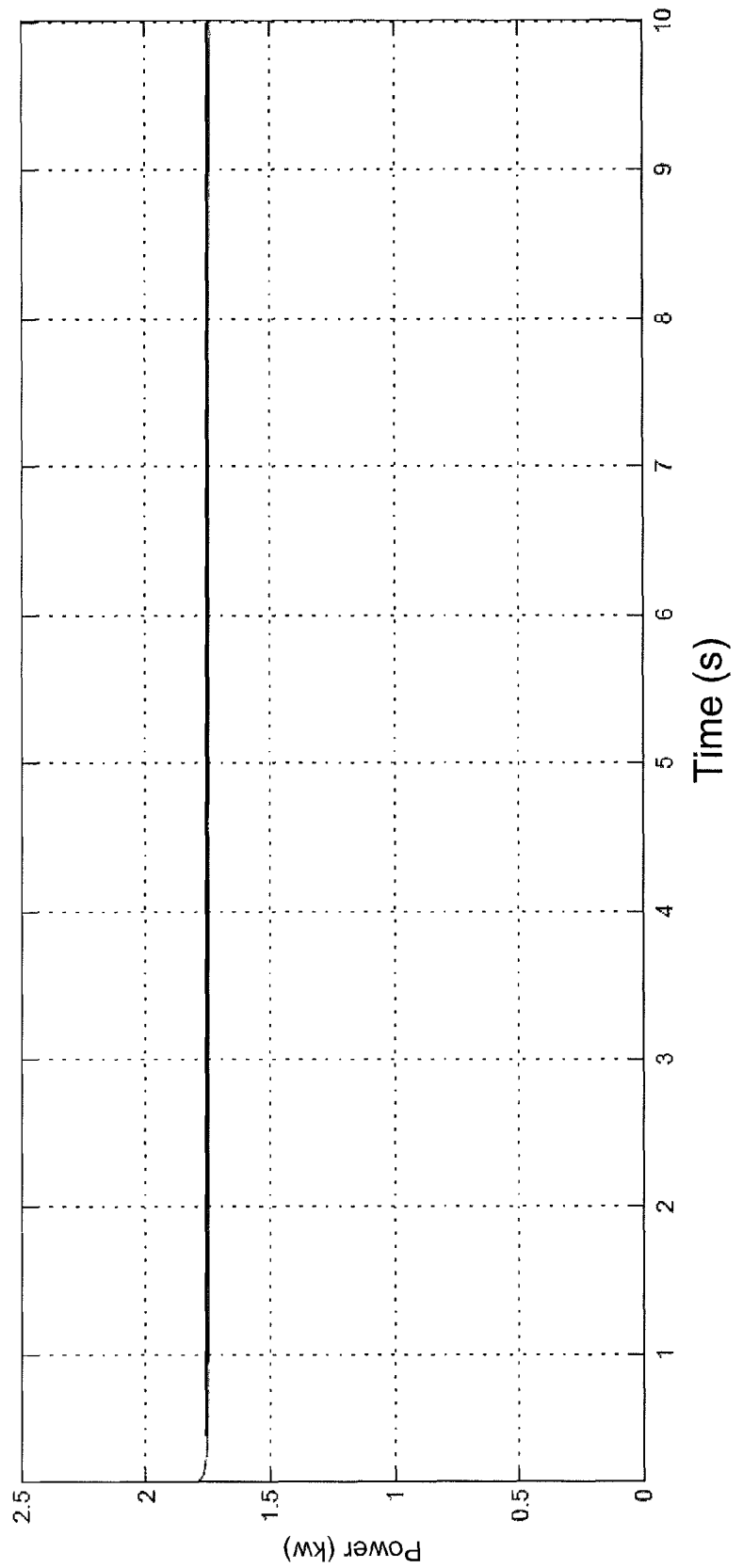

FIGS. 14A-14C are graphical representations of the hydraulic pressure, flow rate, and motor output power for a single pressure profile for a representative pressure range related to the system and method for providing constant power, RPM, and torque from a widely-varying pressure hydraulic input of FIG. 13. As shown in FIG. 14A, a pressure profile is depicted for a simulated system using a hydraulic pneumatic accumulator with an initial pressure of 3000 psi. As the compressed gas expands in the accumulator forcing out hydraulic fluid, the pressure falls from 3000 psi to approximately 300 psi. The VD hydraulic motor displacement is changed such that RPM and torque are nearly constant, increasing hydraulic flow rate through the motor, as shown in FIG. 14B, as pressure decreases. In this way, power is kept nearly constant as a function of time as shown in FIG. 14C.

Figure 15A:
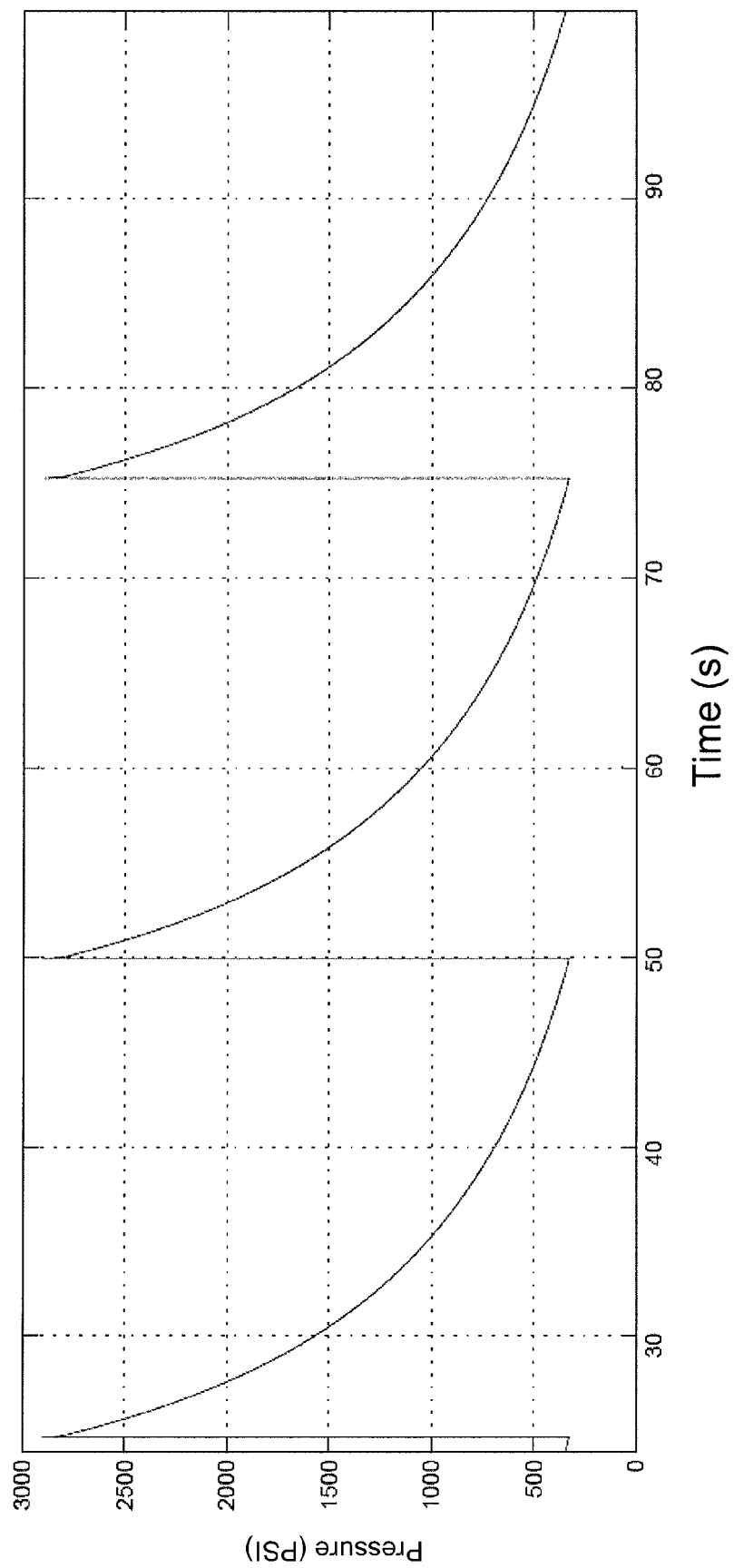
FIGS. 15A-15E are graphical representations of the hydraulic pressure, motor displacement, motor RPM, motor torque, and motor output power for a series of pressure profiles for an example cyclic operation of the systems and methods of FIGS. 12 and 13.
Figure 15B:
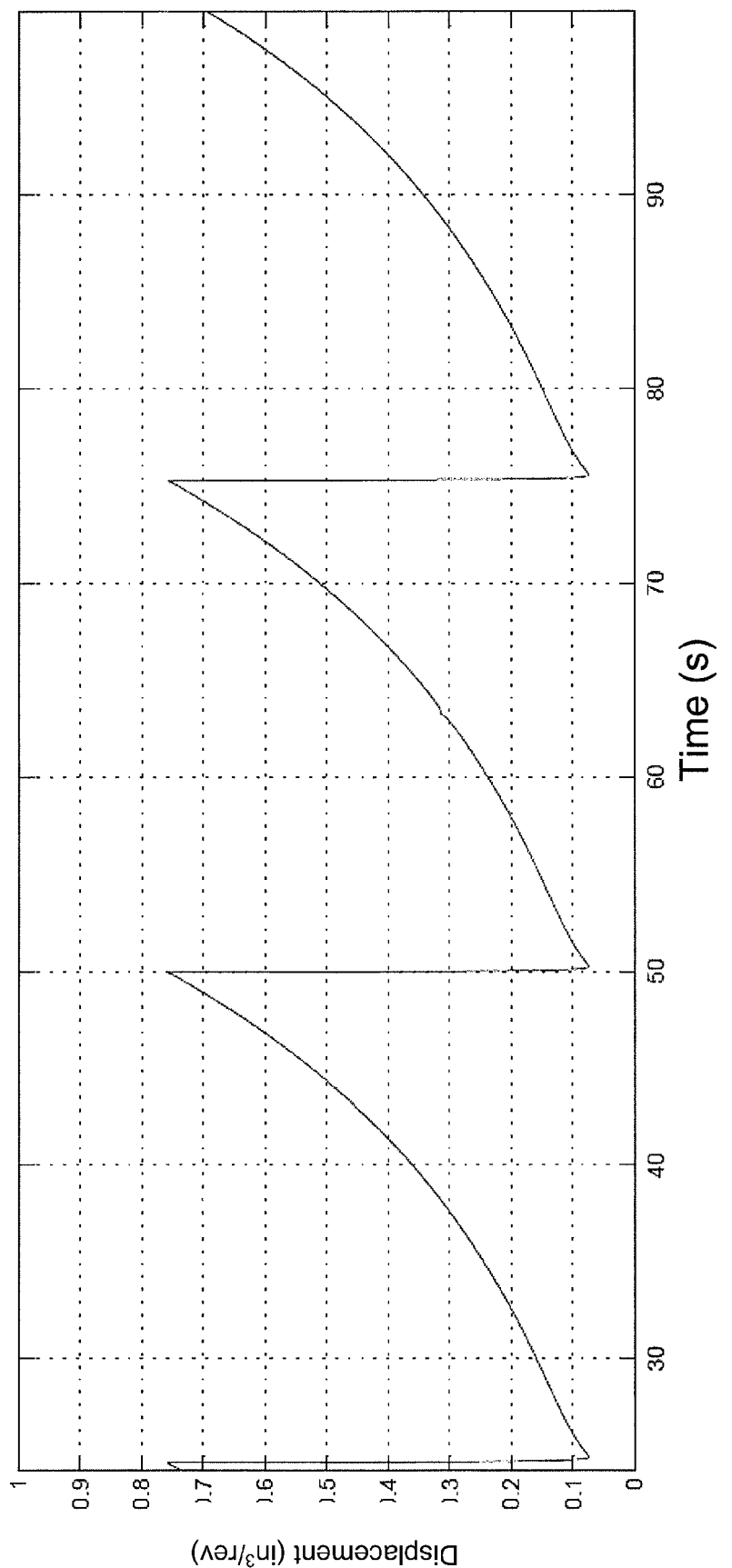
Figure 15C:
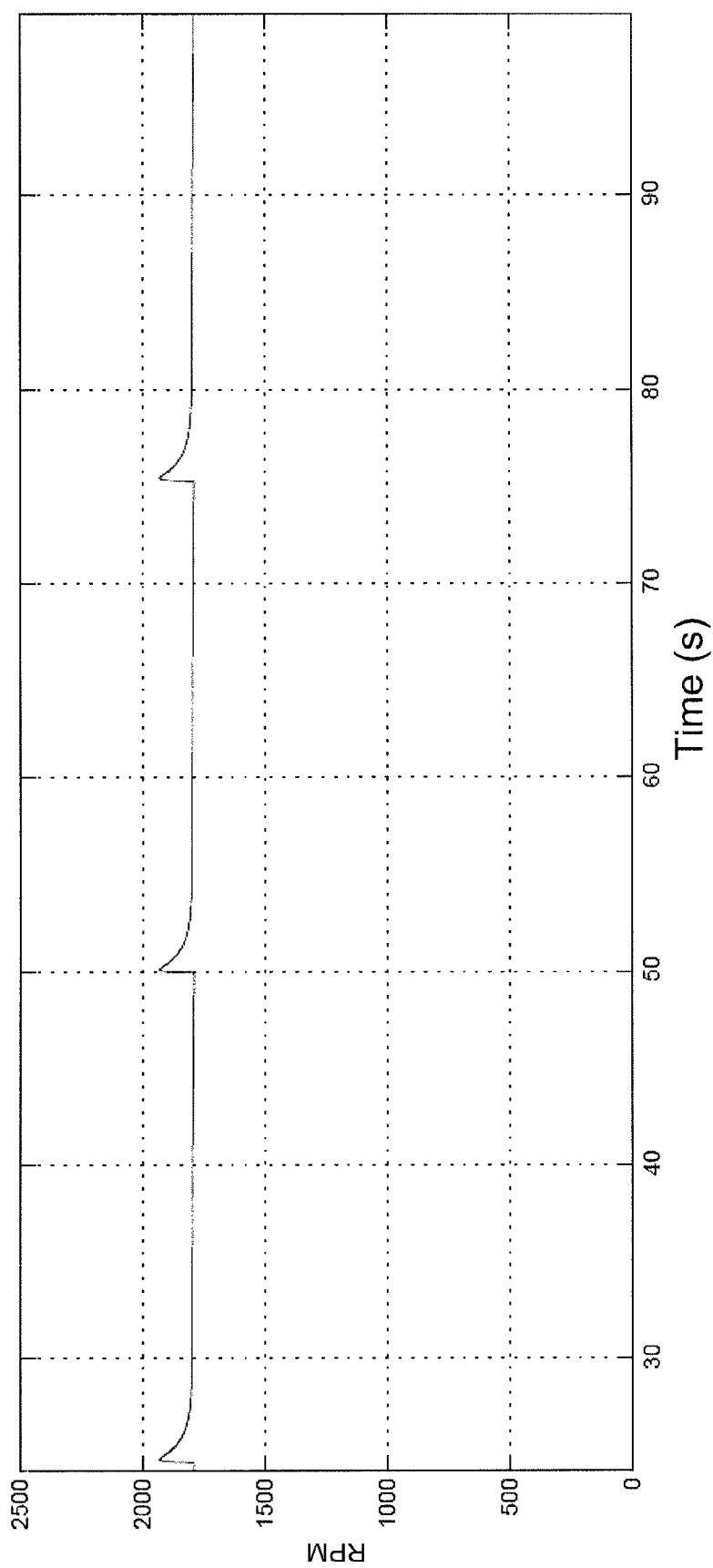
Figure 15D:
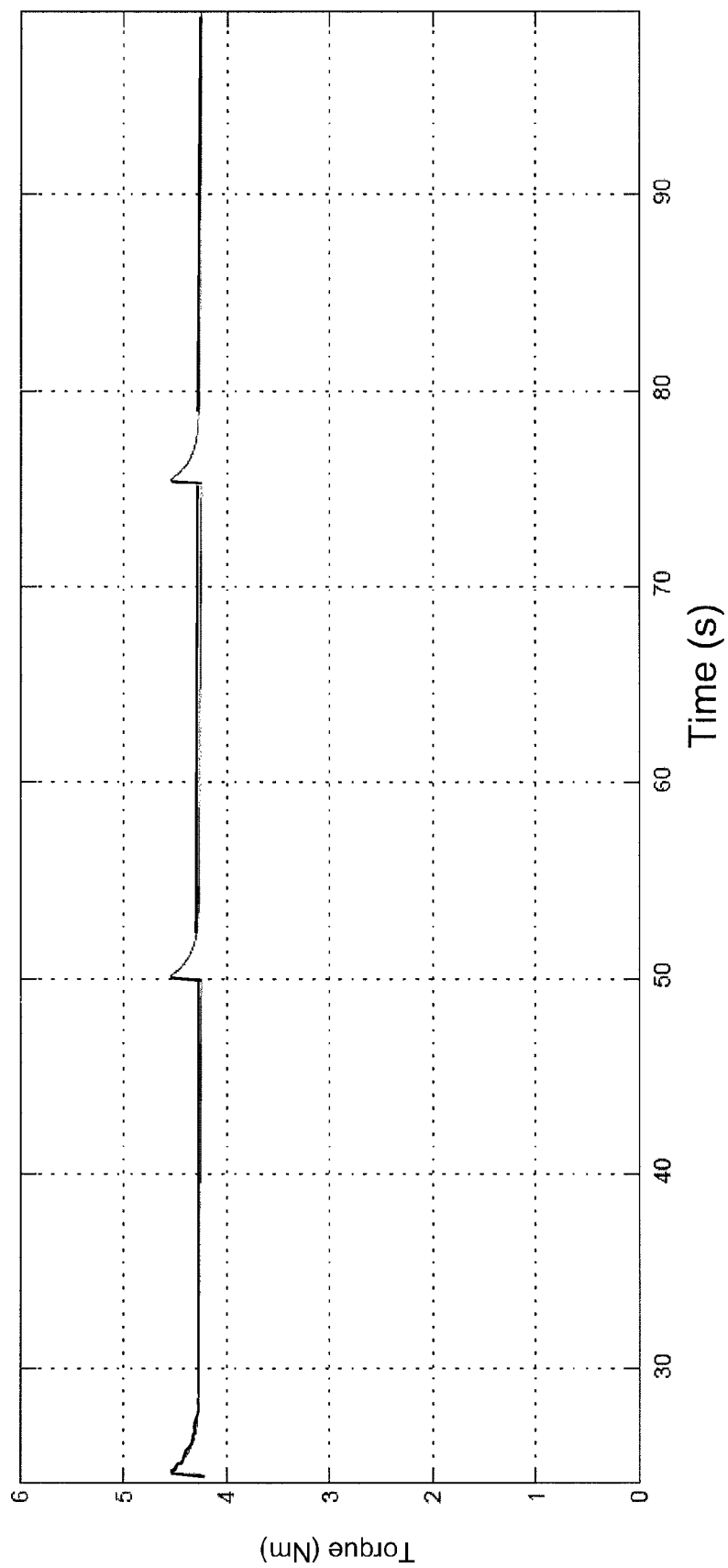
Figure 15E:
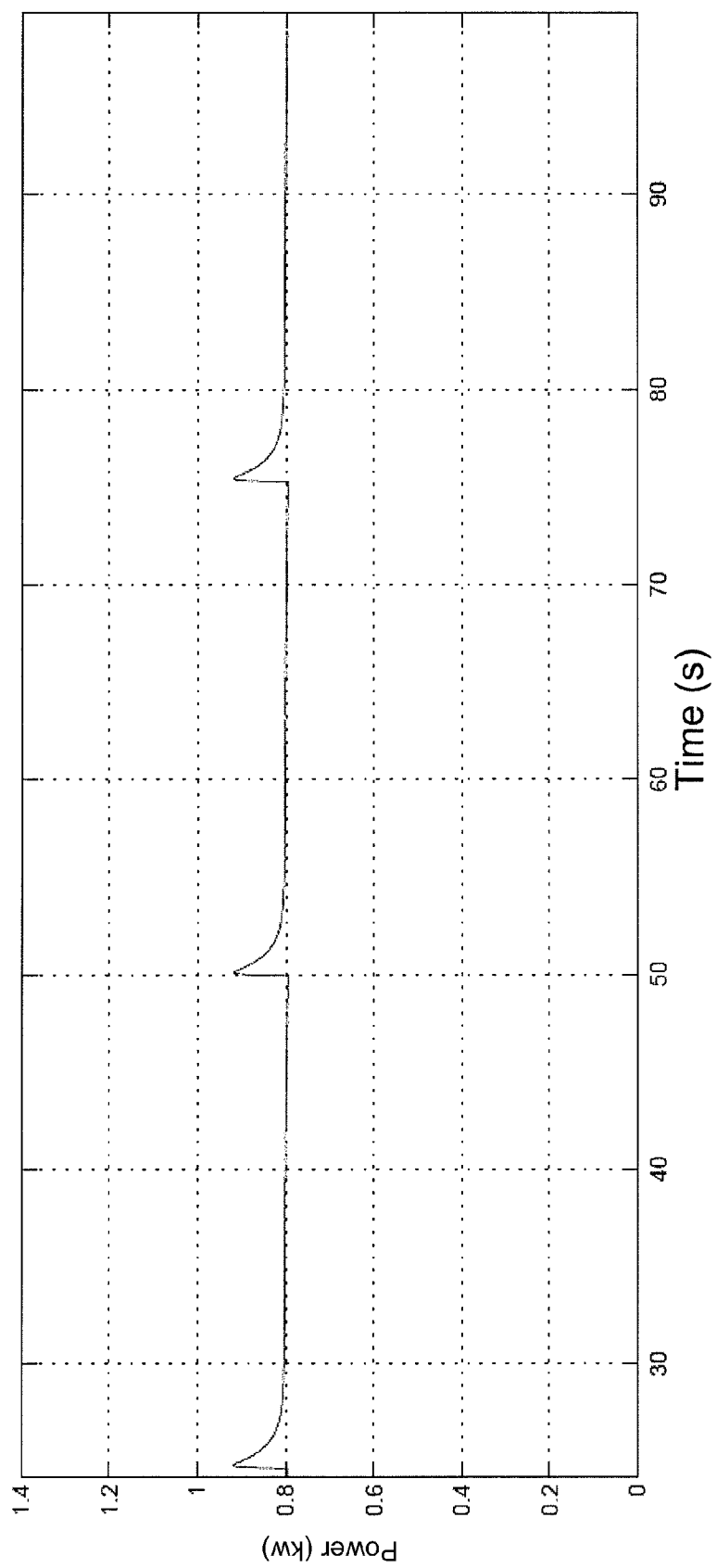

FIGS. 15A-15E are graphical representations of the hydraulic pressure, motor displacement, motor RPM, motor torque, and motor output power for a series of pressure profiles for an example cyclic operation of the system and method for providing constant power, RPM, and torque from a widely-varying pressure hydraulic input of FIG. 13. In FIG. 15A, a set of three cyclical pressure profiles are shown for the simulated process where successive hydraulic pneumatic accumulators are discharged with an initial pressure of 3000 psi. As the compressed gas expands in each successive accumulator forcing out hydraulic fluid, the pressure falls from 3000 psi to approximately 300 psi. The displacement setting of the VD hydraulic motor is controlled in this example by a PID controller set to achieve constant RPM. As shown in FIGS. 14A-14C, the displacement and thus hydraulic flow increase with decreasing pressure, as shown in FIG. 15B. In this way, RPM, torque, and power are kept nearly constant as a function of time as shown in FIGS. 15C-15E, respectively. In FIGS. 15A-15E, closed-loop feedback on RPM provides a nearly constant power output, except during times of transition switching between accumulators. This switching between accumulators is done in a predictable fashion.

Figure 16:
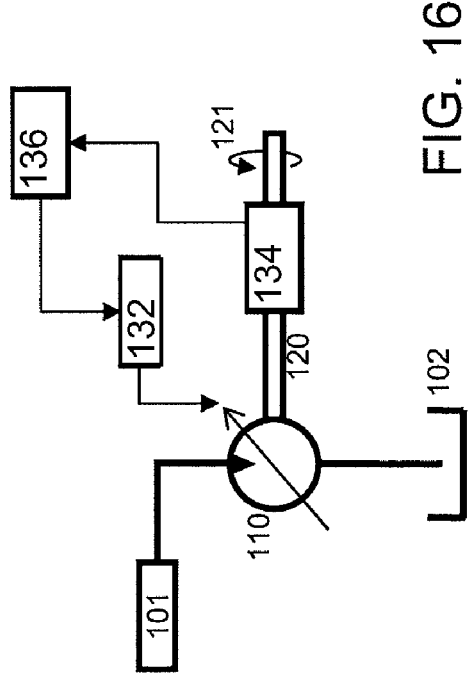
FIG. 16 is a schematic representation of the major components related to another embodiment of a system and method for providing constant power, RPM, and torque from a hydraulic input having a widely-varying pressure profile and using a variable displacement hydraulic motor.

FIG. 16 depicts an alternative arrangement of the major components related to the systems and methods for providing constant power, RPM, and torque from a hydraulic input having a widely-varying pressure profile, in this case using a VD motor-pump and a control system using predictive information and feedback. Similar to those described above, the major regions illustrated in FIG. 16 include a source of pressurized hydraulic fluid 101, which is driving a VD hydraulic motor 110 providing rotary motion (arrow 121) of an output shaft 120. In this illustration, the outlet of the motor 110 is at low pressure and is directed to a hydraulic fluid reservoir 102, but could be returned to the system providing the source of pressurized hydraulic fluid 101. The displacement of the motor 110 is controlled via displacement controller 132, which is based on computed inputs from the system controller 136. The system controller 136 incorporates predictive information based on current system parameters (such as RPM/torque measurements from a RPM/torque sensor 134, as well as piston positions, pressures, and/or temperatures) and procedures such as switching pressures to set displacement such that variations in output around state changes can be minimized.

FIG. 17A is a schematic diagram of a hydraulic drivetrain including a single fluid power source and a single fluid power consumer, in which the fluid power consumer is a FD hydraulic motor. A driving machine 604 is used to turn a shaft 605 powering a VD pump 606 that pumps fluid from a tank 602 into a high-pressure line 601. Fluid from the high pressure line 601 flows through a FD hydraulic motor 610 and back into the tank 602. The motor 610 converts the fluid power into mechanical power, driving shaft 663 and powering the driven machine 660.

The equation depicted in FIG. 17B shows the torque, pressure, and displacement relationship of FD hydraulic motor 610. In this case, the displacement 690 of motor 610 is constant and fixed. Therefore, the pressure 680 in the high pressure line 601 and experienced by motor 610 must be increased or decreased to increase or decrease the output torque 670 of the motor 610. In drivetrain 600, this is accomplished by adjusting the displacement 607 of pump 606, which increases the fluid power provided to line 601.

FIG. 18A is a schematic diagram of a hydraulic drivetrain including a single fluid power source and multiple fluid power consumers, in which the fluid power consumers are FD hydraulic motors. A driving machine 704 is used to turn a shaft 705 powering a VD pump 706 that pumps fluid from a tank 702 into a high-pressure line 701. Fluid from the high pressure line 701 flows through FD hydraulic motors 711, 712 and back into the tank 702. The motors 711, 712 convert the fluid power into mechanical power, driving shafts 763, 764 to power the driven machines 761, 762.

The equation depicted in FIG. 18B shows the torque, pressure, and displacement relationship of the FD hydraulic motors 711, 712. In this case, the displacements 791, 792 of the motors 711, 712 are constant and fixed. Therefore, the pressures 781, 782 in the high pressure lines 733, 734 that are experienced by the motors 711, 712 must be increased or decreased in order to increase or decrease the output torques 771, 772 of the motors 711, 712. Both fluid power consumers, motors 711, 712, are affected by the pressure in the high-pressure line 701, which therefore cannot be used to individually control the outputs of the motors 711, 712 the way the pressure in line 601 in FIG. 17A can control the output of motor 610. Therefore, the pressure in the high-pressure line 701 is held constant or nearly constant by adjusting the displacement 707 of pump 706, which increases the fluid power provided to line 701. A hydraulic accumulator 703 is used to reduce pressure fluctuations. Since there are multiple fluid power consumers in drivetrain system 700, pressure-reducing valves 731, 732 are used to control the pressures 781, 782 in the fluid lines 733, 734 at the inlets of the motors 711, 712, thus individually controlling output torques 771, 772 of the motors. The disadvantage with this approach is that a significant amount of energy is lost and converted to heat by throttling the flow through valves 731, 732 to control the pressure, thereby greatly reducing system efficiency.

FIG. 19A is a schematic of a hydraulic drivetrain including a single fluid power source and multiple fluid power consumers, in which the fluid power consumers are VD hydraulic motors. VD hydraulic motors were developed to provide torque control from a constant or nearly constant pressure fluid power source without the need for throttling valves. By eliminating the energy losses associated with throttling control valves, system efficiencies are greatly increased.

A driving machine 804 is used to turn a shaft 805 powering a VD pump 806 that pumps fluid from the tank 802 into the high-pressure line 801. Fluid from the high pressure line 801 flows through VD hydraulic motors 811, 812 and back to the tank 802. The motors 811, 812 convert the fluid power into mechanical power, driving shafts 863, 864 to power the driven machines 861, 862. Similarly to drivetrain 700 in FIG. 18A, both fluid power consumers in FIG. 19A, motors 811, 812, are affected by the pressure in the high-pressure line 801, which therefore cannot be used to individually control the outputs of the motors 811, 812 the way the pressure in line 601 in FIG. 17A can control the output of motor 610. Therefore, the pressure in the high-pressure line 801 is held constant or nearly constant by adjusting the displacement 807 of pump 806, which increases the fluid power provided to line 801. A hydraulic accumulator 803 is used to reduce pressure fluctuations.

The equation depicted in FIG. 19B shows the torque, pressure, and displacement relationship of the VD hydraulic motors 811, 812. In this case, the displacements 891, 892 of the motors 811, 812 are variable and can be controlled by displacement controls 831, 832. Therefore, although the pressures 881, 882 in the high pressure line 801 that are experienced by the motors 811, 812 are constant or near constant, the displacements 881, 882 of the motors 811, 812 can be increased or decreased via displacement controls 831, 832, thus increasing or decreasing the output torques 871, 872 of the motors 811, 812 to accommodate varying loads on the shafts 863, 864 required by the driven machines 861, 862.

In the hydraulic systems shown in FIG. 17A, FIG. 18A, and FIG. 19A, either the pressures 680, 781, 782 experienced by the hydraulic motors were dynamically changed or the hydraulic motor displacements 891, 892 were dynamically changed in order to dynamically change the motor output torques 670, 771, 772, 871, 872 to match the required torque demand from the driven machines 660, 761, 762, 861, 862.

FIG. 20A depicts an embodiment of a hydraulic drivetrain in which the driven machine requires constant torque and the displacement of the VD hydraulic motor is controlled to account for changes in the motor inlet pressure, which is non-constant and non-controllable. As shown, the hydraulic motor 910 is powered by a non-controlled, non-constant pressure source 901, such as, for example, the compressed gas energy storage and recovery system using staged hydraulic conversion described above. Fluid flows from the non-constant pressure source 901 through the VD hydraulic motor 910 and into tank 902. The motor 910 converts the fluid power into mechanical power, driving a shaft 963 and powering a driven machine 960 that requires constant or near constant input torque. In this case, the pressure differential 980 experienced by the motor 910 is provided by the non-constant pressure source 901, and is thus non-constant and non-controlled. In this embodiment, displacement 930 is actively controlled to be inversely proportional to the pressure differential 980 in order to compensate for the varying nature of the pressure input and provide the constant or near constant motor torque output 970 required by the driven machine 960. See the equation depicted in FIG. 20B, which shows the torque, pressure, and displacement relationship for the hydraulic motor in FIG. 20A.

Figure 21:
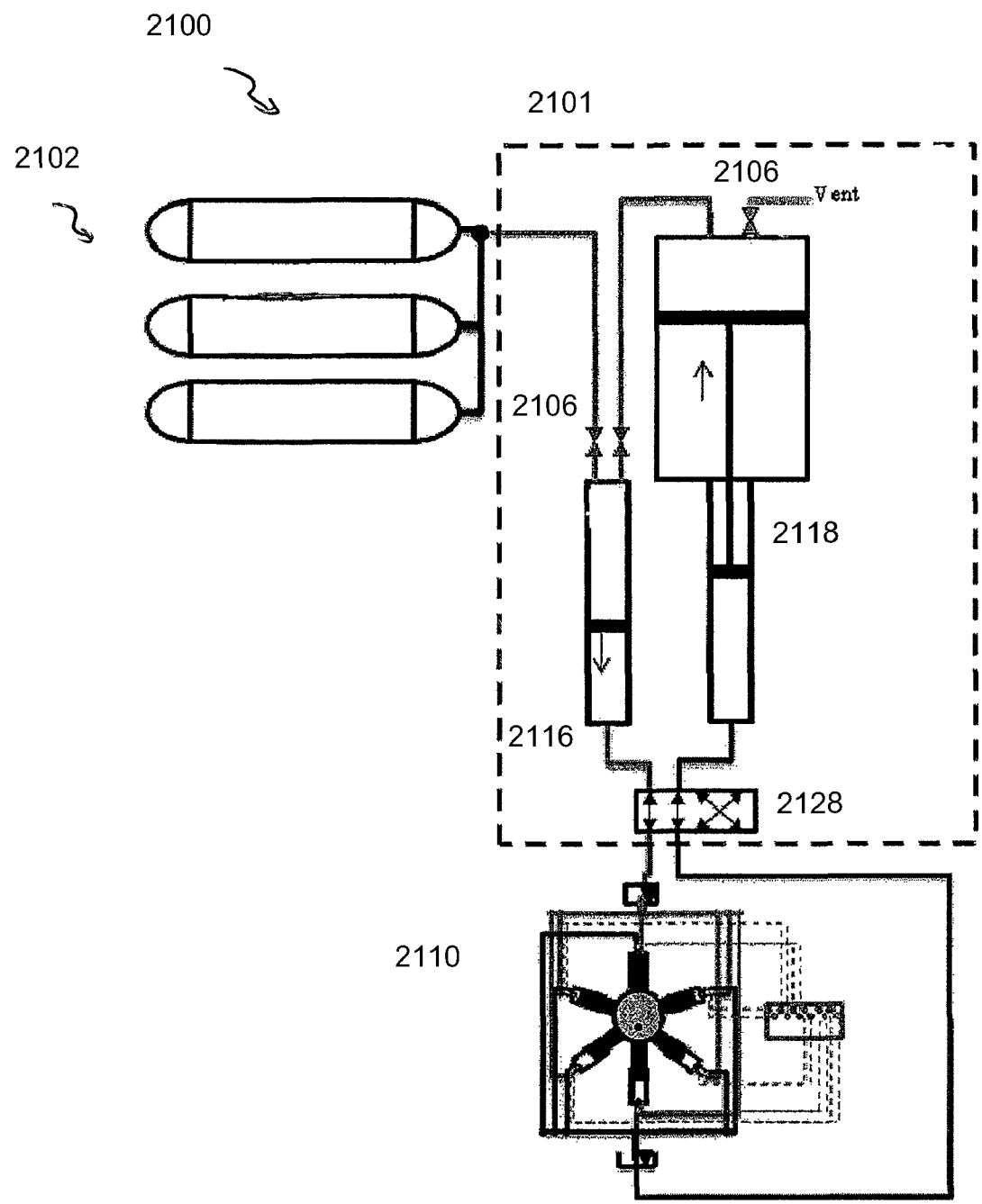
FIG. 21 is a schematic representation of the major components for an alternative system and method for improving drivetrain efficiency for a compressed gas energy storage and recovery system using staged hydraulic conversion.

FIG. 21 is a schematic representation of an alternative embodiment of a system and method for improving drivetrain efficiency for a compressed gas energy storage using hydraulic conversion to provide a constant output. The system 2100 is integrated with a hydraulic motor-pump 2110 having one each of a high pressure and low pressure input/output, with a series of pistons each driven using a computer controlled valve actuation scheme to allow for variable displacement operation at high efficiency, and described with respect to FIG. 22.

Figure 22:
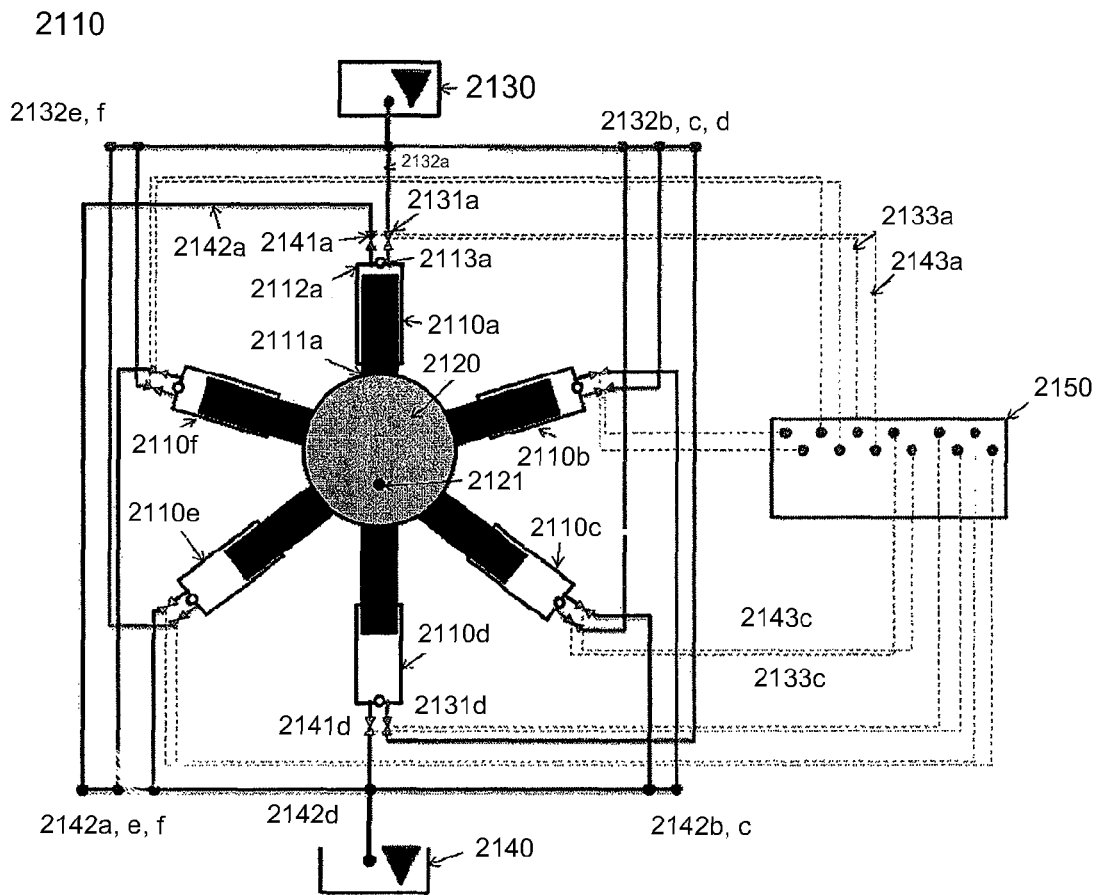
FIG. 22 is a schematic representation of one embodiment of a high-efficiency, variable volume hydraulic motor-pump for use in the system and method of FIG. 21.

FIG. 22 depicts the hydraulic motor-pump 2110, having one each of a high pressure and low pressure input/output 2130 and 2140, with a series of pistons each driven using a computer controlled valve actuation scheme to allow for variable displacement operation at high efficiency. The major components include six radial piston assemblies 2110a-f, each composed of a piston 2111 attached to an off-center rotating cam 2120 that turns a center axle 2121. Each piston 2111 reciprocates in a housing 2112 that is allowed to pivot about a fixed end 2113. High pressure hydraulic fluid, which is brought to/from the motor-pump 2110 through a high pressure hydraulic port 2130, is distributed to/from each piston assembly 2110a-f through high pressure lines 2132. Likewise, low pressure hydraulic fluid is brought to/from the motor-pump 2110 through a low pressure hydraulic port 2140 and is distributed to/from each piston assembly 2110a-f through low pressure lines 2142.

As the cam 2120 rotates, feedback from motor-pump parameters such as cam position, RPM, torque, and pressure is fed into a controller 2150 that actuates high speed valves 2131, 2141 through control lines 2133, 2143. Depending on the desired motor-pump displacement per revolution, high pressure valves 2131 may or may not be actuated (to an open position) each time the cam 2120 forces the piston 2111 near the top of the housing 2112. When the high pressure valve 2131 is not actuated (to an open position), the low pressure valve remains open allowing low pressure fluid to freely enter and exit the housing resulting in minimal fluid drag. Unlike most current commercially available VD motor-pumps, the piston always completes a full stroke, thereby increasing motor-pump efficiency. Likewise, by precision timing, the motor-pump can achieve high efficiency over a broad range of per revolution displacements. The motor-pump 2110 depicted in FIG. 22 has a radial piston layout with six pistons; however, various implementations of the systems and methods described herein may use a motor-pump that includes more or less pistons and/or an axial piston design. One implementation of this motor-pump is the "Digital Displacement" motor-pump designed by Artemis IP in Edinburgh, Scotland.

Referring back to FIG. 21, the compressed gas energy storage and recovery system illustrated herein consists of compressed gas storage vessels (or caverns) 2102 connected to a hydraulic conversion system 2101, such as those described above. For example, the hydraulic conversion system may consist of one or more hydraulic pneumatic accumulators 2116 and one or more hydraulic pneumatic intensifiers 2118. The air side of the hydraulic pneumatic accumulator 2116 is connected to the compressed gas storage vessels 2102 and the hydraulic pneumatic intensifier 2118 via air lines with shut-off valves 2106. The air side of the hydraulic pneumatic intensifier 2116 is also in communication with the ambient environment through a vent port and shut-off valve 2106. The hydraulic outputs of accumulator 2116 and intensifier 2118 are routed through a four way two position valve 2128 to hydraulic motor-pump 2110. As described above, the use of a VD motor-pump in combination with the system for compressed gas energy storage and recovery allows for operation over a broad pressure range while maintaining nearly constant RPM, torque, and power. The digitally controlled motor-pump 2110 described herein allows for a substantially higher efficiency over a broader pressure range than conventional VD motor-pumps.

Figure 23:
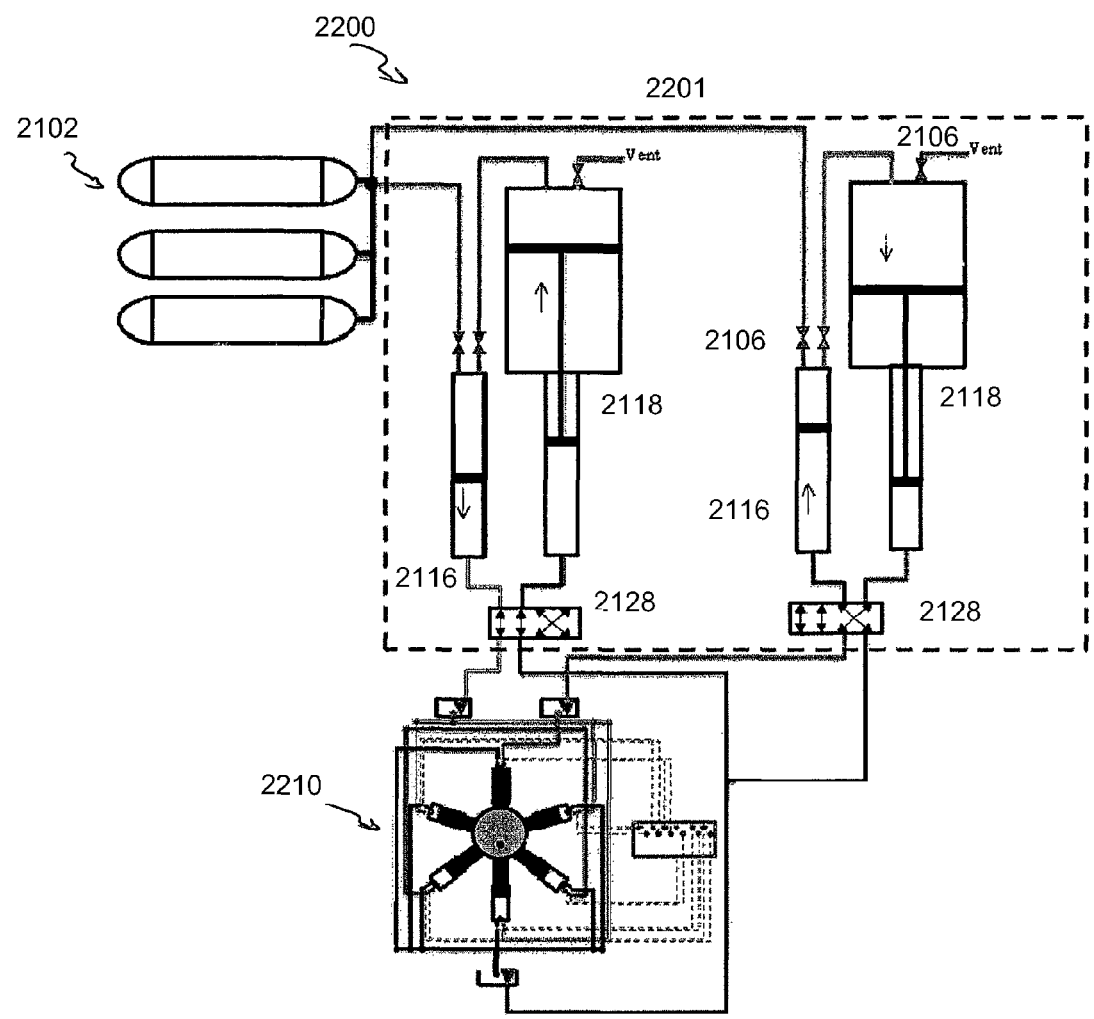
FIG. 23 is a schematic representation of the major components for an alternative system and method for improving drivetrain efficiency for a compressed gas energy storage and recovery system using staged hydraulic conversion.

FIG. 23 is a schematic representation of an alternative embodiment of a system and method for improving drivetrain efficiency for a compressed gas energy storage using hydraulic conversion to provide a constant power output. The system 2200 is integrated with a hydraulic motor-pump 2210 having two or more high pressure input/outputs, with a series of pistons each driven using a computer controlled valve actuation scheme to allow for variable displacement operation at high efficiency. The hydraulic motor-pump is described with respect to FIG. 24.

Figure 24:
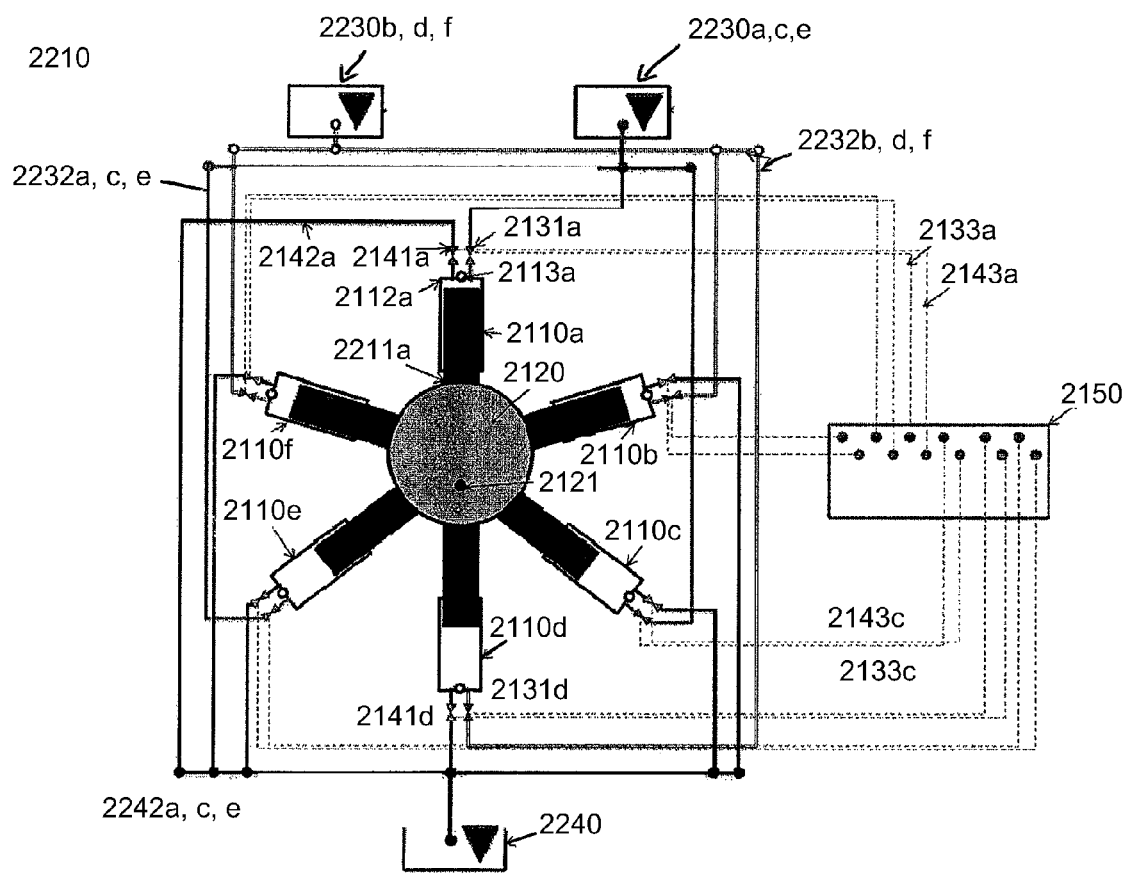
FIG. 24 is a schematic representation of one embodiment of a high-efficiency, variable volume hydraulic motor-pump for use in the system and method of FIG. 23.

FIG. 24 is a schematic of the hydraulic motor-pump 2210, having two or more high pressure input/outputs 2240 and 2230, with a series of pistons each driven using a computer controlled valve actuation scheme to allow for variable displacement operation at high efficiency. As previously described, the major components include six radial piston assemblies 2110a-f, each composed of a piston 2111 attached to an off-center rotating cam 2120 which turns a center axle 2121. Each piston 2111 reciprocates in a housing 2112 that is allowed to pivot about a fixed end 2113. High pressure hydraulic fluid, which is brought to/from the motor-pump 2210 through two (or more) high pressure hydraulic ports 2230bdf and 2230ace is distributed to/from each piston assembly 2110b,d,f and 2110a,c,e through high pressure lines 2232bdf and 2232ace, respectively. Likewise, low pressure hydraulic fluid is brought to/from the motor-pump 2210 through one or more low pressure hydraulic ports 2240 and is distributed to/from each piston assembly 2110a-f through low pressure lines 2242.

As the cam 2120 rotates, feedback from motor-pump parameters such as cam position, RPM, torque, and pressure is fed into a controller 2150 which actuates high speed valves 2131, 2141 through control lines 2133, 2143. Depending on the desired motor-pump displacement per revolution, high pressure valves 2131 may or may not be actuated (to an open position) each time the cam 2120 forces the piston 2111 near the top of the housing 2112. When the high pressure valve 2131 is not actuated (to an open position), the low pressure valve remains open allowing low pressure fluid to freely enter and exit the housing resulting in minimal fluid drag. As previously discussed, the piston always completes a full stroke, thereby increasing motor-pump efficiency. Likewise, by precision timing, the motor-pump can achieve high efficiency over a broad range of per revolution displacements. Again, the motor-pump is depicted as a radial piston layout with six piston assemblies, but motor-pumps having different layouts and quantities of piston assemblies and are contemplated and within the scope of the invention. Additionally, by using multiple input/output ports attached to different piston assemblies, multiple input/output pressures and flows can be achieved within a single motor-pump. As shown in FIG. 24, all piston sizes are shown as the same; however, piston sizes can vary. For example, piston assemblies 2110a, c, e can be a different size than piston assemblies 2110b, d, f.

Referring back to FIG. 23, the compressed gas energy storage and recovery system illustrated herein similarly consists of compressed gas storage vessels (or caverns) 2102 connected to a hydraulic conversion system 2201, such as those described above. As the hydraulic motor-pump 2210 has multiple high pressure ports, system 2201 has multiple, different hydraulic fluid pressure streams, allowing for their combination within a single motor 2210. The staged hydraulic conversion system 2201 may consist of two or more accumulator and intensifier arrangements. As shown, a first arrangement consists of one or more hydraulic pneumatic accumulators 2116 and one or more hydraulic pneumatic intensifiers 2118. The air side of the first arrangement of hydraulic pneumatic accumulators 2116 is connected to the compressed gas storage vessels 2102 and the hydraulic pneumatic intensifiers 2118 via air lines with shut-off valves 2106 and the air side of hydraulic pneumatic intensifiers 2118 is also in communication with the ambient environment through a vent port and shut-off valve 2106. The hydraulic outputs of the first arrangement are routed through a four way two position valve 2128 to one of the high pressure ports of the hydraulic motor-pump 2210.

The system 2201 also includes a second arrangement of accumulators and intensifiers. The second arrangement also includes one or more hydraulic pneumatic accumulators 2116 and one or more hydraulic pneumatic intensifiers 2118. The air side of the second arrangement of the hydraulic pneumatic accumulators 2116 is connected to the compressed gas storage vessels 2102 and the hydraulic pneumatic intensifiers 2118 via air lines with shut-off valves 2106 and the air side of hydraulic pneumatic intensifiers 2118 is also in communication with the ambient environment through a vent port and shut-off valve 2106. The hydraulic outputs of the second arrangement are routed through a four way two position valve 2128 to a second of the high pressure ports of the hydraulic motor-pump 2210. Likewise, additional high pressure ports may be added to a single digitally controlled motor-pump, allowing for additional pressure streams to be combined within a single motor-pump. Because the motor-pump 2210 has integrated digitally controlled valving (2131*a-f* and 2141*a-f* in FIGS. 22 and 24), fewer hydraulic valves can be used in the hydraulic conversion system 2102, thereby reducing cost and increasing functionality. As described above, the use of a VD motor-pump in combination with the system for compressed gas energy storage allows for operation over a broad pressure range while maintaining nearly constant RPM, torque, and power and the digitally controlled motor-pump 2210 allows for a substantially higher efficiency over a broader pressure range than conventional VD motor-pumps. Additionally, by combining multiple pressure streams, the effects of broader pressure ranges in relation to power and flow rates can be further diminished, further improving performance.

Having described certain embodiments of the invention, it will be apparent to those of ordinary skill in the art that other embodiments incorporating the concepts disclosed herein may be used without departing from the spirit and scope of the invention. The described embodiments are to be considered in all respects as only illustrative and not restrictive.

Moreover, it will also be apparent to those of ordinary skill in the art that the exemplary systems described herein, as well as other embodiments, can be operated reversibly, that is, not only to produce electrical energy from the potential energy of pressurized gas but also to produce stored pressurized gas using electrical energy.

What is claimed is:

1. A system (i) for providing an electrical output constant in terms of at least one of frequency, voltage, current, or power from a compressed gas energy storage and recovery system, and (ii) suitable for the efficient use and conservation of energy resources, the system comprising:
a hydraulic-pneumatic energy storage and recovery system (i) configured to provide a varying pressure profile at least at one outlet thereof, and (ii) comprising a heat transfer subsystem to provide isothermal expansion and compression of gas within the energy storage and recovery system;
a hydraulic motor-pump in fluid communication with the outlet; and
a control system for enabling the electrical output by controlling at least one variable selected from the group consisting of pressure, piston position, power, flow rate, torque, RPM, current, voltage, frequency, and displacement per revolution.

2. The system of claim 1 further comprising an electric motor-generator mechanically coupled to the hydraulic motor-pump, wherein the hydraulic motor-pump converts hydraulic work to mechanical energy to drive a drive shaft of the electric motor-generator, and the electric motor generator converts the mechanical energy to electrical energy to form the electrical output.

3. The system of claim 2 further comprising power electronics in communication with the electric motor-generator to synchronize the electrical output to a power supply.

4. The system of claim 2, wherein the control system is configured to maintain at least one of constant torque or RPM of the hydraulic motor-pump to maintain the electrical output.

5. The system of claim 2, wherein the control system controls the hydraulic motor-pump to maintain the electrical output such that it matches a required input for a power supply.

6. The system of claim 1, wherein the hydraulic motor-pump is a fixed displacement hydraulic motor-pump, and the system further comprises an electric motor-generator, for forming the electrical output, mechanically coupled to the fixed displacement hydraulic motor-pump.

7. The system of claim 6, wherein the control system is configured to vary a flow rate of the fixed displacement hydraulic motor-pump in response to the varying pressure profile at the outlet.

8. The system of claim 6, wherein the control device comprises power electronics in communication with the electric motor-generator to synchronize the electrical output to a power supply.

9. The system of claim 1, wherein the hydraulic motor-pump is a digital displacement hydraulic motor-pump.

10. The system of claim 1, wherein the hydraulic motor-pump is a variable displacement hydraulic motor-pump.

11. The system of claim 1, wherein the energy storage and recovery system is an open-air system comprising, selectively fluidly connected to the at least one cylinder assembly, (i) means for storage of compressed gas after compression and supply of compressed gas for expansion thereof, and (ii) a vent for exhausting expanded gas to atmosphere after expansion and supply of gas for compression thereof.

12. A system (i) for providing an electrical output constant in terms of at least one of frequency, voltage, current, or power from a compressed gas energy storage and recovery system, and (ii) suitable for the efficient use and conservation of energy resources, the system comprising:
a hydraulic-pneumatic energy storage and recovery system configured to provide a varying pressure profile at least at one outlet thereof;
a hydraulic motor-pump in fluid communication with the outlet; and a control system for enabling the electrical output by controlling at least one variable selected from the group consisting of pressure, piston position, power, flow rate, torque, RPM, current, voltage, frequency, and displacement per revolution, wherein the control system is configured to vary the displacement per revolution of the hydraulic motor-pump in response to the varying pressure profile at the outlet.

13. A system (i) for providing an electrical output constant in terms of at least one of frequency, voltage, current, or power from a compressed gas energy storage and recovery system, and (ii) suitable for the efficient use and conservation of energy resources, the system comprising:

a hydraulic-pneumatic energy storage and recovery system configured to provide a varying pressure profile at least at one outlet thereof;

a variable displacement hydraulic motor-pump in fluid communication with the outlet; and a control system for enabling the electrical output by controlling at least one variable selected from the group consisting of pressure, piston position, power, flow rate, torque, RPM, current, voltage, frequency, and displacement per revolution, wherein the control system varies flow rate inversely with pressure as a function of time.

14. A system (i) for providing an electrical output constant in terms of at least one of frequency, voltage, current, or power from a compressed gas energy storage and recovery system, and (ii) suitable for the efficient use and conservation of energy resources, the system comprising:

a hydraulic-pneumatic energy storage and recovery system (i) configured to provide a varying pressure profile at least at one outlet thereof, (ii) using staged hydraulic conversion to provide the varying pressure profile, and (iii) comprising:

a cylinder assembly including a staged pneumatic side and a hydraulic side, the sides being separated by a movable mechanical boundary mechanism that transfers energy therebetween, and a compressed gas storage system in fluid communication with the cylinder assembly;

a hydraulic motor-pump in fluid communication with the outlet; and a control system for enabling the electrical output by controlling at least one variable selected from the group consisting of pressure, piston position, power, flow rate, torque, RPM, current, voltage, frequency, and displacement per revolution.

15. A system (i) for providing an electrical output constant in terms of at least one of frequency, voltage, current, or power from a compressed gas energy storage and recovery system, and (ii) suitable for the efficient use and conservation of energy resources, the system comprising:

a hydraulic-pneumatic energy storage and recovery system configured to provide a varying pressure profile at least at one outlet thereof;

a fixed displacement hydraulic motor-pump in fluid communication with the outlet;

an electric motor-generator, for forming the electrical output, mechanically coupled to the fixed displacement hydraulic motor-pump; and a control system (i) for enabling the electrical output by controlling at least one variable selected from the group consisting of pressure, piston position, power, flow rate, torque, RPM, current, voltage, frequency, and displacement per revolution, and (ii) comprising a variable frequency drive coupled to the electric motor-generator to control a load on the hydraulic motor-pump.

16. A system (i) for providing an electrical output constant in terms of at least one of frequency, voltage, current, or power from a compressed gas energy storage and recovery system, and (ii) suitable for the efficient use and conservation of energy resources, the system comprising:

a hydraulic-pneumatic energy storage and recovery system configured to provide a varying pressure profile at least at one outlet thereof;

a fixed displacement hydraulic motor-pump in fluid communication with the outlet;

an electric motor-generator, for forming the electrical output, mechanically coupled to the fixed displacement hydraulic motor-pump; and a control system (i) for enabling the electrical output by controlling at least one variable selected from the group consisting of pressure, piston position, power, flow rate, torque, RPM, current, voltage, frequency, and displacement per revolution, and (ii) comprising a continuously variable transmission disposed between the hydraulic motor-pump and the electric motor-generator to control a load on the hydraulic motor-pump.

17. A system (i) for providing an electrical output constant in terms of at least one of frequency, voltage, current, or power from a compressed gas energy storage and recovery system, and (ii) suitable for the efficient use and conservation of energy resources, the system comprising:

a hydraulic-pneumatic energy storage and recovery system configured to provide a varying pressure profile at least at one outlet thereof;

a digital displacement hydraulic motor-pump in fluid communication with the outlet; and a control system for enabling the electrical output by controlling at least one variable selected from the group consisting of pressure, piston position, power, flow rate, torque, RPM, current, voltage, frequency, and displacement per revolution, wherein the digital displacement hydraulic motor-pump comprises:

a high pressure input-output;
a low pressure input-output;
an off-center rotating cam;
a plurality of radial piston assemblies coupled to the off-center rotating cam; and
a control valve arrangement responsive to the control system for operating the hydraulic motor-pump at, at least one of a substantially constant pressure, power output, flow rate, torque, RPM, or displacement per revolution.

18. The system of claim 17, wherein the control valve arrangement comprises pairs of high speed valves in fluid communication with each piston assembly and the control system actuates the high speed valves to control aggregate displacement of the hydraulic motor-pump.

19. The system of claim 17, wherein the digital displacement hydraulic motor-pump further comprises a plurality of high-pressure inputs-outputs and a plurality of low-pressure inputs-outputs.

* * * * *